(12) United States Patent
Smith

(10) Patent No.: US 11,787,130 B2
(45) Date of Patent: Oct. 17, 2023

(54) MECHANICAL SYSTEMS TO ASSEMBLE OR DEPLOY PRE-STRESSED STRUCTURES

(71) Applicant: William E. Smith, Lebanon, IL (US)

(72) Inventor: William E. Smith, Lebanon, IL (US)

( * ) Notice: Subject to any disclaimer, the term of this patent is extended or adjusted under 35 U.S.C. 154(b) by 235 days.

(21) Appl. No.: 17/372,435

(22) Filed: Jul. 10, 2021

(65) Prior Publication Data

US 2021/0331431 A1    Oct. 28, 2021

Related U.S. Application Data

(63) Continuation of application No. PCT/US2020/015122, filed on Jan. 25, 2020.
(Continued)

(51) Int. Cl.
*B29C 70/42*    (2006.01)
*B33Y 80/00*    (2015.01)
(Continued)

(52) U.S. Cl.
CPC ............. *B29C 70/42* (2013.01); *B29C 65/48* (2013.01); *B29C 65/562* (2013.01);
(Continued)

(58) Field of Classification Search
CPC ..... B29C 65/48; B29C 65/562; B29C 66/721; B29C 70/16; B29C 70/42; B29C 70/52;
(Continued)

(56) References Cited

U.S. PATENT DOCUMENTS 3,507,736 A * 4/1970 Plymale ................ B29C 48/345
                                                                        425/327
6,263,921 B1 * 7/2001 He ........................ B29C 48/153
                                                                        156/143
(Continued)

FOREIGN PATENT DOCUMENTS

WO    2018148025 A1    8/2018
WO    2019013195 A1    1/2019

OTHER PUBLICATIONS

International Search Report in PCT/US2020/015122, dated Jan. 25, 2020.
(Continued)

*Primary Examiner* — Philip C Tucker
*Assistant Examiner* — Brian R Slawski
(74) *Attorney, Agent, or Firm* — Grace J. Fishel

(57) ABSTRACT

A mechanical system that assembles or deploys pre-stressed structures. The assembly or deployment process outputs and elastically deforms material to form flexural members having a sinusoidal shape and stored potential energy. The sinusoidal shaped members are oriented and deployed with support members as they take shape. Sinusoidal shaped members are formed from a series of contiguous flexures; each flexure's properties may be engineered using a simulation technique. Each flexure is formed from a region of a sinusoidal member's length that begins and ends at antinodes. During assembly or deployment support members are positioned at antinodes maintaining the flexures' shapes and the assembly's pre-stressed state. By controlling the forces applied to and position of each flexure formed during assembly, the distribution of potential energy within the assembly and its secondary shape can be engineered. Elastic potential energy may be harvested from the material forming the flexural members.

20 Claims, 47 Drawing Sheets

Related U.S. Application Data

(60) Provisional application No. 62/797,672, filed on Jan. 28, 2019.

(51) Int. Cl.
  *B29C 65/48* (2006.01)
  *B29C 65/56* (2006.01)
  *B29C 65/00* (2006.01)
  *B29K 63/00* (2006.01)
  *B29K 83/00* (2006.01)
  *B29L 31/34* (2006.01)

(52) U.S. Cl.
  CPC ............ *B29C 66/721* (2013.01); *B33Y 80/00* (2014.12); *B29K 2063/00* (2013.01); *B29K 2083/00* (2013.01); *B29K 2995/0046* (2013.01); *B29L 2031/34* (2013.01)

(58) Field of Classification Search
  CPC ............ B29K 2063/00; B29K 2083/00; B29K 2995/0046; B29L 2031/34; B33Y 80/00; B64G 1/222; E04B 1/19; E04B 2001/1996
  USPC ... 156/60, 91, 143, 160, 161, 165, 157, 158, 156/166, 180, 196, 199, 200, 201, 292, 156/293, 294, 296, 297, 349, 425, 428, 156/430, 433, 434, 443, 538, 539, 543, 156/556, 559, 560
  See application file for complete search history.

(56) References Cited

U.S. PATENT DOCUMENTS

2004/0108045 A1\* 6/2004 Hauser .................. B29C 48/12
  156/196
2007/0113958 A1 5/2007 Brown et al.

OTHER PUBLICATIONS

Written Opinion of the International Search Authority in PCT/US2020/015122, dated Jan. 25, 2020.
English translation of WO 2019/013195 A1.

\* cited by examiner

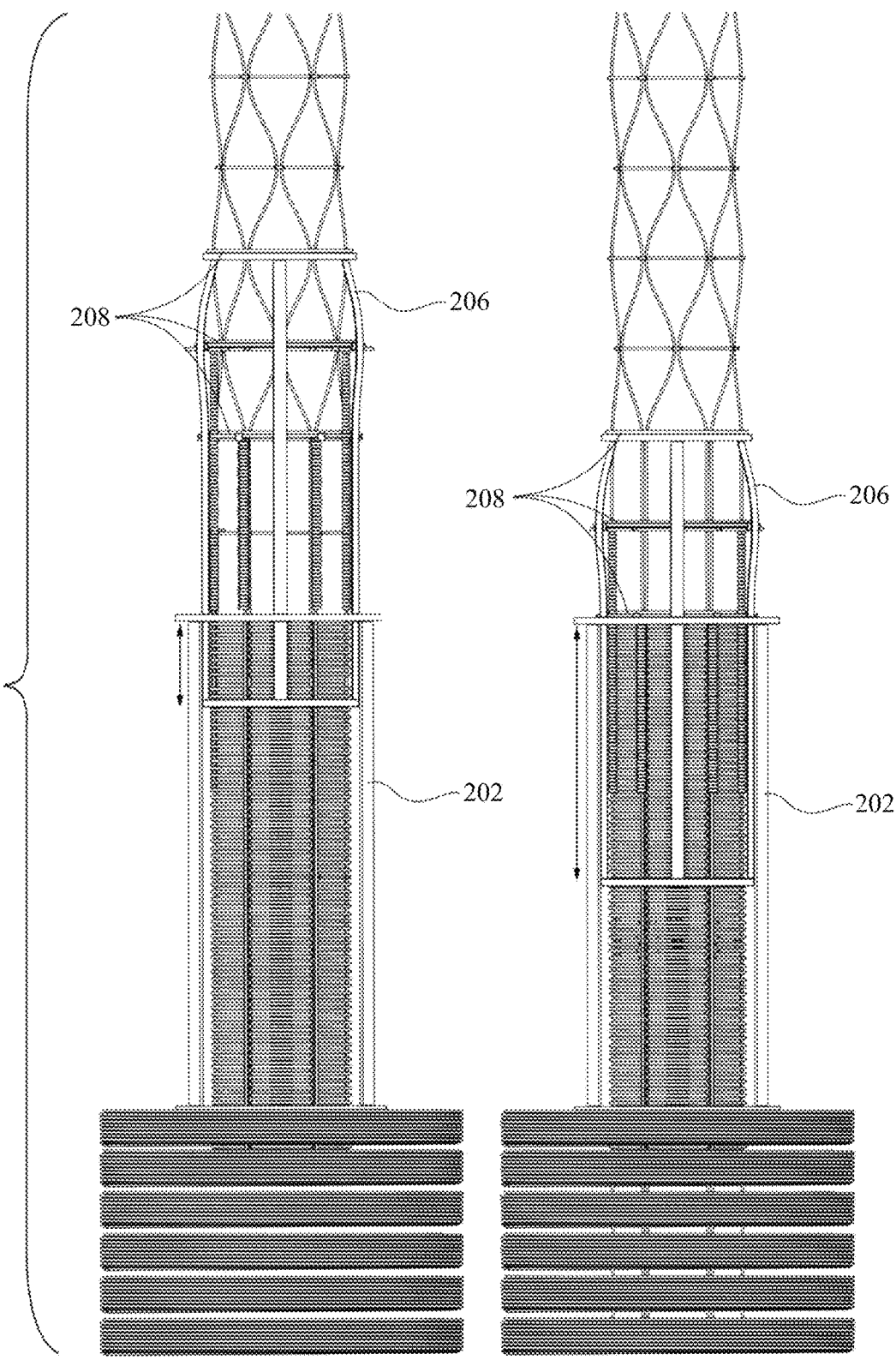

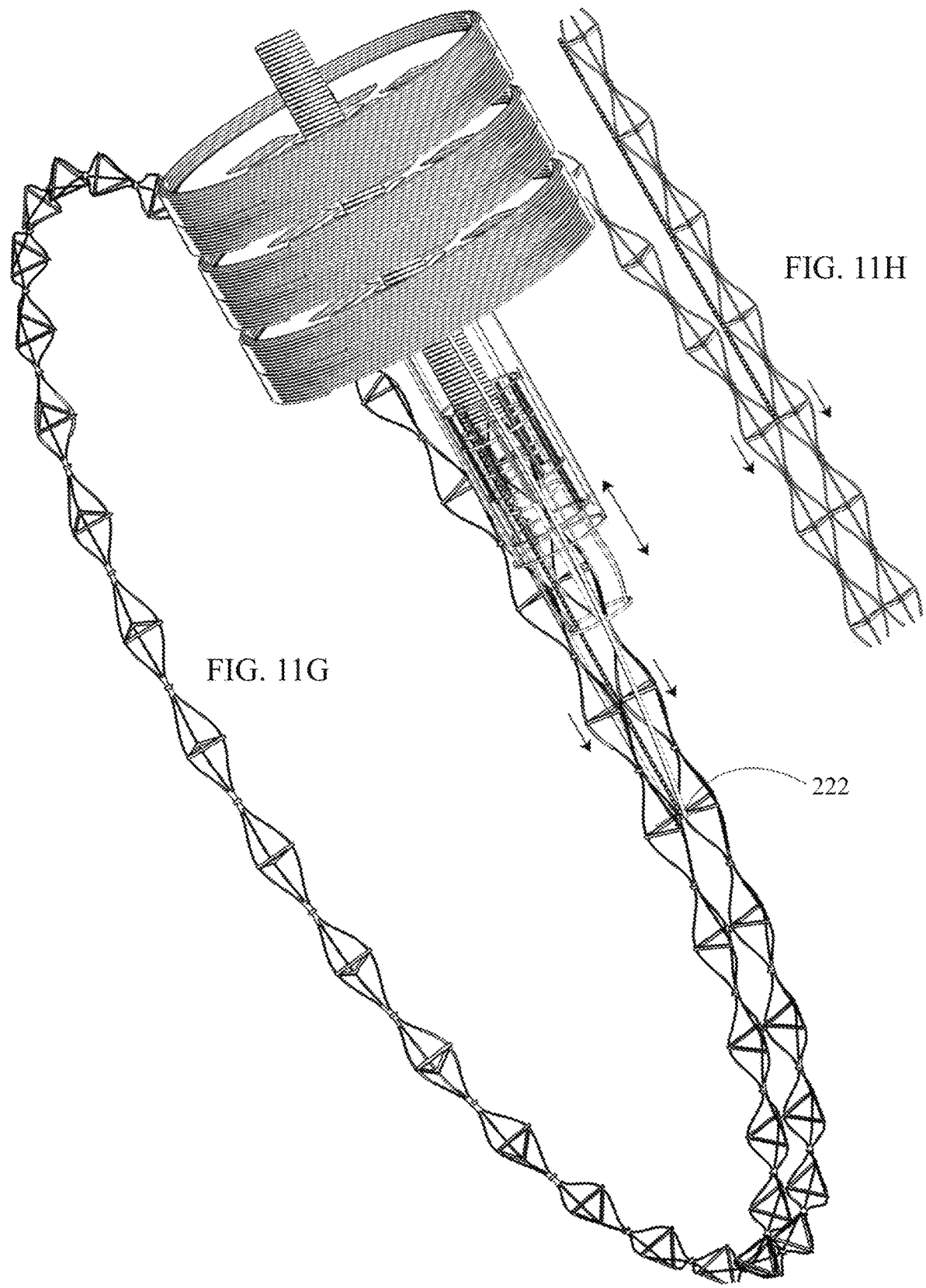

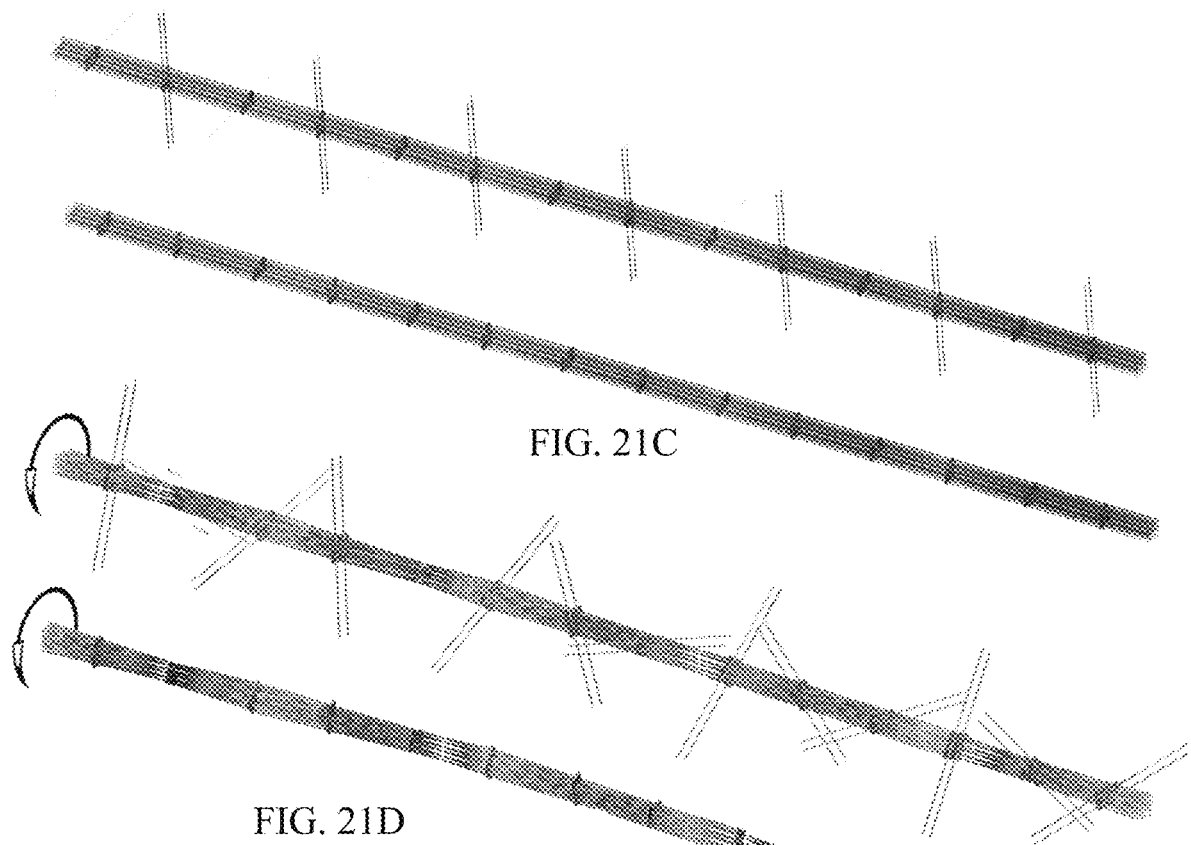
FIG. 21C
FIG. 21D
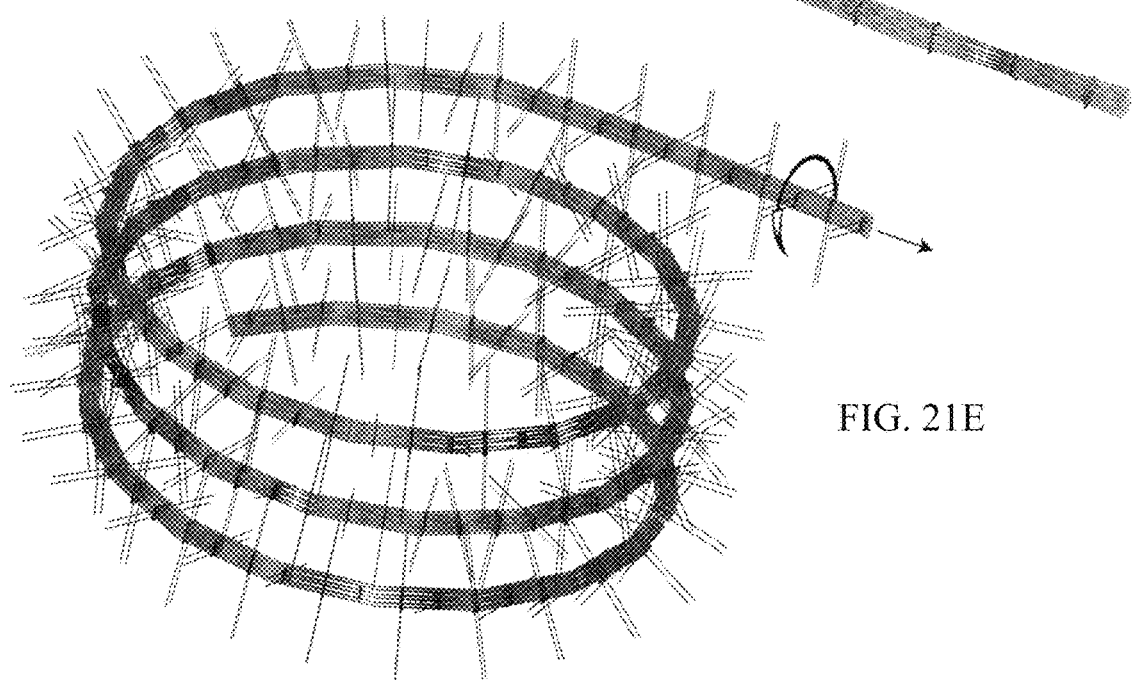
FIG. 21E

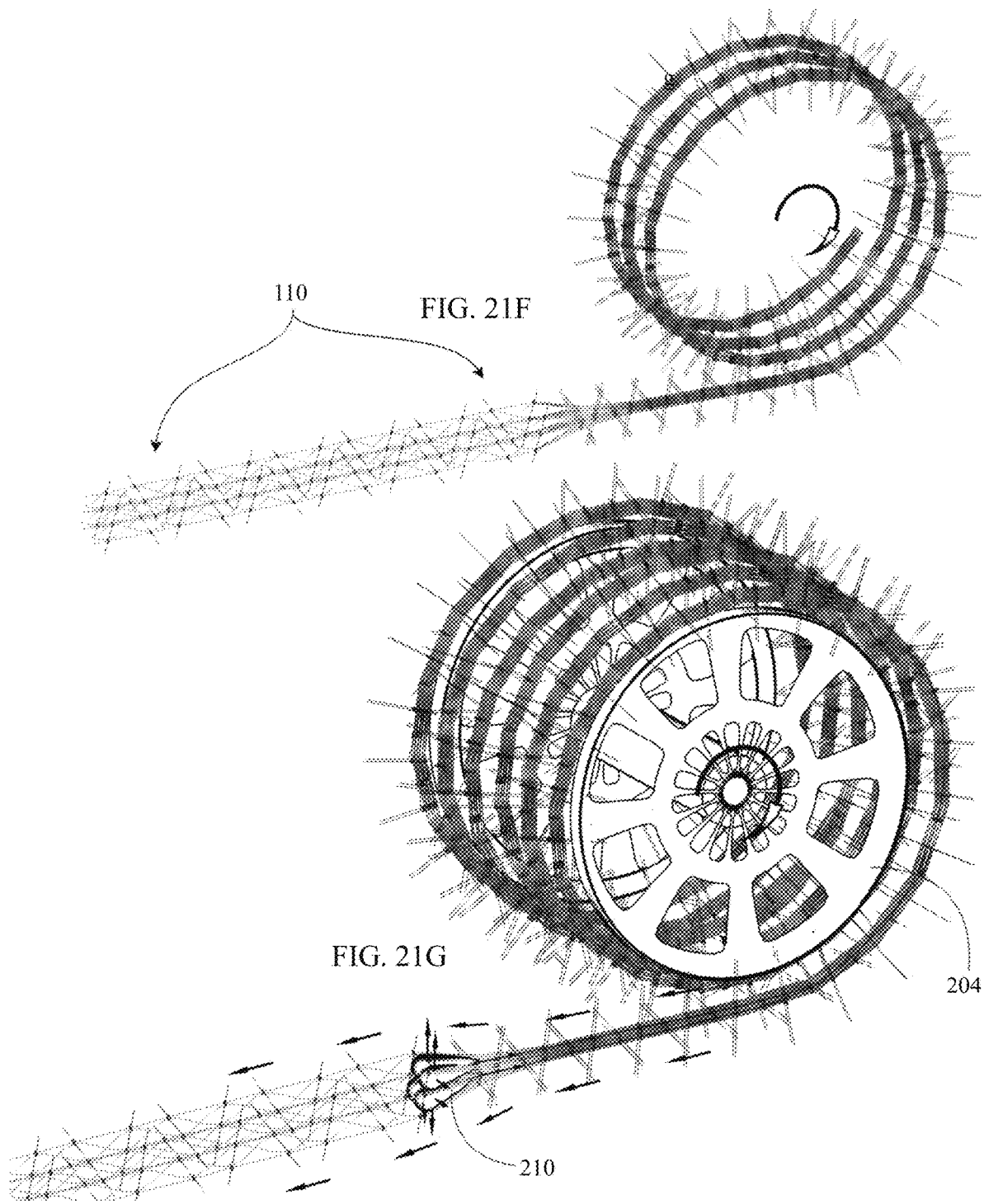

MECHANICAL SYSTEMS TO ASSEMBLE OR DEPLOY PRE-STRESSED STRUCTURES

BACKGROUND OF THE INVENTION

Field of the Invention

The present invention relates to a mechanism for assembly, deployment and modeling of pre-stressed structures having flexural properties and stored elastic potential energy.

Brief Description of the Prior Art

This invention describes mechanical systems, devices and construction methods used to assemble and/or deploy structures built from discrete parts for mechanical and/or structural applications.

Automated assembly process described, in part, in U.S. Ser. No. 62/259,653 orient, connect and stress parts during deployment. The automated additive assembly and/or deployment process form flexural elements. Flexural elements become flexure elements and in turn form flexural members that interconnect to form pre-stressed sinusoidal assemblies having flexural properties.

A flexure element composes a region of a flexural member's length. The flexural member has a sinusoidal shape and stores elastic potential energy. A group of sinusoidal shaped members interconnect to form pre-stressed assemblies having flexural properties. These pre-stressed assembles are formed from sinusoidal shaped members and support members as described in U.S. Ser. No. 62/259,653. Note: the parts and terminology below are common to both applications.

Parts and Terminology

Material Parts (100) Relaxed member: Relaxed member types have dimensions and are composed of elastic material. Any point or region of a flexural member's length that is in an intermediate state of shape transition can be seen as relaxed. For example, a linear member formed into a coil shape (but not limited to a coil) that is transitioning into a sinusoid can be seen as relaxed along its length where it is in an intermediate state of being neither a coil nor a sinusoid.

(102) Sinusoidal shaped member: Sinusoidal shaped member variants are flexural members having different wave parameters and dimensions.

(104) Support member: Support member variants are axial support members, ring support members, n-gon support members, inflatable support members and strut support members.

(106*) Flexural element: Flexural elements are transitory structures that become flexure elements after being integrating into the sinusoidal structure.

(106) Flexure element: A Flexure element is a specifically defined region of the sinusoidal shaped member's length that exists between support members in assembly.

(108) Flexural member: Flexural members are pre-deployed or deployed members (i.e. sinusoidal shaped members) composed of contiguous flexure or flexural elements.

(109) Locking feature: A locking feature becomes part of the sinusoidal structure and performs a locking and/or alignment function during assembly.

(110) Sinusoidal structure: A Sinusoidal structure is a sinusoidal assembly, flexure network.

Note: A flexure is a flexible element (or combination of elements) engineered to be compliant in specific degrees of freedom. A flexural element, a flexure element, a flexural member, a sinusoidal shaped member, a sinusoidal structure are all flexures.

A Flexural member is a member that is subject to both tension and compression within its depth.

Flexural properties include strength, stiffness, and load/deflection behavior.

A-SEM Parts (200) A-SEM
(202) Chassis
(204) Parts feeder(s) (axial and/or torsion force devices)
Note: The parts feeder is fundamental to the A-SEM because it stows the parts.
(206) Machine assembly
(208) Support member carrier(s)
(210) Lateral force mechanism(s)
(212) Intra-structure attachment mechanism(s)
(214) Actuator finger(s)
(216) Prime mover(s)
(218) Drive mechanism(s) (belt, worm gear, rack and pinion etc.)
(220) Pseudo ridged body model(s)
(222) Inter-structure attachment mechanism "Zipper"
Note: The prefix inter- means between or among. The prefix intra- means within.

Sinusoid (Anatomy) Characteristics (a) Spatial frequency: Spatial frequency is the characteristic of any structure that is periodic across a position in space.

(b) Sinusoidal axis: The Sinusoidal axis is the sinusoidal shaped member's neutral axis.

(c) Assembly axis: The Assembly's axis is the assembly's neutral axis.

(d) Distal Anti-node: Distal Anti-nodes are located on the assembly's periphery.

(d*) Proximal Anti-node: Proximal Anti-nodes are located central to the assembly.

(e) Node: Nodes are points on the sinusoidal shaped member that follow its neutral axis.

(f) Flexural regions: Flexural regions are located between support members.

(g) Inflection point: Inflection points and nodes are synonymous.

(h) Boundary region: A Boundary region and an antinode region are synonymous.

Additional Terminology

Flexure elements are flexures, they can be slender, they are flexible, deflected and form flexural regions between support members along the length of the sinusoidal member. Flexural regions can be composed of one half of a wavelength ($\lambda/2$) and/or one wavelength ($1\lambda$) flexure elements/flexures. A flexural member is a sinusoidal shaped member that is formed from a relaxed material having elastic properties. The series of contiguous periodically deflected regions give the flexural member its stored elastic potential energy and sinusoidal shape.

A deformed/deflected material is elastic if it returns to its original shape after the force/stress/strain is removed.

Sinusoidal shaped members are divided into flexural regions that correspond to their sinusoidal geometry. Flexural regions delineate portions of the sinusoidal shaped member. Flexural regions are composed of flexure elements that are formed from flexural elements that can be individually and uniquely deflected during the assembly process. Flexural elements transition into flexure elements after they are completely formed and become part of the assembly/structure.

The extrusion of a structure is an assembly process and/or a deployment process. The act of extrusion alters materials and structure by transitioning their form. The transition may involve a gain or loss of elastic potential energy. The extrusion of a structure acts by applying moments (or redirecting energy) to a structure or its components leading to a change in its form. The extrusion and resulting form transition may be a reversible process (i.e. reversible deployment).

The terms structure and assembly may be used interchangeably in this application. An assembly is a group of mating components before or after being fitted together. A structure is a series of connected, interrelated elements that together form a system that can resist the effects of an external load.

A flexural element's deflection characteristics form through bending moments (forces) applied to it during the automated assembly and/or deployment process. A flexural element can be given a specific amount of elastic potential energy during its formation. This elastic potential energy is held in the flexural element's deflected material and is transferred to the flexure element/flexure it becomes. A flexural element is labeled a flexure element/flexure after becoming an integral part of a sinusoidal shaped member in assembly.

A plurality of sinusoidal shaped flexural members is formed during the automated assembly and/or deployment process and are integrated to produce a pre-stressed structure having stored elastic potential energy. This internally held elastic potential energy pre-stresses the assembly and is distributed throughout its structure. The assembly's structure is composed of a network of flexures that share stored elastic potential energy. The elastic potential energy held in the interconnected deflected members flexurally pre-stresses the sinusoidal structure.

The machines and devices (the A-SEM) related to the automated assembly and/or deployment of these pre-stressed assemblies function to position, connect and orient a structure's constituent parts. This level of control during assembly allows the structure's distribution of internal stress to be modulated and its structural and behavioral properties to be controlled. By controlling the structure's distribution of internal stress in relation to the assembly's centroid axis, the structure's deflection characteristics can be predetermined and its secondary shape controlled.

The pre-stressed sinusoidal assembly's centroid axis and its sinusoidal shaped members average neutral axis position may coincide. A sinusoidal shaped member's axis when in assembly is its neutral axis. An assembly's neutral axis position is determined by averaging the sinusoids' stored elastic potential energy/pre-stressing energy. The assembly's neutral axis would follow the point of zero elastic potential energy density along the assembly's length. The assembly's neutral axis and its centroid axis may not coincide. Sinusoidal shaped members having identical dimensions and material properties possess the same elastic potential energy.

If an assembly's unit sinusoidal shaped members have identical dimensions, material properties and are orientated anti-phase along the same path (transversely isotropic) as depicted in FIG. 3A, the average neutral axis position of the assembly and the centroid axis coincide.

If an assembly's sinusoidal shaped members don't have identical amounts of stored elastic potential energy because of differences in dimension, material properties or orientation, as depicted in FIG. 3C, the average neutral axis position of the assembly and the centroid axis may not coincide. The centroid is geometric in nature, whereas the neutral axis is the "fiber" which does not change in length during bending.

Current Field of the Technology

Current machines and related systems used to build structures by the additive assembly of connectable parts do not introduce units of stress into a structure as it is formed and therefore cannot control the structure's stress profile during the assembly process. This invention can control the stress placed on its parts during assembly and based on those parts accumulative interconnected stress creates the structure's stress profile.

Current methods of additive manufacturing (3d printing) cannot adequately introduce stress into a structure as it is being formed and do not form flexures from material placed under stress during assembly. This invention relies on controlling an assembly's internal stress to shape and optimize its structural and/or mechanical properties.

The introduction of stress during assembly can improve a structure's strength to weight ratio, its flexural performance and resilience along with its toughness. Concerns related to the longevity of pre-stressed structures formed from elastic materials due to stress relaxation and creep will not dissuade its future use. Given the trajectory of nano-composite material development, flexural pre-stressing will increasingly be used as a method of reliably enhancing the overall performance of a dynamic structure. The enhanced efficiency and performance brought about by flexural pre-stressing is particularly important to aerospace applications.

Flexural pre-stress is internal stress introduced within a structure by its elastically deformed component elements and/or members having stored potential energy and flexural properties that counteract the stresses that will result from applied loads.

Flexural pre-stress is permanent stress originating from the elastic deformation of its components. This elastic potential energy impacts the overall integrity and stability of the structure. It is intentionally created for the purpose of improving the structure's performance under various service conditions.

Elastic deformation is material deformation due to stress that returns to its original shape when the stress is removed.

Current tubular deployable pre-stressed boom structures are similar to sinusoidal structures produced by A-SEM embodiments in that they store elastic potential energy, before and after deployment. They differ in that tubular booms have less ability to bend and/or buckle predictably than many sinusoidal structures produced by A-SEM embodiments.

High strain composites (HSCs) are materials capable of large deformations while maintaining high stiffness which allows them to be reconfigured and carry loads. As such they are of interest for deployable space structures. HSCs aim to reduce the weight, cost, and complexity of deployable space structures by replacing traditional metallic structures and mechanical hinges. Such fiber composites including those with an epoxy and/or silicone matrix may be well adapted to the use within A-SEM embodiments where large material deflections are required.

Previous automated systems of building and/or deployment methods are not engineered to form structures having flexural properties and interconnected flexure elements to form pre-stressed assemblies. The highly nonlinear geometric nature of flexure elements' deflection characteristics complicate their analysis and design approaches often limiting the use of compliant mechanisms and structures having flexural properties to simple applications. However, due to the inherent advantages associated with compliant mechanisms and other structures having flexural properties (e.g. reduced part count, no lash, or need for lubrication, increased precision, built-in compliance, ease of manufacturing and assembly, etc.), the continual development of analysis and design tools is justified.

This invention can incorporate devices that help to actively analyze and/or model a structure's physical and behavioral performance during the assembly process.

Current methods used to model the behavior of assemblies composing flexure elements/flexures require techniques that are complex and often inaccurate. This invention's unique method of assembly may incorporate the pseudo-rigid-body model (PRBM) as part of the assembly process to form flexural members and assemblies composed of flexure elements/flexures that yield optimal performance. The PRBM is a method of transforming linkages into flexural elements to become flexures using equivalent springs and rigid bodies. PRBMs are numerical models designed to mimic the behavior of compliant elements/flexural elements and the flexure elements/flexures they become.

PRBMs describe the motion and forces of an elastic member using a rigid-body model with equivalent behavior. Traditional modeling approaches for elastic bodies focus on stress and strain fields. PRBMs, on the other hand, describe the behavior of the whole flexural element/compliant element, and hence are useful when addressing design issues at the device/assembly/structure level. The PRBM approach is useful for designing compliant mechanisms and structures.

The potential benefits of predetermining and actively modeling a structure's internal forces and the ramifications of having that control when applied to the design and engineering of spatial structures should be considered.

This invention can sequentially extrude, deploy and assemble connectable parts to form pre-stressed lattice structures having flexural properties. Current methods of automated lattice assembly do not pre-stress the structure and cannot control the path of the assemblies being extruded.

The invention's systematic, periodic and controlled formation of flexural elements and flexures containing specific amounts of elastic potential energy used to pre-stress and/or controllably deflect an assembly along a path as it is being formed is a novel method of building. This method of building from sinusoidal members that follow a path has not been automated to build structures having mechanical and structural applications and should be explored. The use of flexural members having stored elastic potential energy to pre-stress an assembly and how that stress can be distributed to controllably deflect an assembly's secondary structure has not been applied to the automated building of structures having mechanical and/or structural applications.

The secondary structure is the shape of the assembly; that shape can be deflected due to second order bending. The secondary structure of the assembly is formed by its internal pre-stressing forces. The term secondary structure is generally used to describe the shape of biomolecules. The pre-stressing forces within an assembly that can cause a secondary structure to form are similar to the inter-molecular forces (pre-stressing forces) within a molecule (assembly) that cause a protein to bend or twist and impact its ability to fold and/or buckle. Conformational changes to biomolecules can be initiated by buckling events.

Bistable structures including those having snap through properties (like those capable of being formed by an A-SEM) have seen significant attention in recent years for their potential as structure and for energy harvesting. The behavior of these structures is, however, very sensitive to boundary conditions and initial geometry making their calibration for various applications difficult. There is a need for novel assembly and deployment systems that incorporate computer-based control systems that can specifically modulate and possibly simulate a structure's properties to reliably harness the potential energy of bistable structures.

The active adaptive pre-stressing of flexural members during assembly by way of data acquired through devices that monitor the behavior of the expanding/extruding structure may allow structures to evolve during assembly and not require they be structurally predetermined.

The mechanisms that provide the adaptability component of an A-SEM, allow a level of functionality and complexity that may not be applicable for sinusoidal extruder mechanism embodiments where simplicity and efficiency are the goal.

Methods and systems used to stow lengths of pultruded nano-composite material members including but not limited to rods formed from nano-composites have not been sufficiently explored when used to form assemblies.

Methods of harvesting the elastic potential energy held within stowed material components prior to their being assembled and/or deployed by systems like the A-SEM have not been sufficiently explored. The A-SEM may use the elastic potential energy stored in the deflected materials it is designed to deploy/extrude as an energy source to drive itself.

Methods and patterns of reversibly folding, buckling and winding material to be optimally extruded/deployed by a system like the A-SEM would enhance the efficiency of the reversible assembly process and should be explored.

Systems used to build light weight extrudable assemblies for volumetric space structure applications have been applied for decades. Few if any of these processes have produced pre-stressed flexural lattices or considered the potential deflection of a lattice from internal forces applied during assembly.

Pre-stressed structures that dependably self-deploy even when stowed for long periods will make efficient, light weight flexural components used in gossamer deorbiting systems.

The development of ultra-light diffractive film engineered to provide electronic, rather than mechanical, navigation protocols and the systems that deploy/extrude structures that will allow the unfolding of these large sails required for long-term space exploration missions is extremely challenging. Attaining the correct ratio of diffractive sail area and structural mass resulting in a small, but significant acceleration under the photon pressure of sunlight may use systems that extrude/deploy flexurally pre-stressed ultralight structures.

The manufacture of large truss systems used to support new space technologies like solar power supply constellations and large space structures used to support microwave antennae and mirrors are of great interest. Flexible trusses made of flexural members are better suited to form space structures than current ridged trusses because of their compact pre-deployment packaging in the launch vehicle and their ability to manage large elastic displacements experienced during operational and construction loads.

The synchronization and the reversible attachment of mechanical assembler systems (i.e. A-SEMs) that function within the context of building large structures in reduced gravity environments should become increasingly used and sophisticated. The cellular machinery that builds and maintains molecular assemblies in the fluid environment of a cell may guide the development of future assembly systems.

BRIEF SUMMARY OF THE INVENTION

As the mechanical properties of high performance composite materials improve, the structures built from them will potentially display properties that are increasingly complex and dynamic (i.e. flexural properties).

The combined effects of a high performance material's basic tensile, compressive and shear properties will go to form structures having flexural properties. That is, when flexural loading is applied to a specimen, all three of the material's basic stress states are induced.

Methods of automated assembly and deployment that utilize the exceptional flexural properties of high performance composite materials are needed for structural and mechanical applications, including but are not limited to the building of compliant mechanisms and lattice structures.

This invention is such a method of assembly and/or deployment. It is called an Adaptive Sinusoidal Extruder Mechanism (A-SEM). This invention describes mechanical systems, devices and construction methods used to assemble structures from constitute parts for mechanical and/or structural applications. There may also be variations of a preferred A-SEM embodiment capable of reversible assembly or reversible deployment.

The A-SEM may be composed of mechanisms and devices that shape, support and connect sinusoidal shaped members to form pre-stressed structures having stored elastic potential energy. Each sinusoidal shaped member is formed from a relaxed material member having flexural strength. The A-SEM incrementally shapes relaxed members into sinusoidal shaped members and uses support members to maintain that sinusoidal shape. The support members and sinusoidal shaped members are the predominant parts used by the A-SEM to form an assembly. The sinusoidal shaped members could not maintain their shape in assembly without the support members.

Sinusoidal shaped members are flexural members that are incrementally formed from flexural elements during assembly. These flexural elements become flexures once in assembly and can be slender; their structure begins and ends at antinode regions that lie along a sinusoidal shaped member's length. The flexural elements incrementally form the length of a flexural member's sinusoidal structure during assembly. The sinusoidal shaped members are flexural members, they are shaped and organized to efficiently store elastic potential energy.

The individual flexure elements/flexures are organized sequentially contiguously to form a sinusoidal shaped member from a single piece of material during assembly. That sinusoidal shaped member is a series of connected flexure elements/flexures; the flexures are delineated and held in an elastically deformed state by support members that are positioned at antinode regions along the sinusoidal shaped member's length during assembly.

The A-SEM orients, connects and stresses parts during their assembly. This automated and/or deployable additive assembly process sequentially forms flexural elements to form sinusoidal shaped members/flexural members that are interconnected using support members to form assemblies having flexural properties.

The automated process of forming relaxed members into flexural elements to form sinusoidal shaped members having physical wave parameters may be controllable. The lateral forces, axial forces, torsional forces and the position of the support members determine the flexural member's properties during assembly and are controllable parameters. Active and passive control mechanisms may modulate the formation of each flexural element as it is formed.

Active control uses some kind of sensor(s) to measure (a quantity) the motion or force or acceleration etc. There is also some kind of logic that controls the actuator(s) timing and force.

Passive control does not have any sensors or additional actuators that consume any additional power. Mechanical components control the actuator(s) timing and force.

Real time adaptive mechanism and devices (within the Adaptive-SEM) may control these parameters. The flexural properties of the members within a structure may also be totally predetermined.

After a flexural element is formed by the A-SEM it becomes part of the assembly and considered a flexure because it is a functioning component of the assembly/flexural system.

Because this invention forms flexural systems from flexural elements to form flexures by deforming compliant members similar to methods used to model the behavior of flexible members as fixed-guided beams, this system should be well adapted to use common modeling techniques such as the pseudo rigid body model (PRBM), elastic beam bending solutions, elliptic integral solutions, and finite element models.

A fixed-guided beam is one of the most common flexible elements used in compliant mechanisms and available to various modeling methods including the PRBM. During assembly by the A-SEM a flexural element is essentially a fixed-guided beam and ideally used to modeling a flexure.

The A-SEM may incorporate systems, methods or devices that help to actively analyze and/or model a structure's physical and behavioral performance during the assembly process.

Such a system is the PRBM concept; it would allow the flexural elements to be analyzed using well-known rigid-body kinematics. The PRBM stress analysis method uses a fixed-guided compliant beam segment (beam flexure) with end force(s) and moment(s) to represent the displacement of a flexure. The fixed-guided compliant beam segment (beam flexure) emulates the flexures formed during or prior to the automated assembly process. This method of analysis uses the parametric relationships of the PRBM for a fixed-guided compliant member to form flexures that are optimized to function within the assembly.

When building a structure using this system, there is a complex interplay between geometry and material properties to form an optimized structure. The mechanisms and devices required to satisfy the PRBM's approach may be integrated into the A-SEM and contribute to the structural design optimization objective.

As the A-SEM forms and assembles flexural elements to become flexures, their parameters may be guided by real time or predetermined PRB modeling calculations through integrated electronic devices or computer interface. Finite element analysis (FEA) programs capable of nonlinear analysis may be compared to PRBM results.

Each flexural element can be thought of as a quantity of stored elastic potential energy. That potential energy originates from the elastic deformation of the relaxed member to form a flexural element. That flexural element and the flexure it becomes is a unit of potential energy. That unit is the smallest quantity of energy that can be inputted into the structure during its assembly.

A flexural element becomes a flexure when its elastic potential energy is introduced to the assembly/structure it is part of, i.e., when formed the flexure's potential energy becomes part of the assembly and is shared within the network of flexures making up the structure.

Assemblies composed of a number of interconnected flexures and support members having multi-degree of freedom (multi-DOF) are flexure systems.

The series of individual flexures that form the sinusoidal shaped members are the units of potential energy that interconnect to form the assembly's distribution of internal stress. A structure's distribution of internal stress (its "stress map") and if present, its deflection characteristics (secondary shape) can be seen as being extrudable or printable. An assembly's stress map is reflected in its extrusion trajectory path. Extruding along a trajectory path is a form of additive manufacturing.

If the assembly's internal stress is evenly distributed the assembly will not deviate from a straight extrusion/deployment path. If that internal stress is not evenly distributed across the assembly's cross-sectional shape, the centroid axis and the neutral axis are incongruent and the assembly will take on a secondary shape.

Therefore, an assembly's physical distribution of flexures and their distribution of stored potential energy can form a network designed to produce pre-stressed assemblies having a specific secondary structure that mirrors the assembly's internal stress.

An example of an A-SEM assembly process could involve the building of a structure in response to an external force like gravity, a process where an assembly's internal stress is actively modulated (adapts) during its assembly to counteract the effect of gravity.

These assemblies, with or without a secondary structure or evenly or unevenly distributed internal stress could have applications as individual pre-stressed assemblies or be combined to serve mechanical or structural applications at any scale and/or level of complexity.

The adaptive component of the A-SEM provides a level of functionality and complexity that may or may not be applicable for sinusoidal extruder mechanism embodiments where simplicity and efficiency is the goal.

Material parts and devices like micro satellites, solar panels and thin refractive films may be incorporated into the sinusoidal assemblies before, after or during their deployment/extrusion by an A-SEM embodiment.

A deployable sinusoidal structure's network of structural components can also function as a signaling and electrical distribution network given the use of materials to include meta-materials.

BRIEF DESCRIPTION OF THE SEVERAL VIEWS OF THE DRAWINGS

FIG. 5A depicts orthogonal views of an A-SEM embodiment extending and retracting reciprocatively during the assembly of a sinusoidal structure.

FIG. 11G is a perspective view of an A-SEM embodiment that is extruding a sinusoidal structure along a curved path to reconnect to that path.

FIG. 11H is a perspective view of one extruded assembly being attached to another by secondary fasteners.

FIG. 21C is a perspective view of pre-deployed structures that are pre-assembled and partially pre-assembled.

FIG. 21D is a perspective view of said pre-deployed structures being axially twisted allowing them to be stowed in the parts feeder.

FIG. 21E illustrates a method of coiling the twisted pre-assembled structure to be stowed in the parts feeder.

FIG. 21F is a perspective view of the pre-assembled material being extruded over a mandrel/lateral force mechanism to expand to form a sinusoidal structure.

FIG. 21G illustrates how the parts feeder can apply axial force to a pre-deployed structure expanding it over a mandrel to form a sinusoidal structure.

DETAILED DESCRIPTION OF AT LEAST ONE PREFERRED EMBODIMENT OF THE INVENTION

This method of pre-stressing, assembling and deploying structures having flexural properties is based on the premise that an elastically deformed sinusoidal shaped member is an efficient vehicle for storing elastic potential energy and that a sinusoidal shape member can also be an efficient structural component. Building with sinusoids may be a fundamental and effective system of building strong flexible structures and mechanisms.

The Adaptive Sinusoidal-Extruder-Mechanism (A-SEM) can be an electromechanical system or combination of actuatable systems and devices that form pre-stressed structures from discrete parts. These machines and related systems build structures by the additive assembly and/or deployment of discrete parts.

Both the discrete parts and the structure they form have flexural properties. The discrete parts forming a structure assembled by the A-SEM include but are not limited to support members and sinusoidal shaped members. These members may incorporate complimentary methods of connecting during assembly and deployment. Such methods may be integrated into their material structure or may be discrete parts or materials such as clips, pins or adhesives.

During assembly discrete parts are connected, elastically deformed and placed under stress to from a pre-stressed structure. The pre-stressed structure's internal stress (i.e. elastic potential energy) comes from its materials' elastically deformed state. The stored elastic potential energy held within the pre-stressed structure originates from its sinusoidal shaped members. The elastically deformed sinusoidal shaped members are formed incrementally from a relaxed member of length during assembly. The sinusoidal shaped members are held in a deformed state by support members. They are oriented and positioned by the A-SEM during assembly and/or deployment.

The synonymous labeling of this invention's material parts and sinusoidal characteristics relates to the sinusoids being treated as a structure and as a vehicle that stores elastic potential energy. Engineering and Biology terminology are used to describe sinusoids as structure. Physics terms are used to describe sinusoids as shapes used to store elastic potential energy. The sinusoid is a structural member and energy containing wave.

Sinusoidal Structure Description

Figure 1A:
FIG. 1A depicts a straight relaxed member (100) of length.
Figure 1B:
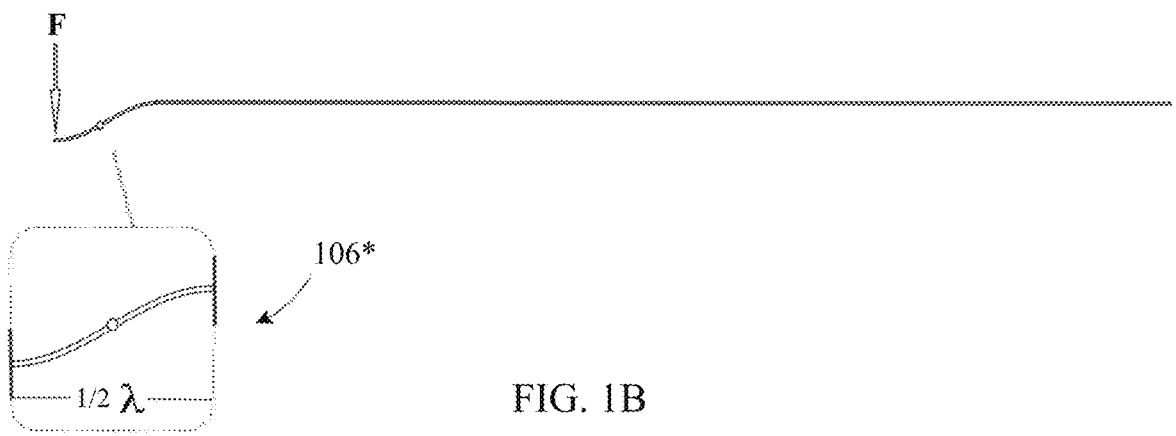
FIG. 1B depicts the elastic deformation of the relaxed member's terminus to form a single λ/2 flexural element (106*).

FIGS. 1A-D depicts the incremental deformation of a relaxed member to form a sinusoidal shaped member. FIG. 1A depicts a relaxed member (100) prior to the application of moments of force. FIG. 1B depicts the formation of one flexural element (106*). A flexural element is the region of the "relaxed" member's length that is being elastically deformed by the A-SEM during the assembly and/or deployment process. After a flexural element is completely and specifically formed it becomes part of the structure and a functioning flexure.

Figure 1C:
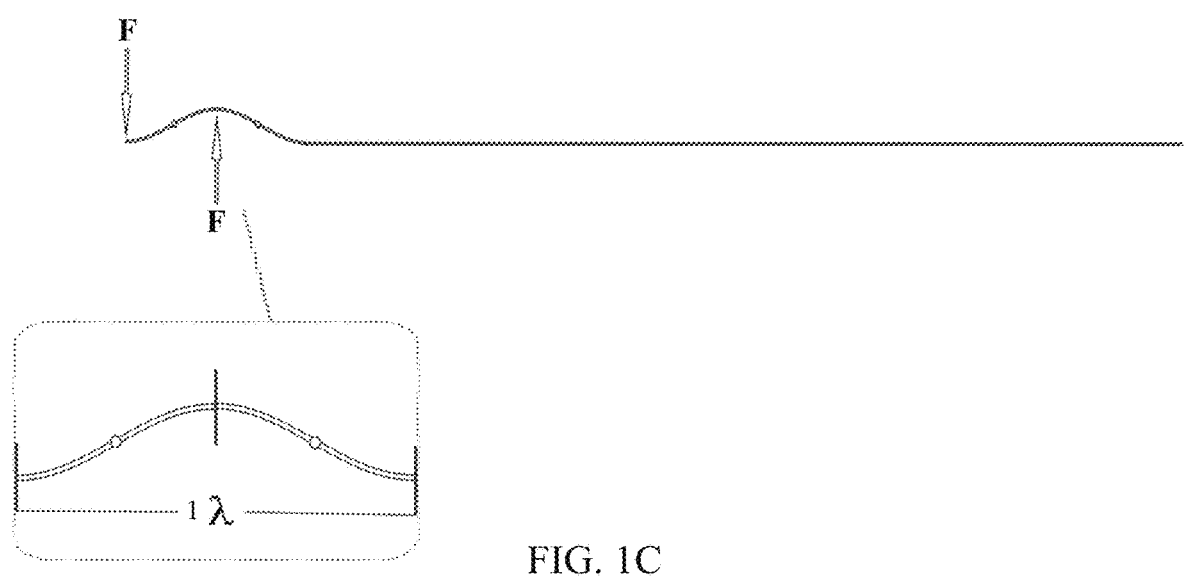
FIG. 1C depicts the sequential formation of two contagious λ/2 flexural element to form 1λ.
Figure 1D:
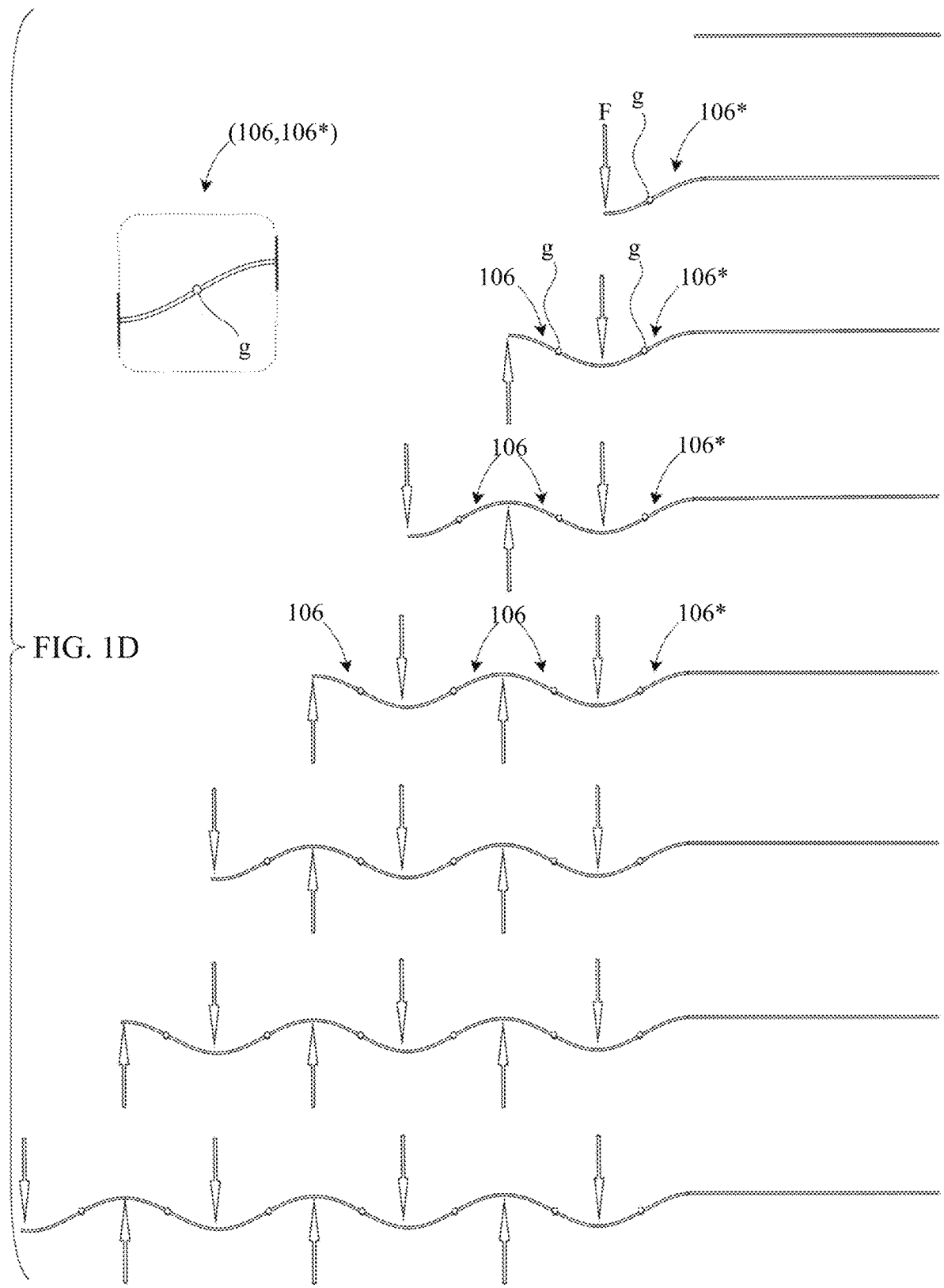
FIG. 1D depicts the sequential formation of contiguous flexures (106) to form a sinusoidal shaped member.

The individual flexural elements are deformed sequentially to form contiguous flexures that shape a flexural member/sinusoidal member from a single piece of material. FIG. 1D is a progression sequence depicting a relaxed member being incrementally formed into a sinusoidal shaped member. The flexural elements (106*) are labeled as flexures/flexure elements (106) after they are formed and become part of the sinusoid.

Figure 1E:
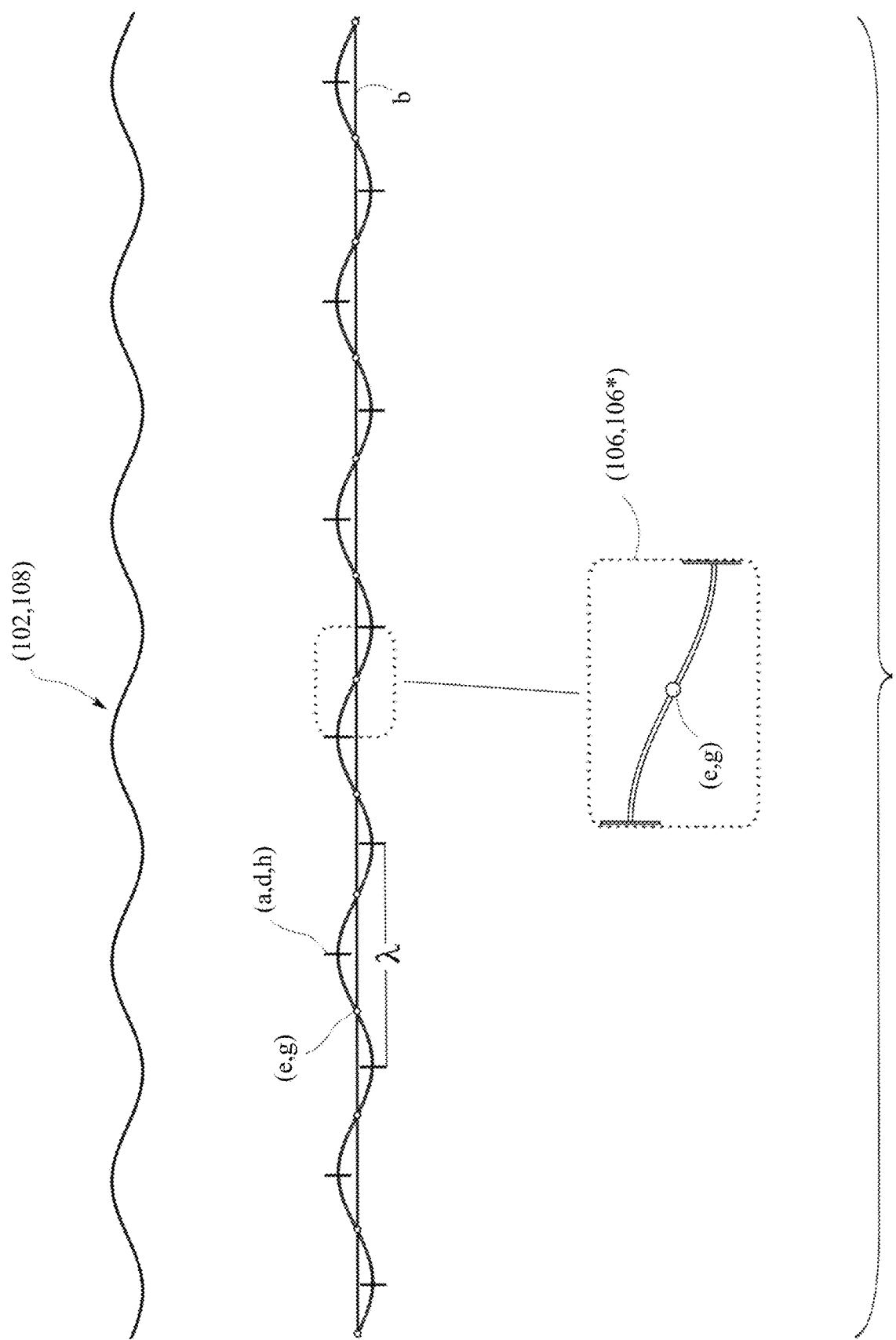
FIG. 1E depicts a flexural member (108) in the form of a sinusoidal shaped member (102) and how that member is labeled as having specific parts that relate to its geometric variables and behavioral characteristics, the enlarged view showing a flexure element (106).

FIG. 1E depicts the anatomy of the sinusoidal shaped member. The sinusoidal shaped member (102) is a flexural member (108) formed from a series of flexures (106). The nodes (e) that punctuate a sinusoidal shaped member's neutral axis (b) correspond to inflection points (g) that lie along a flexural element's (106*) length. The sinusoidal shaped member's antinodes (d) correspond to the flexures/flexural elements boundary regions (h) and its spatial frequency (a).

Figure 2A:
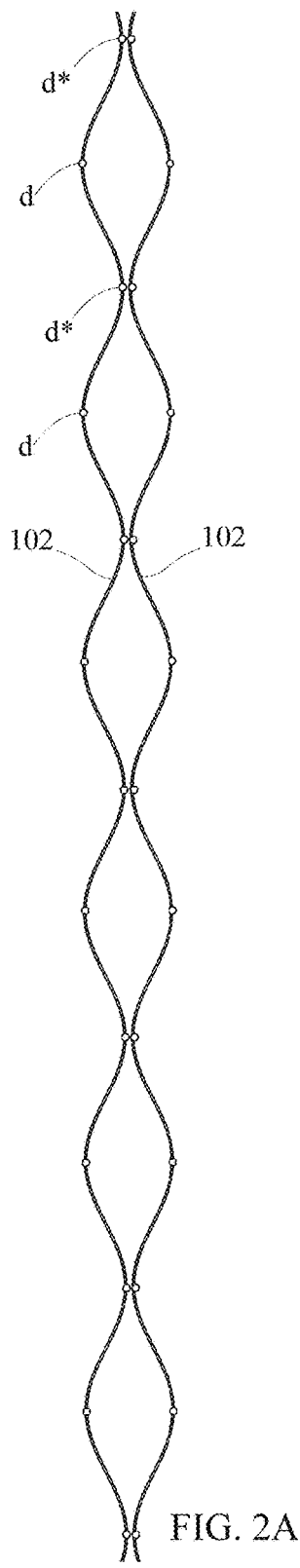
FIG. 2A depicts two sinusoidal shaped members oriented longitudinally to attach at their peripheral antinodes (d) leaving the distal antinodes (d*) exposed and unsaturated.

A minimum of two sinusoidal shaped members (102) must connect at antinodes (d,d*) (FIG. 2A) to form a structure. A sinusoidal structure/assembly and the parts that form it both have flexural strength.

Figure 2B:
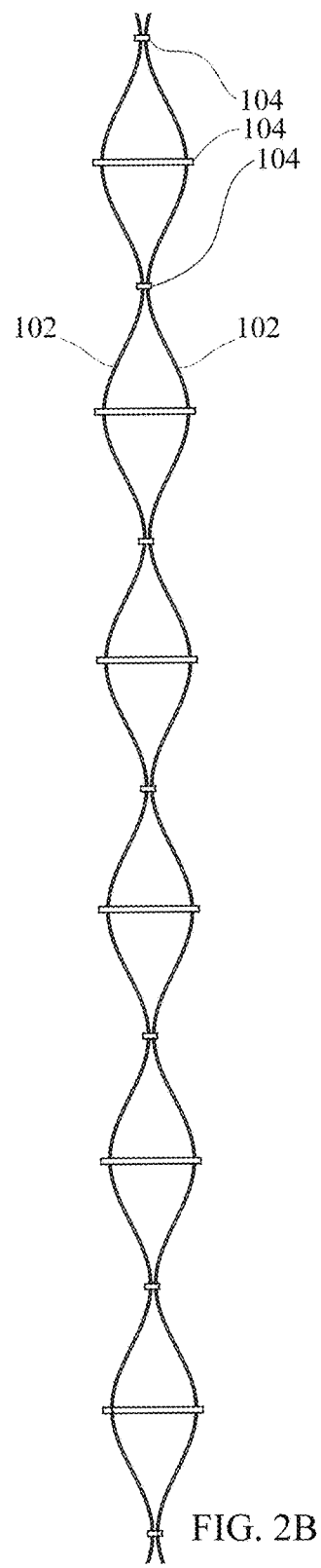
FIG. 2B depicts two sinusoidal shaped members (102) connected and supported one to another by support members (104).

For the sinusoidal shaped members (102) to maintain their shape and elastic potential energy they must combine with support members (104) as depicted in FIG. 2B. These support members connect the sinusoidal shaped members and are positioned at the sinusoids antinodes (d).

Figure 2C:
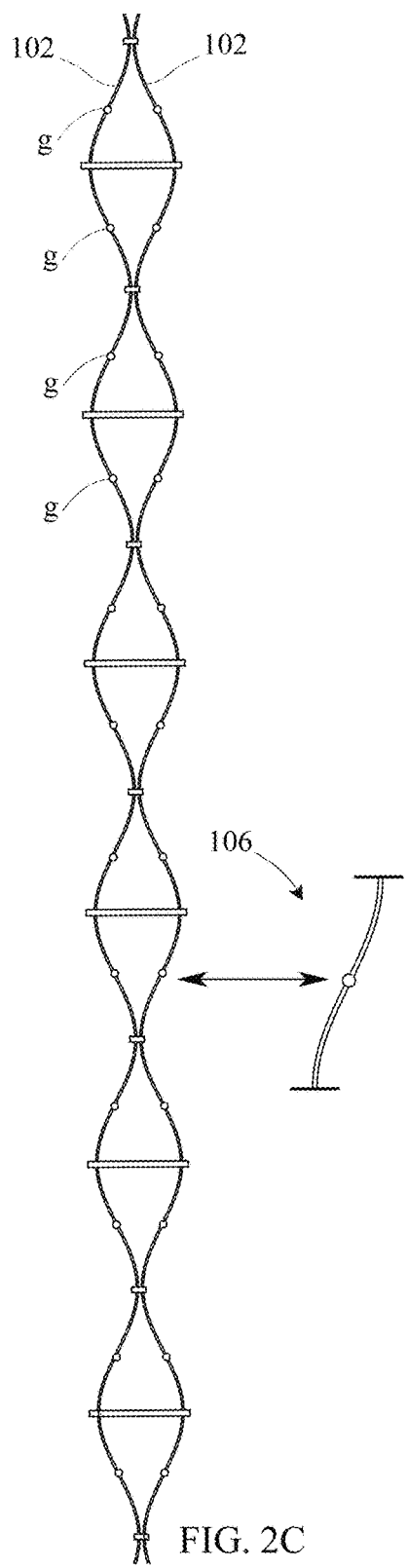
FIG. 2C depicts a simple pre-stressed sinusoidal structure (110) formed from two sinusoidal shaped members (102) and their associated support members (104) being composed of a series of flexures (106).

As depicted in FIG. 2C inflection points (g) exists between antinodes (d,d*) and helps to identify the flexures' (106) structural features along the length of the sinusoidal shaped member. The flexure's inflection point and sinusoidal shaped member's nodes (e) are synonymous.

Note: the support members and/or sinusoidal shaped members may incorporate complimentary methods of connecting during assembly. Such methods may be integrated into their material structure or may involve the use of discrete parts or materials such as clips, pins or adhesives.

Figure 3A:
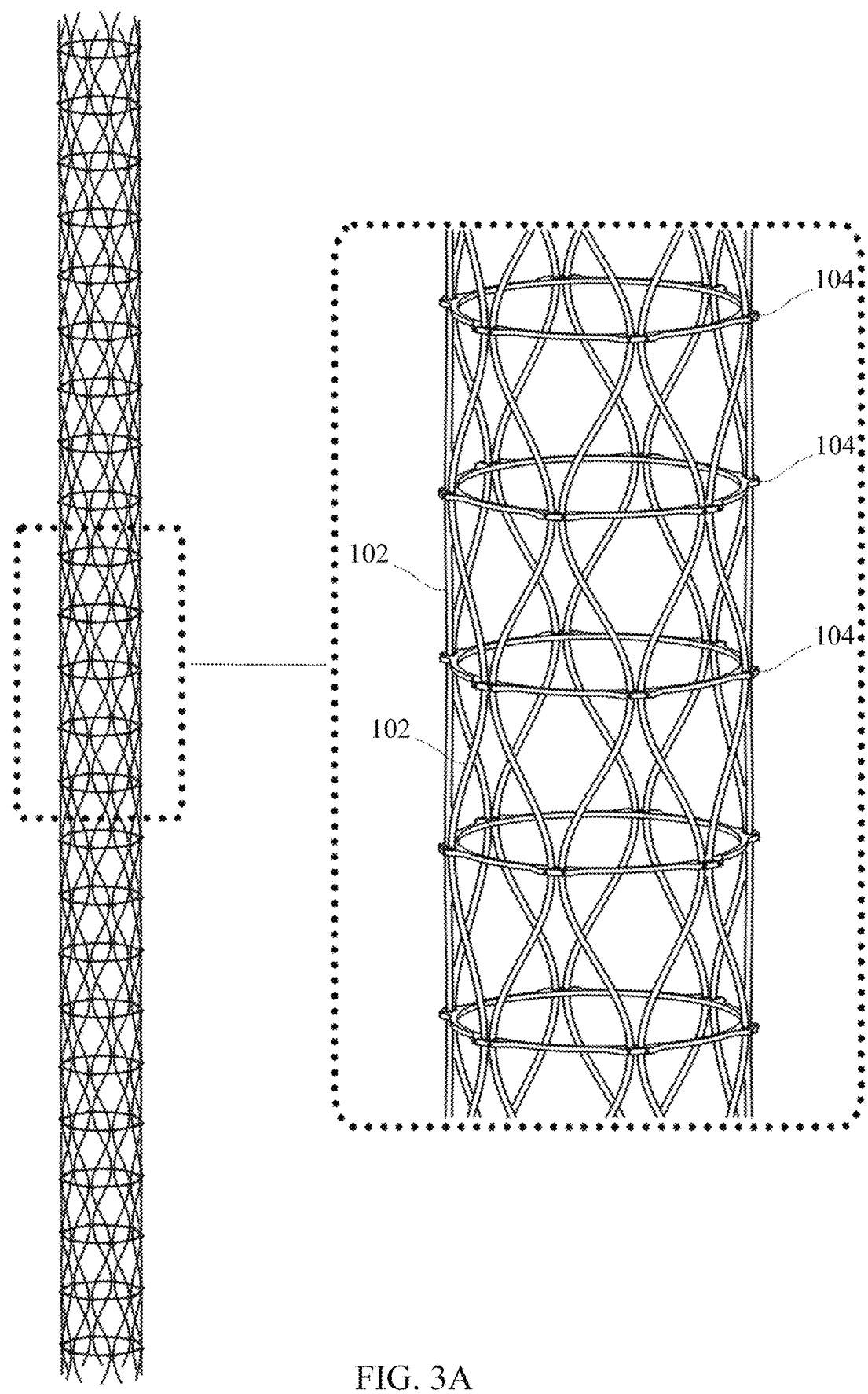
FIG. 3A depicts an exemplary pre-stressed sinusoidal structure (110) with the enlarged view detailing the longitudinally oriented sinusoidal shaped members (102) and n-gon support members (104) that are orthogonally oriented and evenly spaced.

FIG. 3A depicts an exemplary pre-stressed sinusoidal assembly (110) having a circular cross-section composed of twelve sinusoidal shaped members (102) having an equiangular n-gon orientation connected longitudinally at their anti-nodes (d) through n-gon shaped support members (104). This lattice structure is a flexural system composed of many flexures that transmit loads by way of a material's basic stress states; compression, shear and tensile.

Figure 3B:
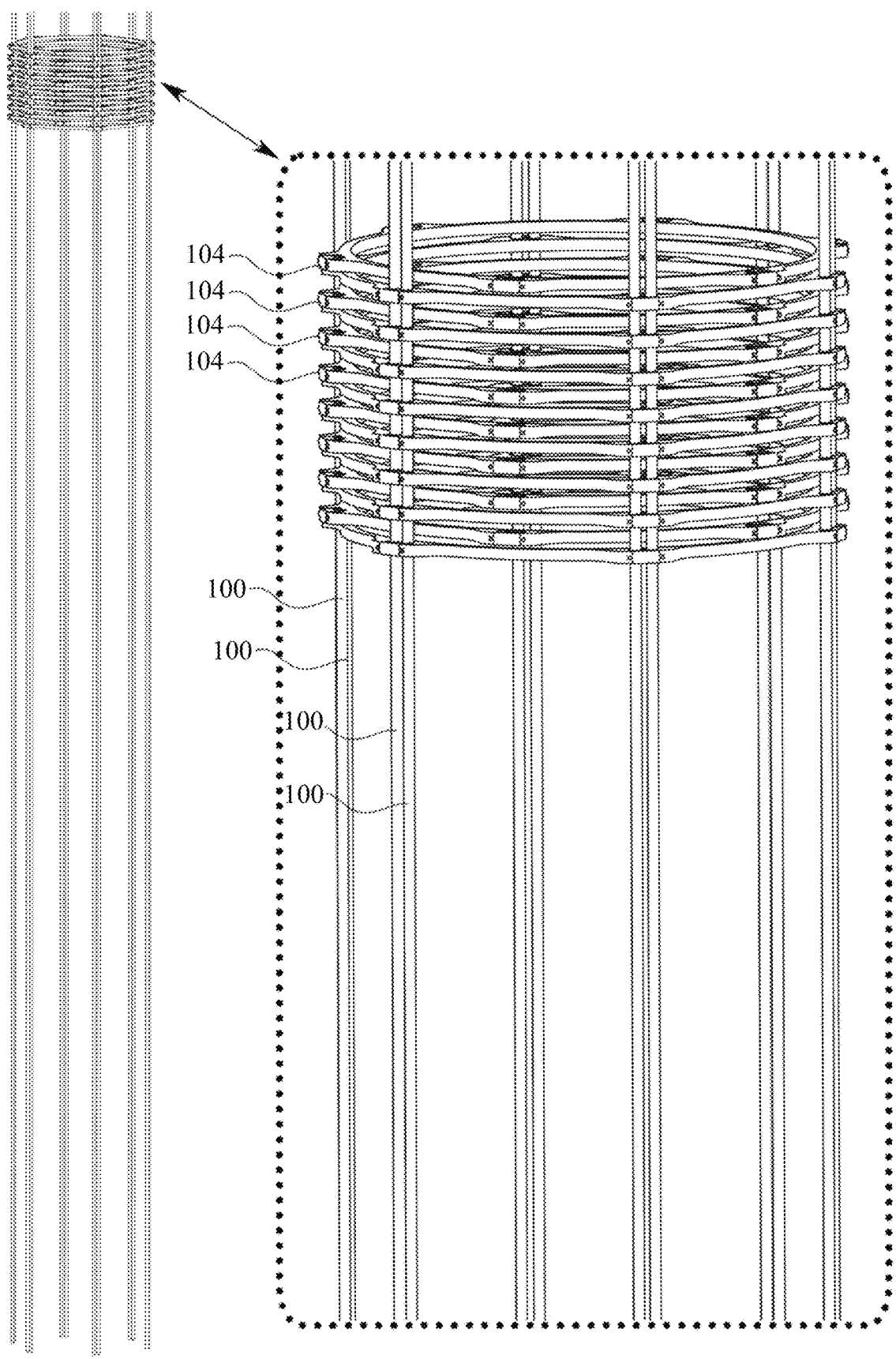
FIG. 3B depicts the orientation with an enlarged view of the relaxed members (100) and sinusoidal shaped members (102) as they could be prior to being connected and put under tension during assembly.

In FIG. 3B the said assembly's discrete parts (relaxed members and support members) are depicted organized as they could be prior to assembly. Note the twelve relaxed members may be any length and are formed into sinusoidal shaped members during an automated assembly process. The A-SEM manipulates, positions and attaches the support members (104) and relaxed members (100) to form a pre-stressed assembly of sinusoidal shaped members and support members.

FIG. 3A is one of many exemplary structures composing sinusoidal shaped members and support members. All possible species of structure assembled from sinusoidal shaped members and support members contain internal forces that originate from elastically deformed sinusoidal shaped members. The range of pre-stressed assembles/sinusoidal structures formed from sinusoidal shaped members and support members are described in U.S. Ser. No. 62/259,653.

Both the A-SEMs and the structures they produce have fundamental properties that are not altered by scale or complexity. A structure's scale, variety or number of component elements does not change the A-SEMs basic functions.

Sinusoidal shaped members in assembly transfer forces one to another through shared support members. The elastic potential energy (forces/moments) held within each elastically deformed sinusoidal member is opposed by other sinusoidal shaped members in assembly. The sinusoidal shaped members' interaction can be thought of as destructive interference. As sinusoidal members attach one to another at their antinodes through support members, forces act in opposite directions to form an assembly in static equilibrium. This interconnection and balancing or forces within the assembly allows its internal stress to self-distribute.

The distribution of an assembly's internal stress determines its shape. The pre-stressing forces/bending moments that go to form the sinusoidal shaped members have an accumulative effect that can cause the assembly to deflect.

Figure 3C:
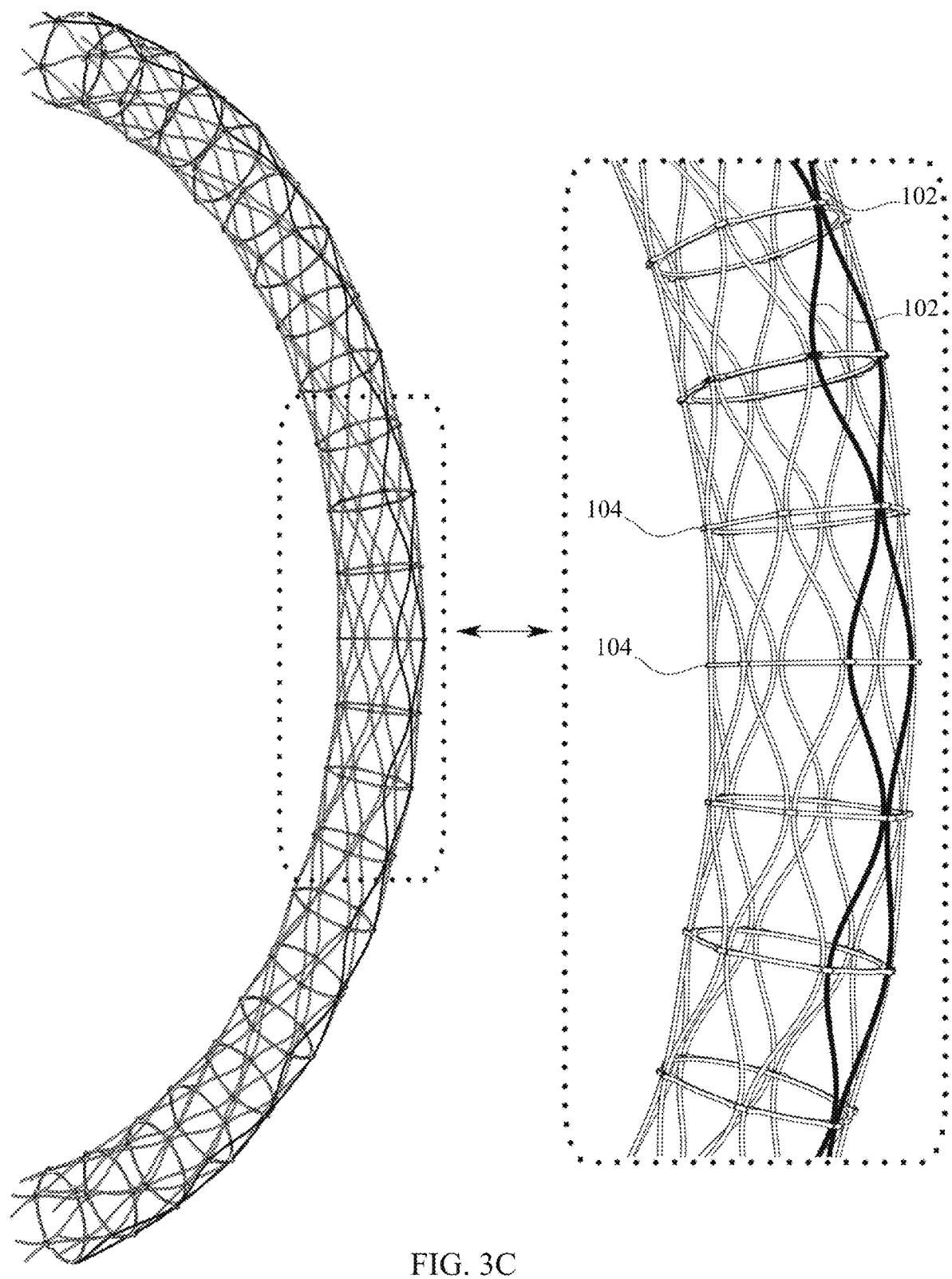
FIG. 3C depicts with an enlarged view an exemplary deflected pre-stressed sinusoidal structure (110) containing sinusoidal shaped members (102) formed from flexures (106) having differing amounts of stored potential energy and n-gon support members (104) that are non-orthogonally oriented.

An exemplary deflected assembly is depicted in FIG. 3C. The shaded sinusoidal shaped members (102) were placed under more stress during assembly than the non-shaded sinusoidal shaped members. Note: the pre-stressing forces are introduced into the assembly as the flexural elements are formed. Those flexural elements become flexures when they become part of the sinusoidal structure. The flexures lie along the flexural member's/sinusoidal shaped member's length and can be given varying degrees of stress during assembly and/or deployment, i.e., during their automated formation and/or deployment by the A-SEM, sinusoidal shaped members may be pre-stressed to varying degrees along their lengths. Each flexure making up a length of the sinusoid can be pre-stressed by force and/or moments and contain a different elastic potential energy. Bending and twisting moments, axial, lateral and torsion force may be applied to the flexural elements by the A-SEM during the flexures' formation.

Flexural pre-stressing is a novel method of utilizing a material's superior flexural properties to build superior structures having flexural properties.

A sinusoidal structure composed of meta-materials having controllable elastic modulus would form a network of actuatable flexures capable of controlling the sinusoidal structure's wave parameters and its stress profile on command. The sinusoidal structure would also function as a signaling and power transmission network to control the individual flexure's behavior.

A-SEM General Description

The A-SEM can incrementally extrude/deploy scalable flexural systems for structural and/or mechanical applications. This size and range of applications may include large gossamer space frames to compliant mechanisms used in micro-electromechanical systems.

The fundamental A-SEM embodiment additively assembles connectable parts to form pre-stressed assemblies composed of sinusoidal shaped members and support members. Such A-SEM embodiments may use pre-manufactured support members and relaxed material members having length, cross-section and flexural strength to form high performance structures composed of sinusoidal shaped members and support members. The structures formed by the A-SEM are flexural systems. Such flexural systems are elasto-kinematic and may have many degrees of freedom.

Elasto-kinematic analysis could be used to study the motion of flexural systems by using "flexible bodies" rather than rigid ones. In a pure kinematic analysis, the structural deflections of the members are not taken into account. In an elasto-kinematic analysis these are taken into account.

Various A-SEM embodiments may have components that function actively or passively to varying degrees within the scope of the invention. The embodiments to be described provide an illustrative framework that may guide refinements of other systems used to assemble/form sinusoids into pre-stressed structural systems.

Specific requirements related to the assembly/deployment process must be fulfilled by any system used to form a pre-stressed sinusoidal structure/flexural system.

The A-SEM preforms two basic functions: #1 is to guide and reversibly form elastic material members into sinusoidal shaped members having stored elastic potential energy. #2 is to reversibly extrude/deploy and reversibly maintain the sinusoidal members' shapes in an assembly using support members.

The stress imposed on a relaxed member by the A-SEM to form a sinusoidal shaped member is fundamental to the assembly process. In a kinematic sense the geometry of the sinusoid's mathematical curve determines the level of stress held within the sinusoidal shaped member. A sine wave is a continuous wave and a sinusoidal shaped member is formed from a continuous piece of material, both store potential energy. The sinusoidal shaped members in assembly are periodic structures that exhibit sine wave parameters as amplitude and wavelength.

Physical wave parameters are variables used by the A-SEM to gauge the level of stress placed on the relaxed member as it forms a flexural element. By modulating the deformation of each flexural element as it is formed, the A-SEMs' assembly process determines the elastic potential energy stored along the length of the sinusoidal shaped member. A relaxed member is a compliant (flexible) member.

The relative positioning and orientating of the support members by the A-SEM can be fundamental in determining the wave parameters of the sinusoidal shaped members within the assembly.

Structures and mechanisms formed from sinusoidal shaped members have periodic dimensions that are reflected in the assemblers' (the A-SEM) engineering design and also in the methods of mechanical or computer-controlled timing methods employed during assembly. Timing methods may utilize drive mechanisms (218) like tracks, guides, gears, belts, flickers, along with processor-controlled actuators. Mechanical timing methods and other component mechanisms may be driven actively and also passively.

Active A-SEM component mechanisms are exclusively driven by electromechanical prime mover power source(s) and use position-controlled actuation that may require a computer processor.

Passive A-SEM component mechanisms are driven by elastic potential energy transfer and/or energy harvesting from the materials used to form the sinusoidal shaped structure. Elastic potential energy results from the deformation of an object's shape. It results when an elastic object is stretched or compressed. Component mechanisms may also be driven by external forces to draw the material through the A-SEM as depicted in FIGS. 12A-D.

The mechanisms and timing methods composing A-SEM embodiments may be individually driven actively and/or passively.

The A-SEM's component mechanisms may be driven by the elastic potential energy stored in packed and deformed material that is held in and released by the parts feeder. Elastic potential energy may be used to shape and passively deploy a sinusoidal assembly.

The parts feeder holds the material parts used to form the sinusoidal structure. The parts feeder (204) is the component part that is fundamental to all A-SEM embodiments.

The parts feeding function may include mechanisms that are actively or passively driven, in that a part(s) may be positioned or formed using stored elastic potential energy and/or an external power source.

Material parts are stored locally in the parts feeder, in a magazine cartridge, within a reel or geometric stack of components. Parts may also be stored remotely in a hopper type of system or within a pultrusion device or 3d printer to supply the A-SEM.

A pultrusion device and/or 3d printer could be integrated into the parts feeder or remotely supply material and/or multi-material parts to the A-SEM. The 3d printer would likely form the support member components and the pultrusion device the sinusoidal members.

An A-SEM embodiment designed to meet the engineering requirements to form a sinusoidal assembly/structure may be actively or passively driven and range from simple to mechanically complex.

A simple A-SEM embodiment may use elastic potential energy to self-deploy its sinusoidal assembly/structure as a unit or may use a single prime mover such as a motor to actively drive the mechanism through the stepping process while a series of mechanical timing mechanisms or electrically controlled actuators drive the assembly, attachment and extrusion processes.

Other A-SEM embodiments may have greater functionality and incorporate computer-based control and sensing systems capable of actively modulating the flexural elements' formative processes and the positioning of the support members during assembly.

A-SEM embodiments capable of reversible assembly/reversible deployment of a sinusoidal structure may reconnect to a structure that has been previously formed. It may also remain permanently attached to the structure to provide indefinite and customizable reversible deployment behaviors.

A-SEM embodiments having component mechanisms that move reciprocatively along its longitudinal axis can resemble the behavior of a loom. Many A-SEM embodiments will occur to one of ordinary skill in the art and are all within the scope of the invention.

Example A-SEM Embodiment 1

An exemplary A-SEM embodiment and possible variations to its assembly/deployment process are depicted in FIGS. 4-10. This A-SEM embodiment integrates part feeding, locomotion, and chassis components into one system. All the mechanical assembly operations and power transmission are internal to the A-SEM and integrated. The A-SEM's components may be orthogonally aligned; other embodiment variations may have different degrees of functionality and contain mechanisms and parts having non-orthogonal alignment.

Figure 4A:
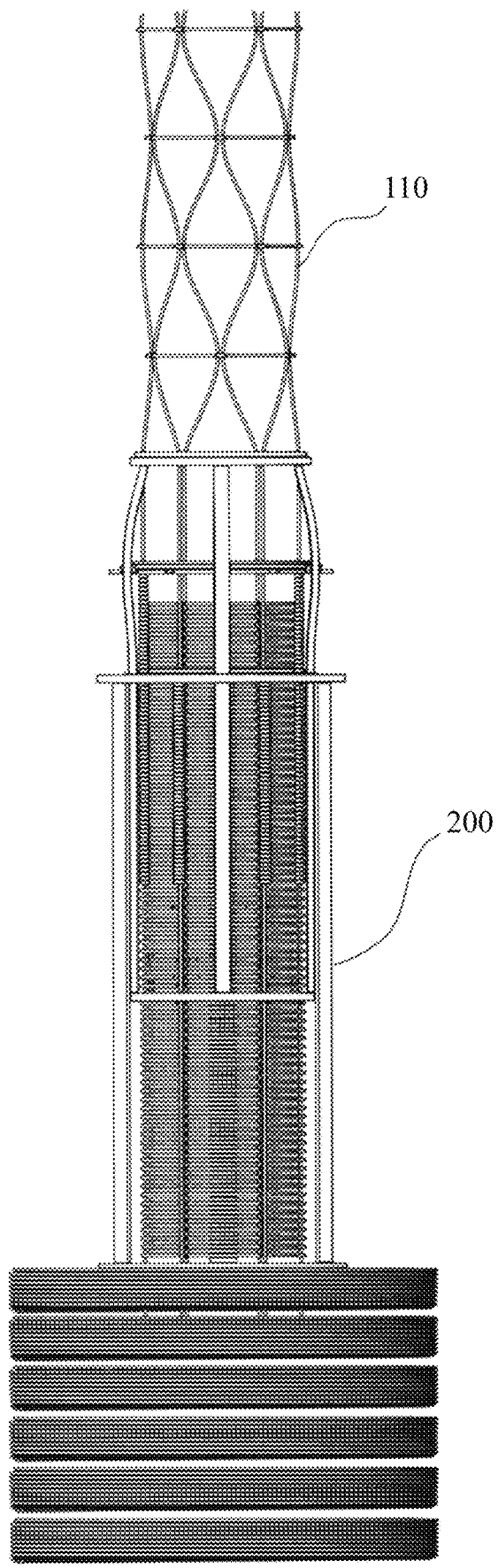
FIG. 4A is an orthogonal view of an A-SEM (200) embodiment that assembles support members and relaxed members to form a pre-stressed sinusoidal structure (110) containing stored elastic potential energy.
Figure 4B:
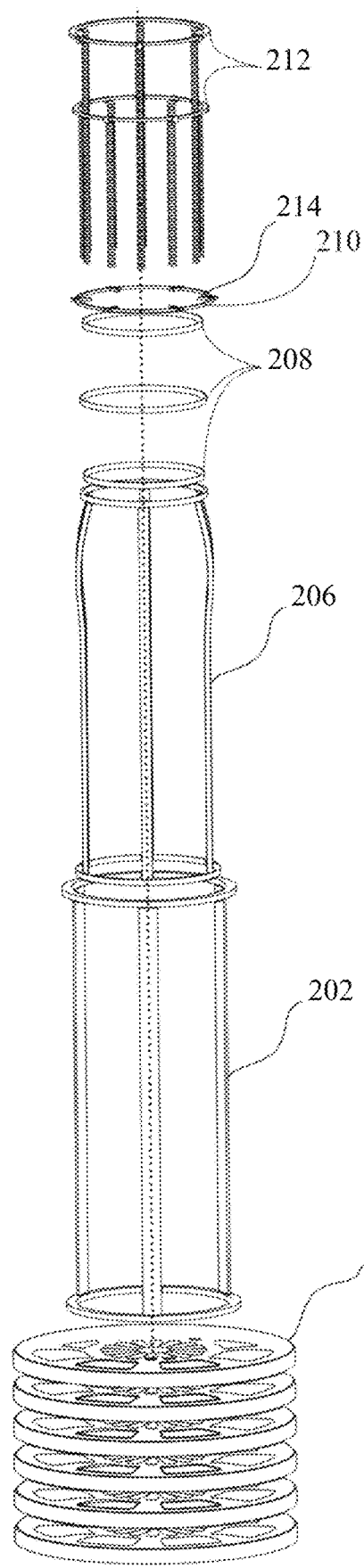
FIG. 4B is an exploded view of an A-SEM's component parts and how those parts are oriented along a longitudinal axis.
Figure 4C:
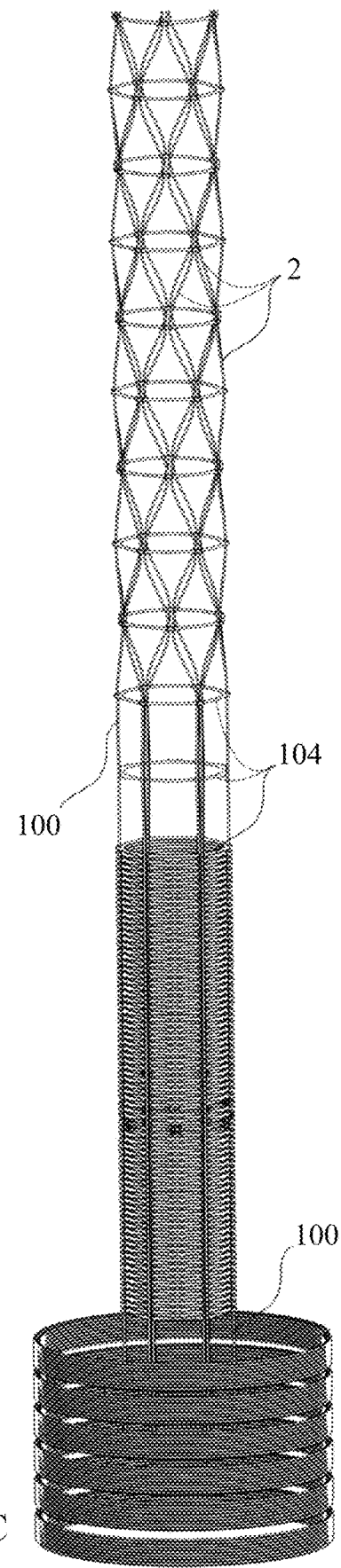
FIG. 4C depicts the material parts used by the A-SEM and the way those parts are organized before and after they are assembled into a pre-stressed sinusoidal structure.

The said A-SEM (200) embodiment and sinusoidal structure (110) are depicted in FIGS. 4A-C. The A-SEM and the sinusoidal assembly's parts integrate to deploy/extrude a sinusoidal structure (FIG. 4A). The assembler's (the A-SEM's) locomotion and actuation systems may be driven by passive or active means. Active systems are driven by an internal electrical power source, passive systems are not.

FIG. 4B depicts these integrated mechanical systems in exploded view aligned with a chassis. A chassis (202) supports and guides many of the A-SEMs' component parts and mechanisms. A chassis can support and guide a parts feeder (204) and a machine assembly (206).

The parts feeder (204) can be attached to a chassis. The parts feeder acts as a parts reservoir and also acts to guide and introduce parts that include support members and "relaxed" members. These parts are stored in magazines, reels or hopper type of systems. These parts may store elastic potential energy when their deformed material is held in the parts feeder.

The machine assembly (206) can actuate within the chassis. The machine assembly contains various mechanisms that position support members (104), apply axial and/or lateral forces to relaxed members (100) and attach the unit parts together. The mechanisms within the machine assembly may include support member carriers (208), lateral force mechanisms (210) and an intra-structural attachment mechanism (212). Note: this A-SEM embodiment's lateral force mechanism applies lateral force and resulting bending moments at a right angle to a specific region/point along the length of the relaxed member.

Support member carriers (208) are actuatable, they move and position the support member within the machine assembly. The lateral force mechanism (210) is also part of the machine assembly; it applies lateral force/bending moments to the relaxed members and positions them for attachment to the support members. The intra-structural attachment mechanism (212) then applies secondary fastener components. Note: fastener components may not be required if interlocking or press fit mechanisms are used, also adhesives may be used alone or in conjunction with fastener components. Fastener components may include and attach to locking features (109), for example embossed regions along the flexural members' length.

FIG. 4B depicts the assembler's (A-SEM's) component parts and FIG. 4C depicts the materials it uses to form pre-stressed sinusoidal structures. The A-SEM's component parts are oriented to locomote and actuate along the chassis longitudinal axis.

In this embodiment the chassis and machine assembly move and actuate as individual units. In other embodiments the chassis and machine assembly may move as a single unit.

Figure 5B:
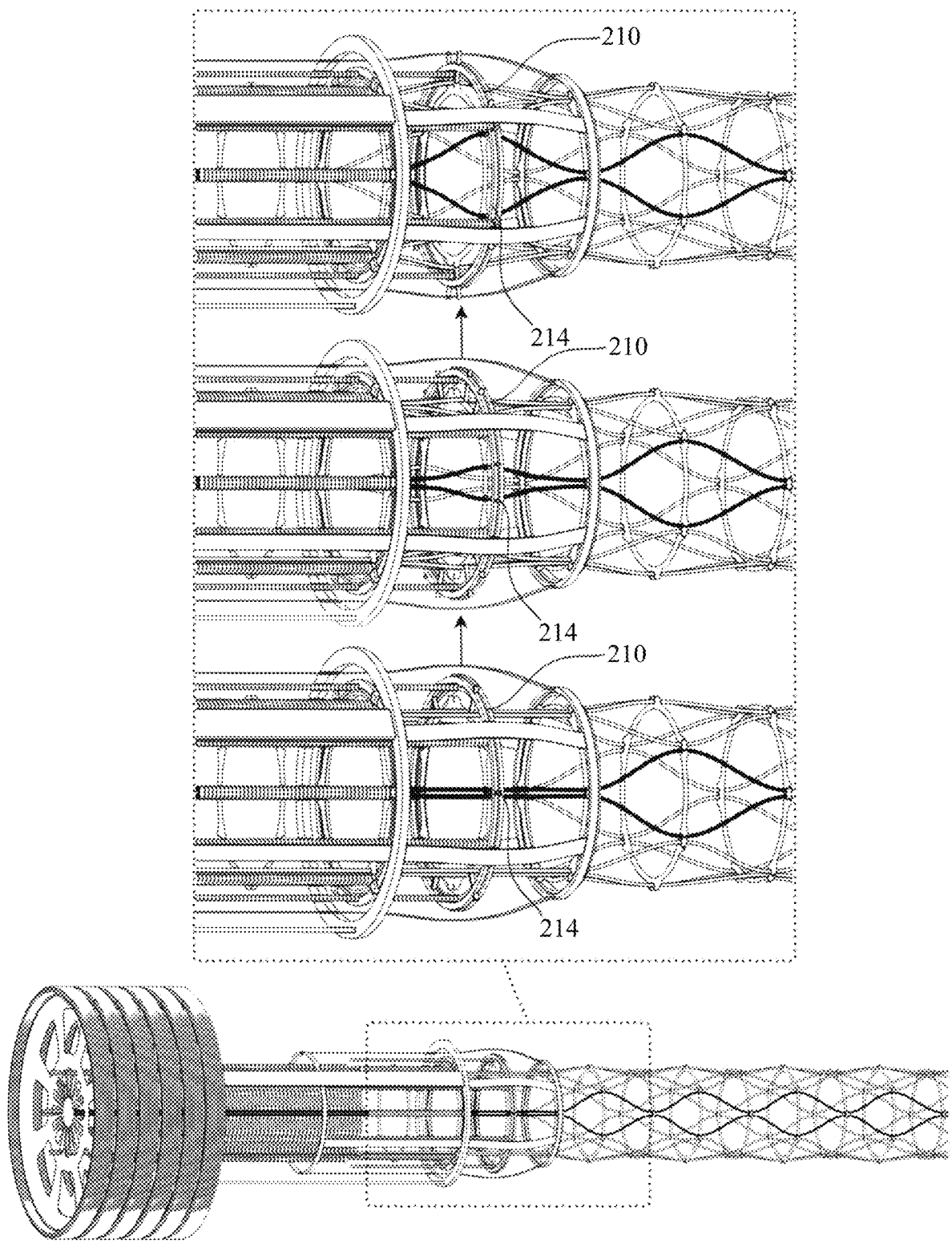
FIG. 5B depicts perspective views with an enlarged view of an A-SEM embodiment applying lateral force and bending moments sequentially as regions of relaxed members are positioned during the assembly of a sinusoidal structure.
Figure 5C:
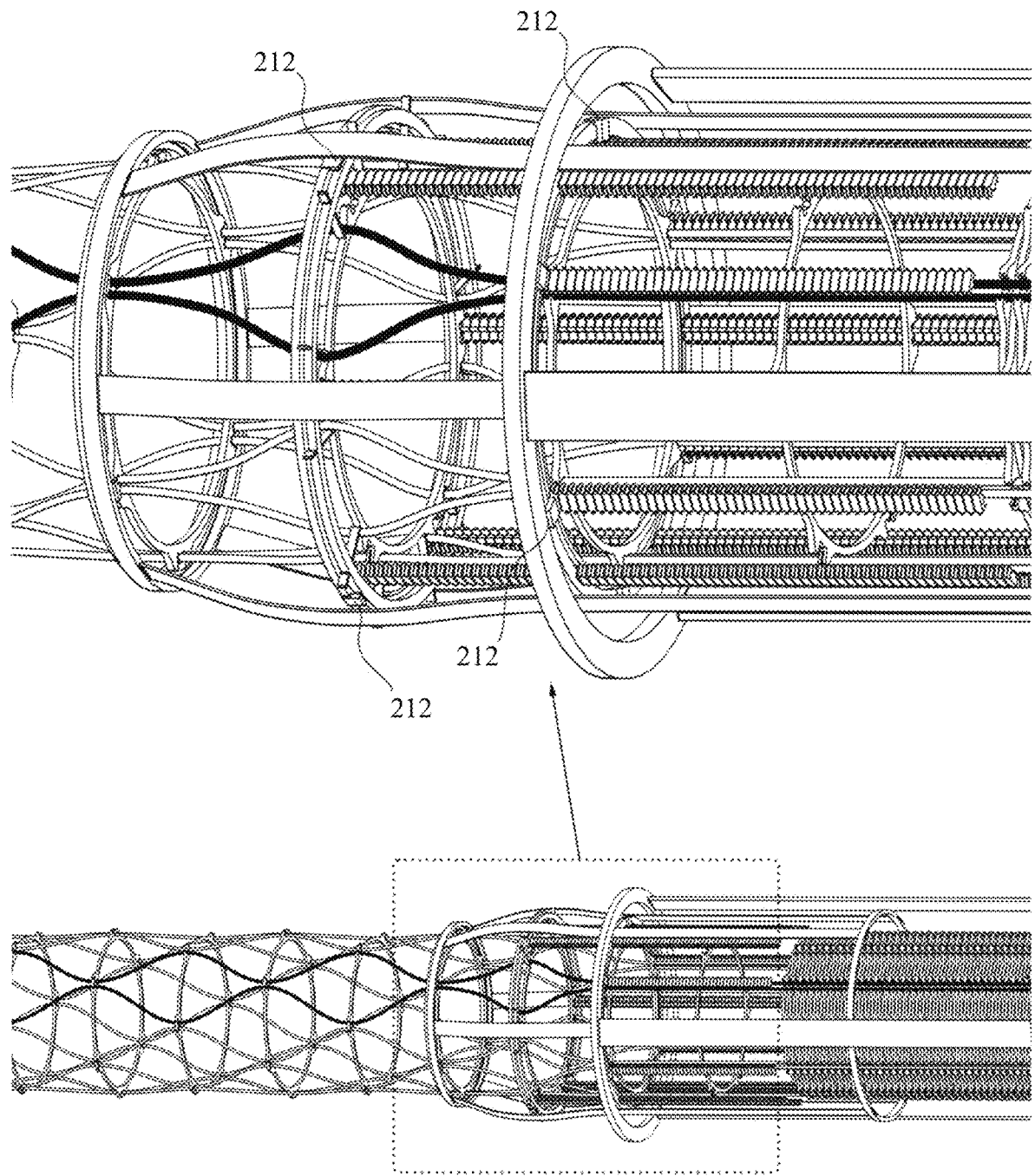
FIG. 5C with an enlarged view depicts a press fit attachment mechanism that incorporates complementary component parts that surround a region of the sinusoidal shaped member and attach it to its associated support member, securing one to another.

FIGS. 5A-C depict the A-SEM sequentially positioning support members and applying bending moments to relaxed members 1λ at a time. This corresponds to the reciprocal motion of the A-SEM's components. The 1λ region of the sinusoidal shaped member may include two contiguous flexural elements as depicted in FIG. 1C. Various A-SEM embodiments may apply moments to deform material to form a member's wavelengths and amplitudes. A-SEMs may apply axial, lateral and torsion force to the flexural elements during assembly.

In FIGS. 5A-C the chassis (202) and machine assembly (206) move reciprocatively as the pre-stressed assembly is incrementally formed. The lateral force mechanism (210) applies force to deform and positions the relaxed members (100) to bind/connect with the support members (102) resulting in coordinated locomotion and a 1λ incremental increase in the sinusoidal shaped members' length. This increase in length through the locomotion and actuation within the chassis denotes an extrusion event. An extrusion event corresponds with and is initiated by the reciprocal motion within the A-SEM.

In FIG. 5A the machine assembly extends axially from within the chassis to draw a region of the relaxed material members from the parts feeder. This region of the relaxed material members is positioned and exists between the support member carriers (208). The actuation/extension of the machine assembly within the chassis is longitudinal (axial) and may follow a guide assembly driven by a worm gear(s) or rack and pinion(s).

FIG. 5B is a progressive sequence depicting the lateral force mechanism (210) applying bending moments to a newly positioned relaxed member region. This process may occur sequentially 1λ at a time along the length of each sinusoidal shaped member. Actuator fingers (214) are mechanically or electrically driven to follow a path within the lateral force mechanism. (210). The fingers make physical contact with and guide the lateral deflection of each relaxed member to form flexural regions of a flexural member.

The actuator fingers also position the relaxed deflected members for subsequent attachment to support members (104). FIG. 5C depicts a type of intra-structural attachment mechanism (212) that physically connects relaxed deflected members to a support member. In this embodiment complimentary secondary attachment components are received by support members to join with flexural members/sinusoidal members. Various other permanent and reversible methods of attachment including elastic couplers, press fit and adhesives may be used.

The mechanical timing of all other mechanisms within the machine assembly may be integrated and driven actively by a prime mover(s), worm gear(s), rack and pinion or tracks. Electrical timing via processor-controlled actuators is also possible.

FIG. 5A-5C depicts the exemplary A-SEM's chassis (202) and machine assembly (206) pushing against the completed sinusoidal structure (110) to extrude and draw relaxed material member feed that is then placed under stress, deflected, positioned and attached to support members to become newly completed structure. In this example the parts feeder behaves passively as material is pulled from it. The parts feeder may also actively extrude material applying axial force to the member during assembly. The parts feeder may also passively extrude material through the release of elastic potential energy held within its deformed material(s). The parts feeder may also torsion the members.

As the machine assembly travels within the chassis the support member carriers (208) sequentially position support members to receive the deflected flexural members.

Figure 6A:
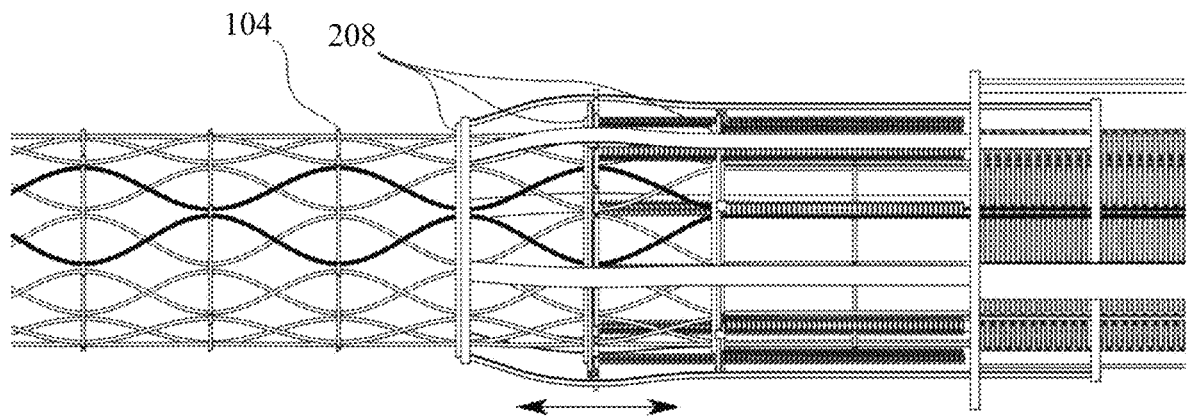
FIG. 6A is a side view of an A-SEM embodiment with support members that are being positioned equidistant within the machine assembly by the support member carriers.
Figure 6B:
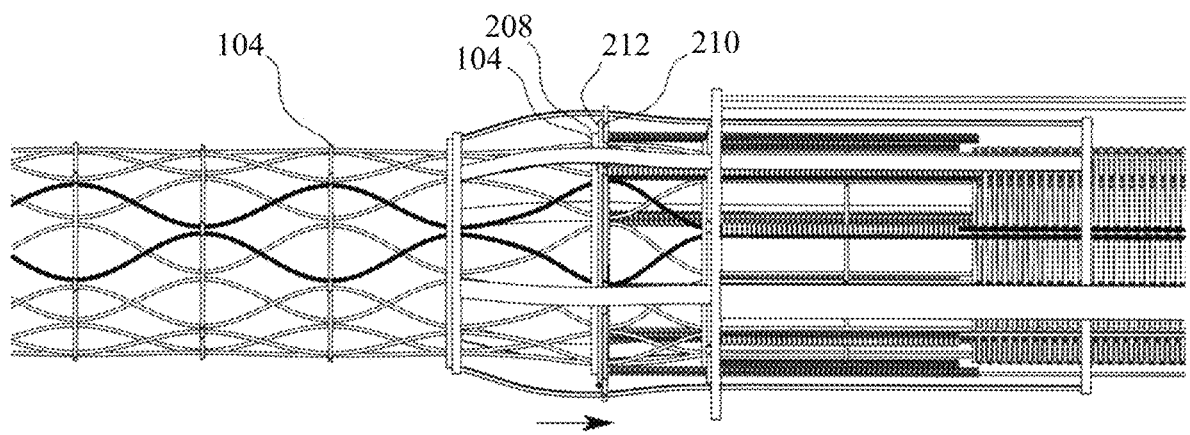
FIG. 6B is a side view of an A-SEM embodiment with support members that are being positioned irregularly within the machine assembly by the support member carriers to form a positively skewed region within sinusoidal shaped members.
Figure 6C:
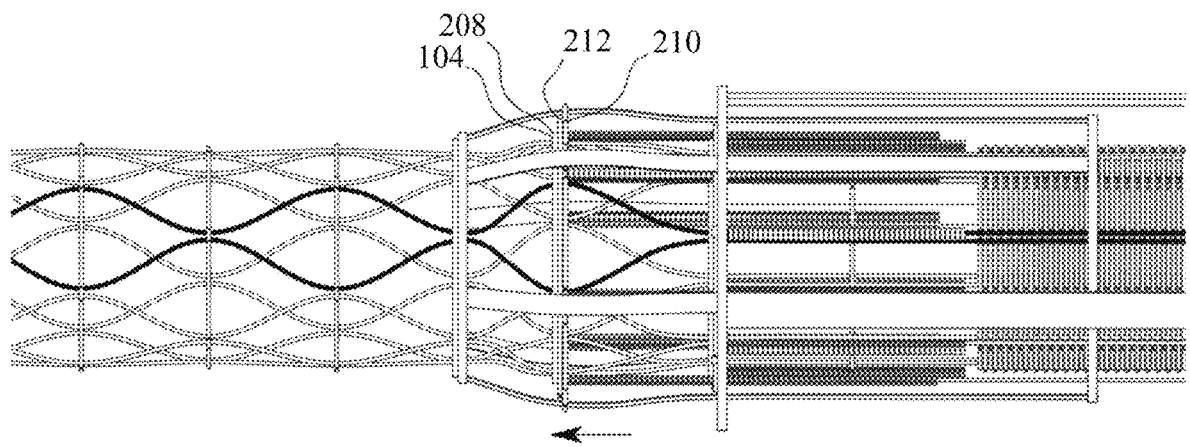
FIG. 6C is a side view of an A-SEM embodiment with support members that are being positioned irregularly within the machine assembly by the support member carriers to form a negatively skewed region within sinusoidal shaped members.

The A-SEM embodiment in FIG. 6A depicts the sinusoidal structure's support members being positioned identically and equidistant, one at a time along its length. FIGS. 6B-C depict an A-SEM forming a structure having irregular periodic support member spacing.

Support member carriers (208) position support members (104) to combine with deflected relaxed members to form flexural regions (f) in as small as $\lambda/2$ increments. As depicted in FIGS. 6A-C $\lambda/2$ flexural regions can exist between support members. FIGS. 6B-C depict the orthogonal oriented support members being spaced irregularly to form skewed waves. FIG. 6B depicts positive skewing of the sinusoid. FIG. 6C depicts negative skewing of the sinusoid. The level of skewedness depends on the relative position of the adjacent support members. Support member spacing and orientation are variables that can be used by A-SEM embodiment variations having high levels of functionality. The flexural elements and/or flexures that form the skewed region of the sinusoidal shaped member have flexural properties that are unlike non-skewed regions of the sinusoidal assembly.

Flexural regions are punctuated by support members and composed of flexural elements during their assembly. During assembly the formation and properties of flexural elements can be modulated by actively applying forces and moments to the relaxed members.

The deflected region of the relaxed member becomes a flexural element whose material now contains stored elastic potential energy. Axial forces may be applied to the flexural elements through an active part feeding mechanism or other actuatable components and mechanisms within the A-SEM. The source of the axial force can also be potential energy stored in the material used to form the assembly. This material can be held in the parts feeder.

As lateral and/or axial forces are applied to a relaxed member an inflection point forms. At this point the forces have caused second order bending moments to the flexural member. Axial forces are applied by compressing the member axially through mechanical or electrical actuation within the A-SEM. This axial force can be predetermined or adapted by computer-based control systems. Axial force can be applied to the member at the level of the flexural element during assembly. The smallest region of a sinusoidal shaped member able to receive axial compression during its formation is $\lambda/2$. Axial compression is applied to the flexural elements during assembly. When the flexural element becomes attached to, and supported by, support members it becomes a flexure and part of the structure/flexural system.

Figure 7A:
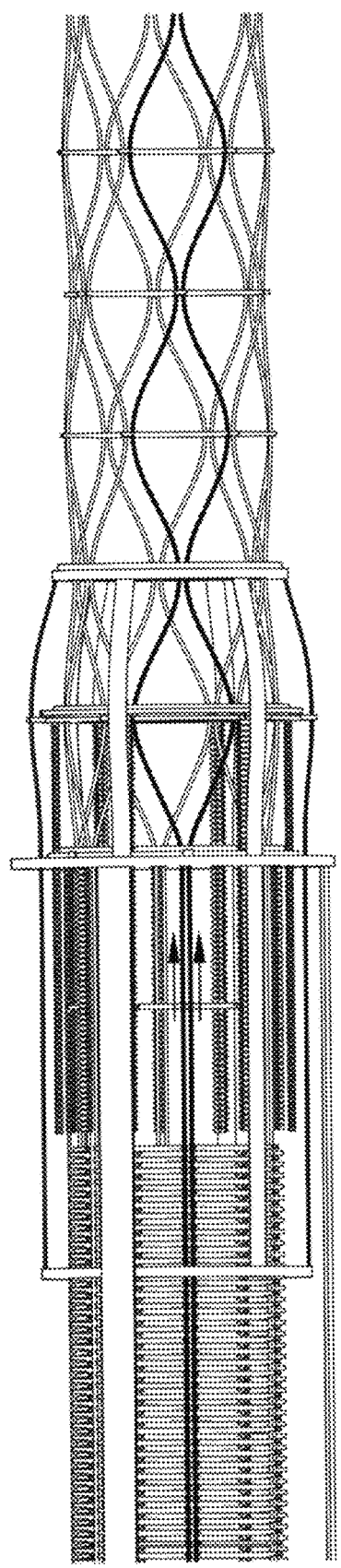
FIG. 7A is a side view of an A-SEM embodiment applying axial compressive force to relaxed members during the assembly of a sinusoidal structure.
Figure 7B:
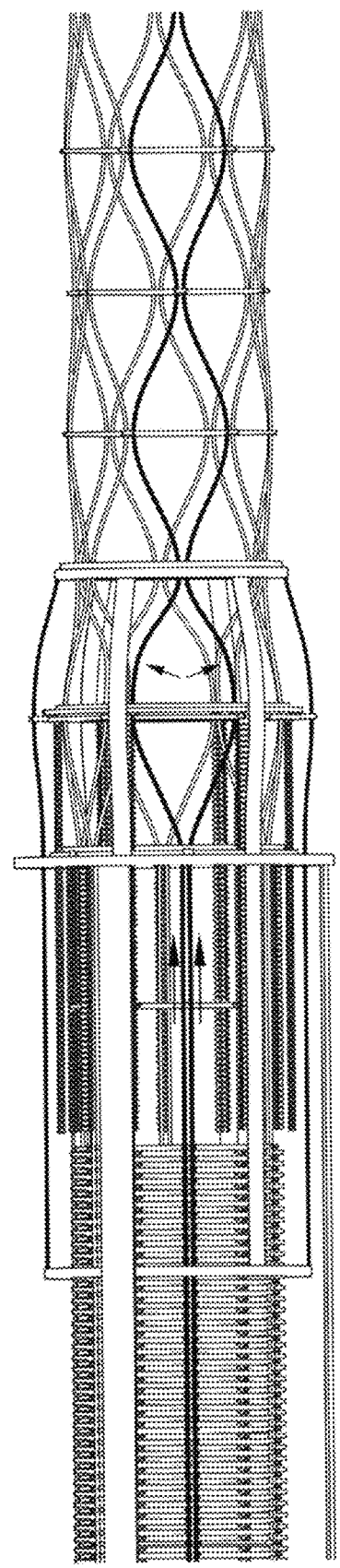
FIG. 7B is a side view of an A-SEM embodiment applying axial force to relaxed members during assembly and that force resulting in the increased deflection of a region of the flexural member.

FIGS. 7A-B depict an A-SEM embodiment applying axial force to flexural elements during assembly. In this embodiment the lateral force mechanism (210) applies moments to position the relaxed members for subsequent attachment to support members (104). Axial force/axial compression may also be applied to each relaxed member/flexural member by mechanical means. FIG. 7A depicts axial force being applied to the relaxed members prior to any secondary effect (additional deflection) to the flexural elements. The axial force transmits along a relaxed member's length as it becomes a flexural member, wherein the force passes beyond the recently positioned support members to be applied to the next (previously formed) flexural element causing its further deflection. FIG. 7B depicts that resulting secondary deflection/bending of the flexural element. Notice the force arrows depicting the application of axial force/compression and the resulting buckling/lateral movement/secondary bending.

Flexural elements and flexure elements are fundamental and cannot be separated into parts. Flexural elements exist during assembly and they become a flexure/flexure element after they become part of the sinusoidal structure and share their elastic potential energy with the rest of the flexural system. A flexural element or flexure can be a slender beam or simple flexure and can be considered a spring that can store elastic potential energy. The flexural elements produced during the assembly process are formed sequentially and become the contiguous flexure elements that form the path of the sinusoidal shaped member. When a flexural element is fully formed and becomes part of the assembly/structure, it is considered a flexure because it is a functioning component of the sinusoidal assembly.

Each flexure can be thought of as a quantity of stored elastic potential energy. The stored potential energy a flexure element contains at the time it becomes part of an assembly and the energy required to elastically deform a relaxed member region into its "sister flexural element" equate. The potential energy contained in a flexural element is the only quantitative increment/unit of potential energy that can be inputted into an assembly during the automated assembly process. The amount of elastic potential energy stored in a flexural element is controllable during the assembly process.

The automated process of shaping relaxed members into sinusoidal shaped members and the assembly of the flexure networks they form is controllable. The lateral forces, axial forces and twisting force applied to the flexural members and the positioning of the support members are controllable parameters that can determine the flexure elements properties and therefore the flexure system's properties. Active and passive control mechanisms may modulate the properties of each flexure/flexure element as it becomes part of the assembly/structure. The A-SEM controls the flexural properties of the flexure networks/systems it produces.

Each completed flexure element/flexure has a prescribed material displacement and contains a quantity of elastic potential energy. That elastic potential energy may equal the energy that was required to deform the material composing the flexure. After the flexure is formed its potential energy becomes part of the assembly and is shared within the assembly. The series of individual flexures that form the sinusoidal shaped members are the units of potential energy that interconnect to form a sinusoidal structure's distribution of internal stress (stress profile).

A stress profile is formed from the assembly's many interconnected flexures. A specific stress profile (stress tensor field) can be created during the assembly process. A structure's stress profile can mirror its possible deflection.

The structure's internal stress profile and its deflection characteristics are extrudable/printable. The A-SEM can be thought of as a stress printer through the application of forces and moments at the material level of the flexure and the structure, i.e., the A-SEM prints using units of stored elastic potential energy in the form of flexure elements to build a flexure system/network that forms an elastic potential energy composite profile. As the structure is being formed, internal forces may be applied that respond/adapt to external loads and forces like gravity.

The A-SEM can be used to build compliant mechanisms and compliant structures. The difference in the two is based on application, scale and level of complexity.

The A-SEM is a comprehensive integrated system that connects discrete support members to the sinusoidal shaped members as they are being formed from relaxed members. The shaping of the relaxed members to form sinusoidal shaped members and the positioning and attachment to the support members can be mechanically timed which is aided by the periodic nature of the assembly process reducing the need for a computer-based control systems. The A-SEM's mechanisms could also be electrically timed through a computer interface that could allow adaptability and greater functionality.

A-SEMs having greater functionality may incorporate mechanisms and methods that actively simulate the behavior of and modulate the properties of flexural elements during their formation. The pseudo-rigid body model (PRBM) is such a method of simulation. The PRBM utilizes rigid-body mechanism theory to provide a method of modeling the nonlinear deflection of flexible beams. The A-SEM may incorporate PRBM mechanisms to adapt, optimize and integrate the properties of flexural elements during the structure's assembly and/or deployment.

Figure 8A:
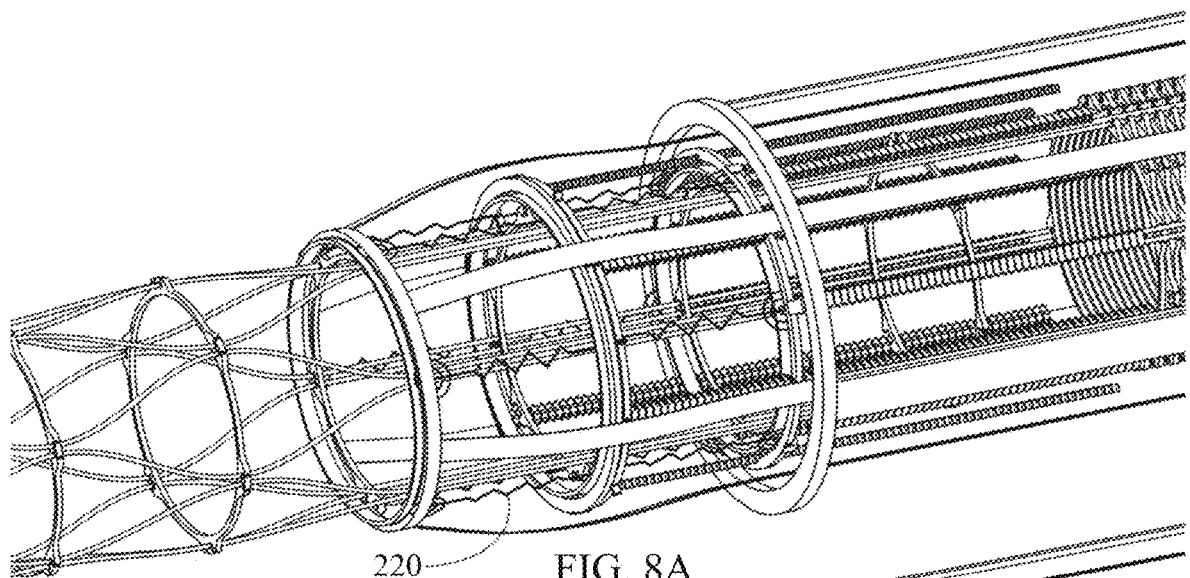
FIG. 8A is a perspective view of an A-SEM embodiment that incorporates the PRBM to simulate the flexural properties of the flexural elements by using rigid-body joints, links, and torsion and extension springs, that have equivalent force deflection characteristics.
Figure 8B:
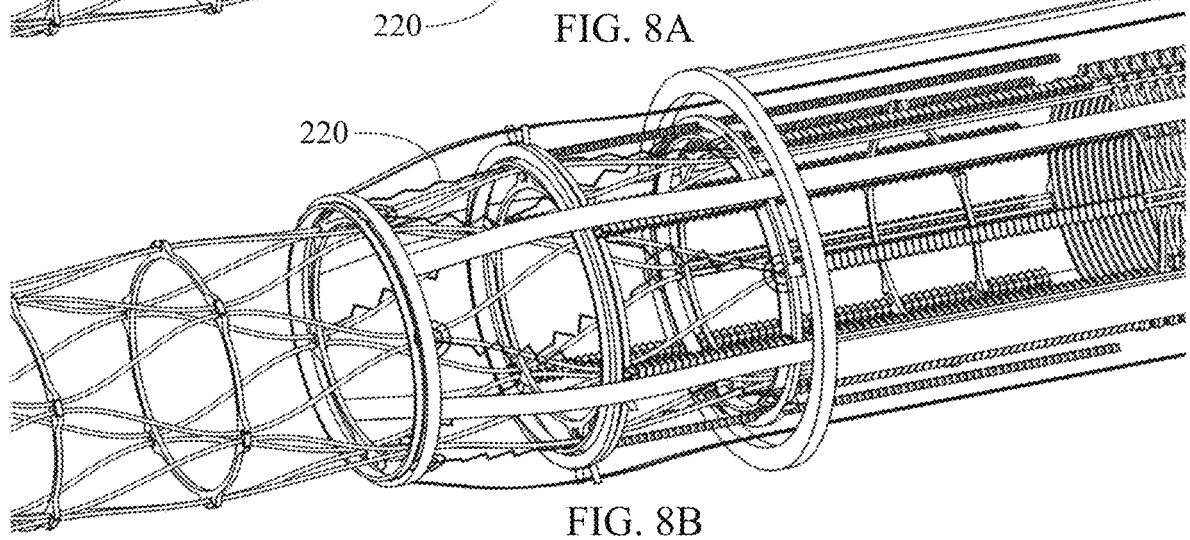
FIG. 8B is a perspective view of an A-SEM forming/shaping flexural elements and its associated PRBM mechanism being similarly deflected and therefore simulating the flexural properties of the flexural elements.

FIG. 8A-B depicts a method of integrating a plurality of PRBMs (220) into an A-SEM embodiment. Each PRBM is shown positioned to model its associated flexural element. The information from one PRBM can be shared to affect the other flexural elements being modeled and formed at the same time through a specially adapted computer program, i.e., the PRBM's within an A-SEM may be functionally integrated. FIG. 8A depicts the relaxed members/flexural members as undeflected. In FIG. 8B the flexural elements are being deflected by the lateral force mechanisms and the PRBMs are monitoring and modeling that deflection.

Inflection point(s)/node(s) exist between antinodes and help identify the flexures' structural features along the length of the sinusoidal shaped member. The boundary displacement conditions that include the members' antinode regions and inflection points may be monitored during assembly through the PRBM. This may allow the sinusoidal member to be actively modeled during assembly. The flexure elements' engineering properties and orientations can be predetermined within each assembly by incorporating methods of analysis that model large deflections. Methods of analysis like the PRBM would allow this level of control during assembly.

Therefore, an assembly's physical distribution of flexure elements/flexures and their quantity of stored potential energy can be designed to produce pre-stressed assemblies having a specific secondary structure that may mirror the assembly's internal forces/built-in stress.

The PRBM and/or other methods of simulation could be adapted to actively form flexural members as part of the automated assembly process or be used to form flexural members having predetermined properties for assembly.

The PRBM is an approximate model to form compliant mechanisms which offers a trade-off between computational complexity and accuracy by reducing the dimensionality of the system while retaining its compliant characteristic. It consists of rigid links joined by revolute joints. The elasticity of the compliant element/flexural element is modeled by torsional springs attached to the joints. There is a library of potential pseudo-rigid-body models, including spherical PRBMs.

The flexure structures the PRBM are commonly known to simulate using fixed-beam analysis and the structures produced by the A-SEM have a flexure shape in common. That flexure shape is a $\lambda/2$ form. The $\lambda/2$ shape is the smallest region of a sinusoidal shaped member produced by the A-SEM considered a flexure element/flexure. The A-SEM is designed to sequentially shape flexural elements and flexure elements to form sinusoidal shaped members. A group of sinusoidal members are joined to one another as they are formed to create a three-dimensional structure under stress and in equilibrium. The PRBM would function to optimize the properties of the flexure elements composing a structure as they are being formed.

The PRBM may utilize force, strain and orientation sensors to monitor the deformation of its flexible components. Kinematic and static equations may be formulated to optimize the PRBM's rigid bodies, linear and torsional spring mechanisms for use in a specific A-SEM embodiment. The PRBM analysis may be validated using finite element analysis (FEA). Ideally the elastic material would incorporate embedded or material-based stress and strain sensing and would not require external mechanisms.

Figures 9A, 9B:
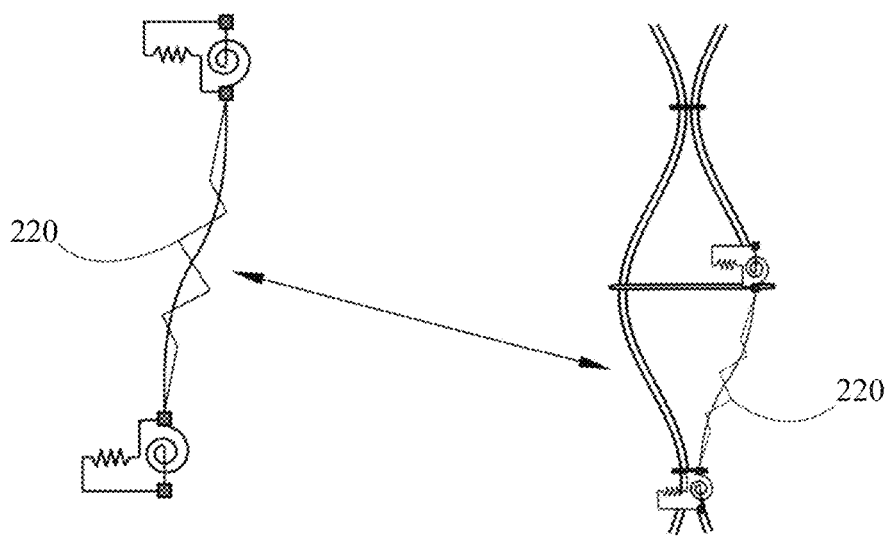
FIG. 9A depicts an exemplary fixed guide PRBM simulating the deflection of a slender beam flexure.
FIG. 9B depicts a section of a sinusoidal structure and how a commonly used PRBM approach can be used to simulate the deflection of a slender beam flexure.

FIG. 9A depicts the typical pseudo-rigid-body model (PRBM) as a simplified method of analysis used to model the nonlinear deflection of flexural beams and sheets. FIG. 9B depicts the same flexible beam/flexure shape seen in many typical PRBM fixed-guided beam analyses used to form a similarly deflected $\lambda/2$ flexible region composing a sinusoidal structure formed using this sinusoidal building system (A-SEM).

Using PRBMs speeds up (simplifies) the computation involved in design optimization, as opposed to solving differential equations from beam theory or high-fidelity Finite Element Analysis (FEA). PRBMs may function as a manufacturing tool or device to be incorporated into the A-SEM assembly process.

As applied to this invention the PRBM could function to simulate the requirements of a specific elastic body (flexural element or flexure element) in assembly and then use that data to produce an optimum flexural element or flexure element in material form. The PRBM mechanism may be integrated into the adaptive stress extruder mechanism, aka, adaptive sinusoidal extruder mechanism (A-SEM). The A-SEM could receive feedback (data) from its integrated PRBMs verifying the predetermined properties of the flexural elements being formed and extruded.

PRBMs may also function to guide the engineering of flexural elements and flexure elements that are actively being formed in response to external loads or other forces.

A-SEM embodiments having high levels of functionality may utilize the PRBM and/or other methods of analysis and modeling to control the mechanisms and actuators used to manipulate the flexural properties of the structure produced.

The lateral and axial forces applied to the relaxed members/flexural members and the position of the support members are controllable parameters. These parameters determine the flexure elements'/flexures' properties in assembly. Mechanisms and actuators can apply lateral, axial and twisting force to the relaxed material members during assembly.

The lateral force has a first order effect; the axial force has second order effect. That is, in this embodiment lateral force bends the relaxed member to form a flexural member and the axial force causes it to bend more. Appling quantifiable axial compressive force/secondary bending moments to the flexural elements allows the stress applied to the deflected member to be controlled during assembly.

Flexure elements exist along the length of the flexural member; they are punctuated by support members. $\lambda/2$ is the smallest possible flexural element (106*) and also the smallest flexure element (106). Lateral force and/or axial force may be applied to a $\lambda/2$ flexural element during assembly to form a $\lambda/2$ flexure element.

Figure 10A:
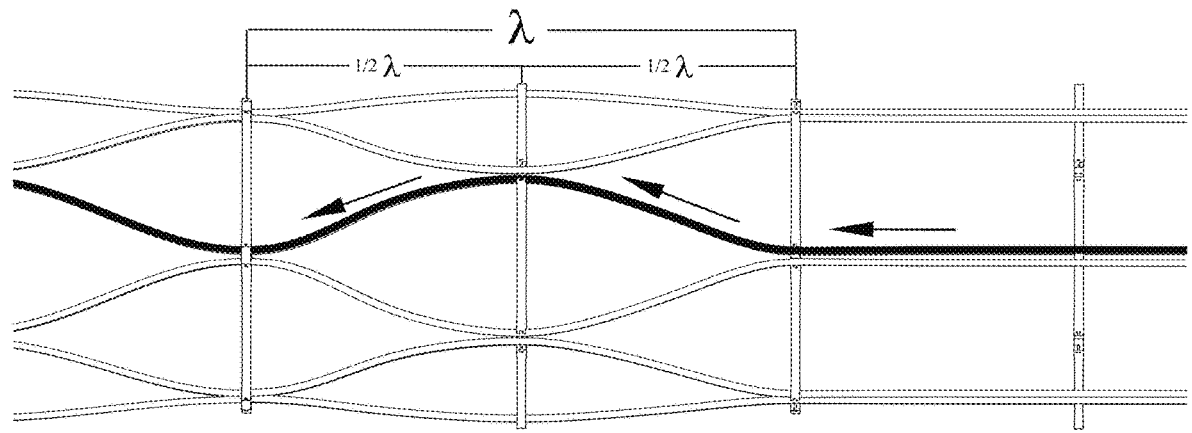
FIG. 10A is a side view of a sinusoidal structure containing a flexural member experiencing axial force along a 1λ region made up of two λ/2 flexures.

FIG. 10A depicts a 1λ region of a flexural member (108) engaged with support members (104) as axial forces are applied to that 1λ region. The 1λ region is composed of two contiguous $\lambda/2$ flexural elements; axial forces are applied to them sequentially prior to them becoming flexures.

Figure 10B:
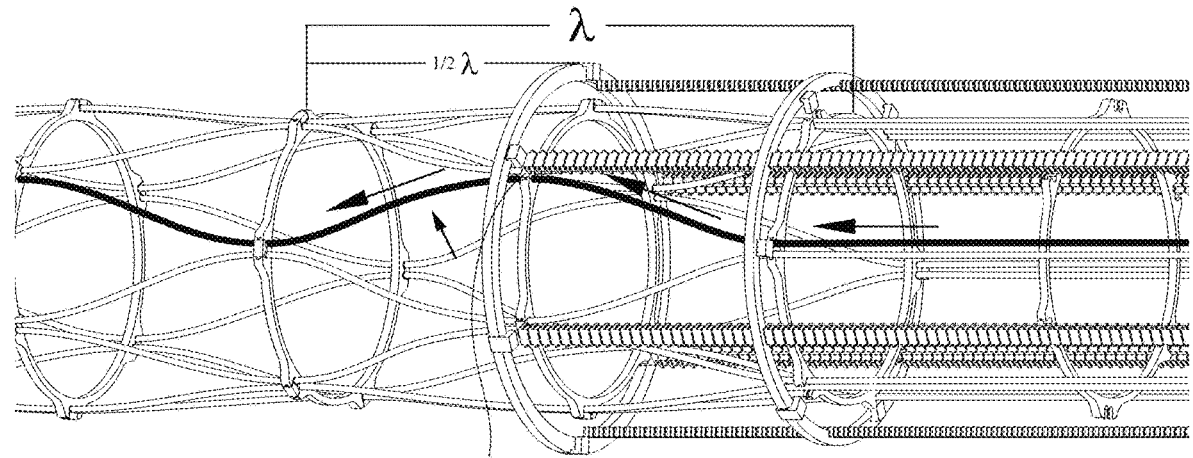
FIG. 10B is a perspective view of an A-SEM embodiment applying axial force to a sinusoidal shaped member causing axial compression and the possible lateral displacement of a flexural element formed from a λ/2 region of the sinusoidal shaped member that is located proximal to the sinusoidal structure.

FIG. 10B depicts the $\lambda/2$ flexural element positioned adjacent the growing assembly experiencing secondary bending effects due to axial compression and also becoming fixed to a support member through the intra-structural attachment mechanism (212). At this point (after attachment/being fixed to the support members) that flexural element becomes a flexure element/flexure (106) and shares its potential energy with the rest of the assembly.

Figure 10C:
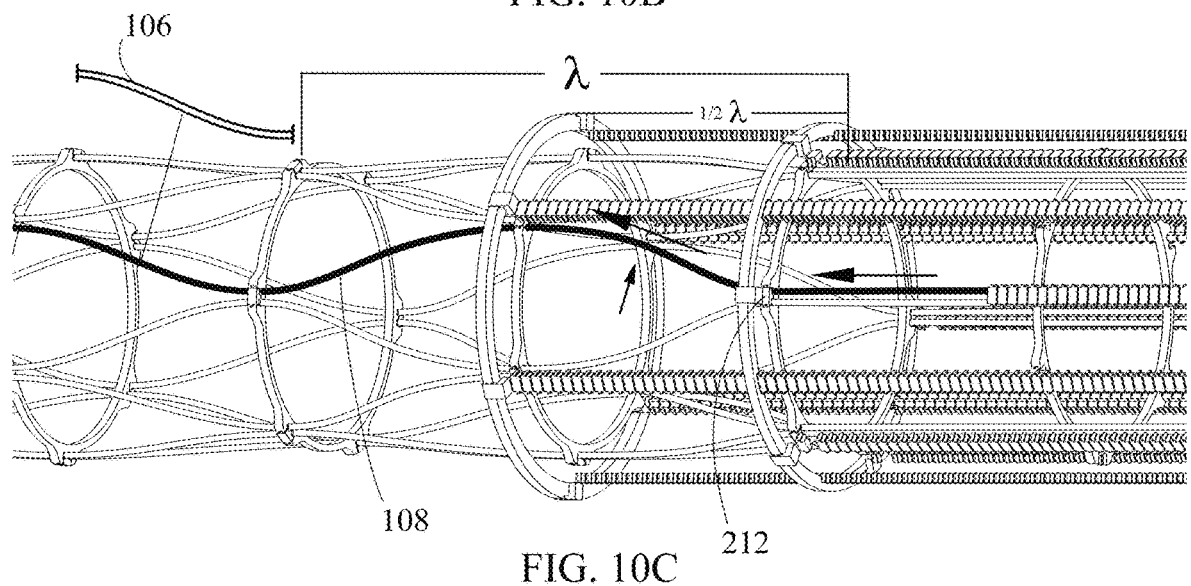
FIG. 10C is a perspective view of an A-SEM embodiment applying axial force to a sinusoidal shaped member causing axial compression and possible secondary defection of a flexural element formed from a λ/2 region of the sinusoidal shaped member that is located proximal to the sinusoidal structure and adjacent to the most recently formed flexure depicted in FIG. 10B.

FIG. 10C depicts the next $\lambda/2$ flexural element positioned adjacent the previously formed flexure element/flexure (106) experiencing axial compression, secondary effects and becoming fixed to the support member through the intra-structural attachment mechanism (212). A flexure is formed when it becomes fixed and part of the assembly. The A-SEM then extrudes the 1λ region of a flexural member consisting of two contiguous $\lambda/2$ flexural elements as it draws in relaxed material and the process repeats.

Controlling the amount of elastic potential energy held in the individual flexural elements'/flexures' through the introduction of axial force (but not limited to) could allow the outputted structure's path and shape to be controlled. The amount of elastic potential energy introduced to each flexural element during their formation guides the behavior of the assembly they compose. This amount of axial force and stored potential energy could equate to the length of the flexural member as it is being formed, i.e., the length of the material member introduced by the parts feeder as the flexural element is being formed could be a parameter used to measure (gauge) the elastic potential energy held in the flexural element and flexure element.

The amount of elastic potential energy stored in a flexural element's deflected material is reflected in the bending trajectory of the flexure it becomes. Flexure lengths may vary within an assembly. The amount of stored potential energy held in a flexural element may impact the length of the flexure it becomes when in assembly. The more elastic potential energy held in the flexural element, the longer the flexure will become once it is in assembly and in turn the longer the wavelength of its sinusoidal member's flexural region. Note: this is true when the flexures in assembly are formed from the same material.

The A-SEM may control the length of the flexural element as the relaxed member is drawn or deploys/extrudes from the parts feeder (204). Controlling the lengths (arc length) of the individual flexural elements during assembly may be a method of specifying the amount of elastic potential energy held in its deformed material.

Example A-SEM Embodiment 1 (Extruding Along a Trajectory Path)

Figure 11A:
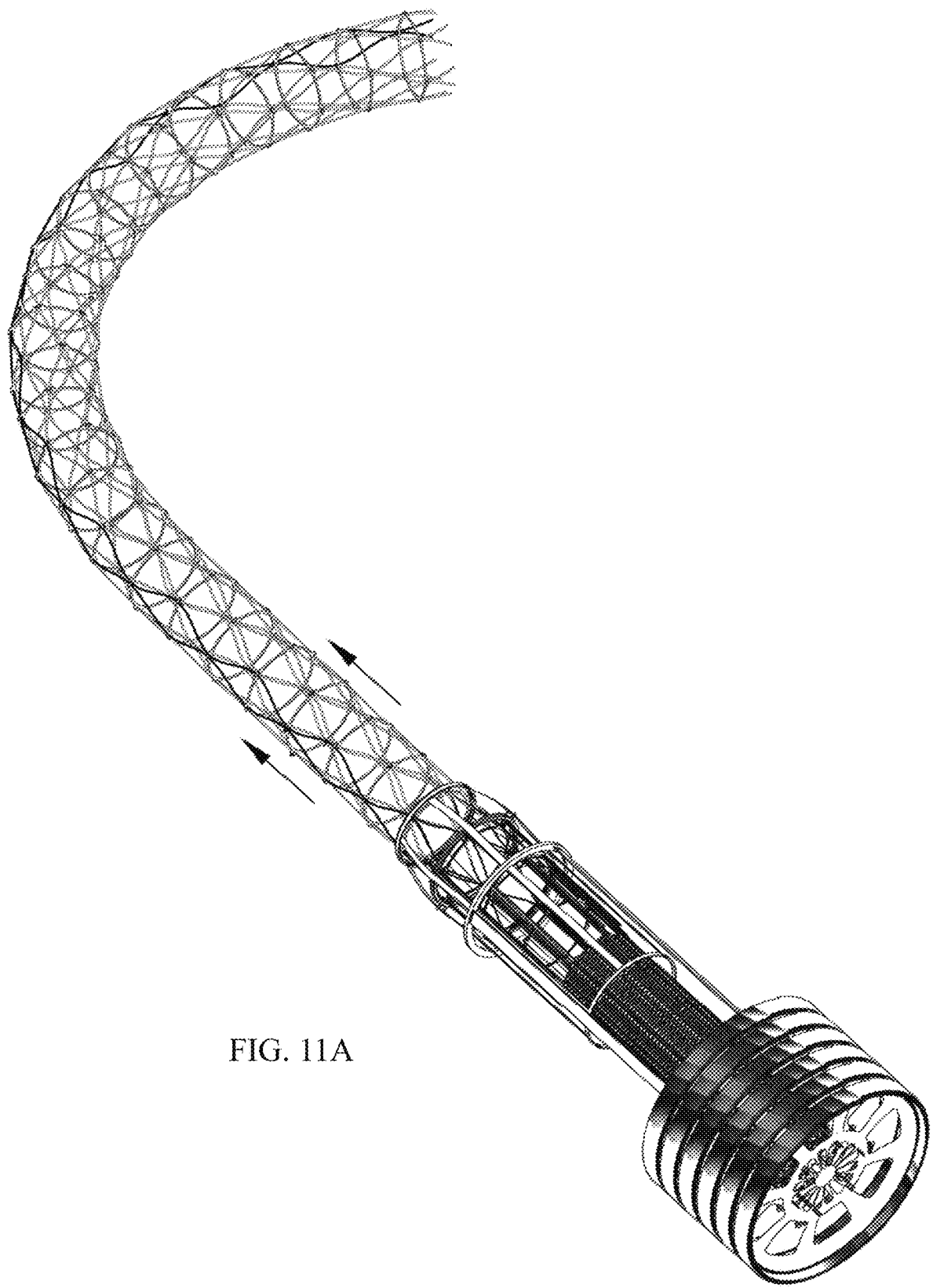
FIG. 11A is a perspective view of an A-SEM embodiment that is extruding a sinusoidal structure along a curved path due to the A-SEM is shown applying axial force to its sinusoidal shaped members' component flexures in differing amounts leading to the structure's deflection.

FIG. 11A depicts an A-SEM embodiment extruding an assembly along a curved trajectory path. The shaded sinusoidal shaped members in assembly may have greater axial force applied to them during assembly and may be longer than the non-shaded members, resulting in the assembly's curved trajectory.

Figure 11B:
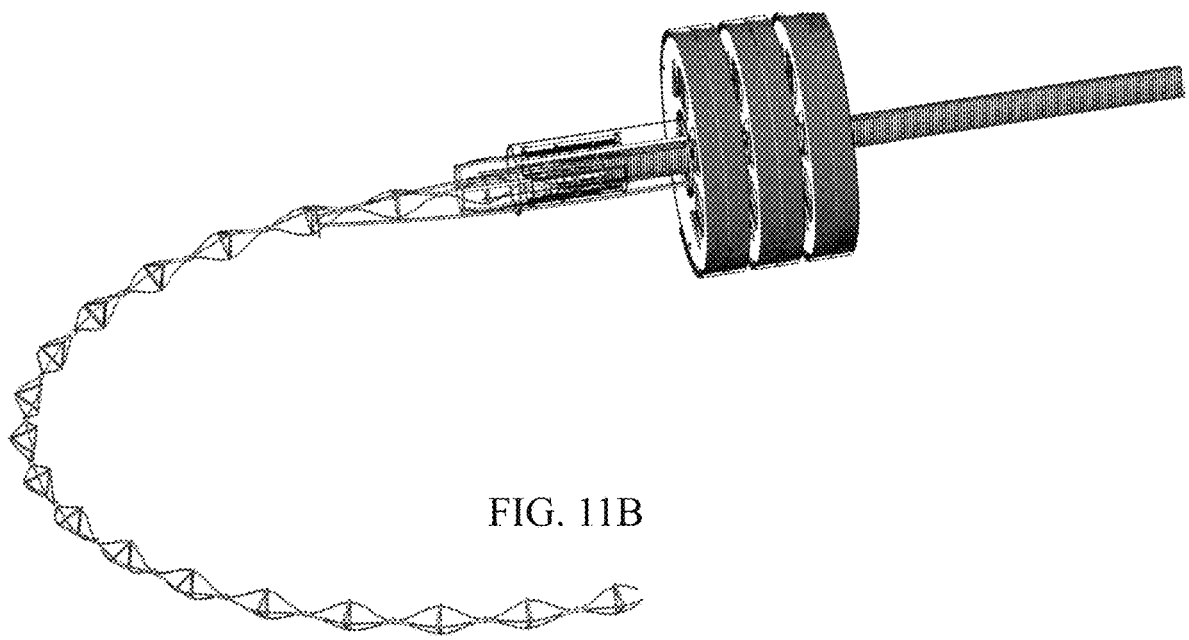
FIG. 11B is a perspective view of an A-SEM embodiment that is extruding a sinusoidal structure along a curved path.
Figure 11C:
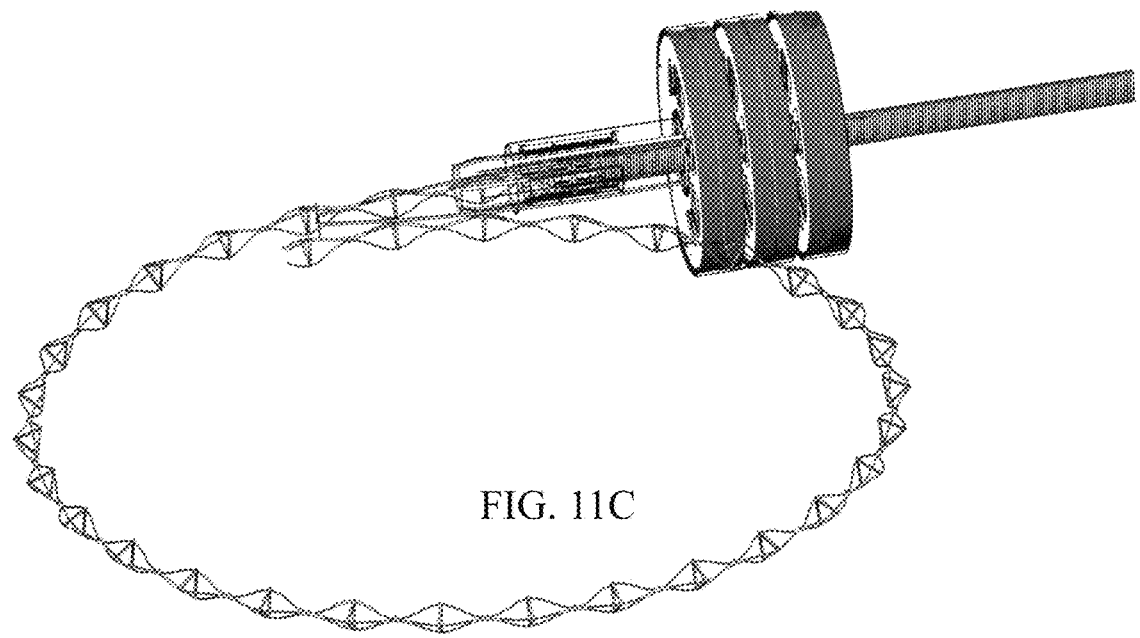
FIG. 11C is a perspective view of an A-SEM embodiment that is extruding a sinusoidal structure along a curved path to reconnect to that path.
Figure 11D:
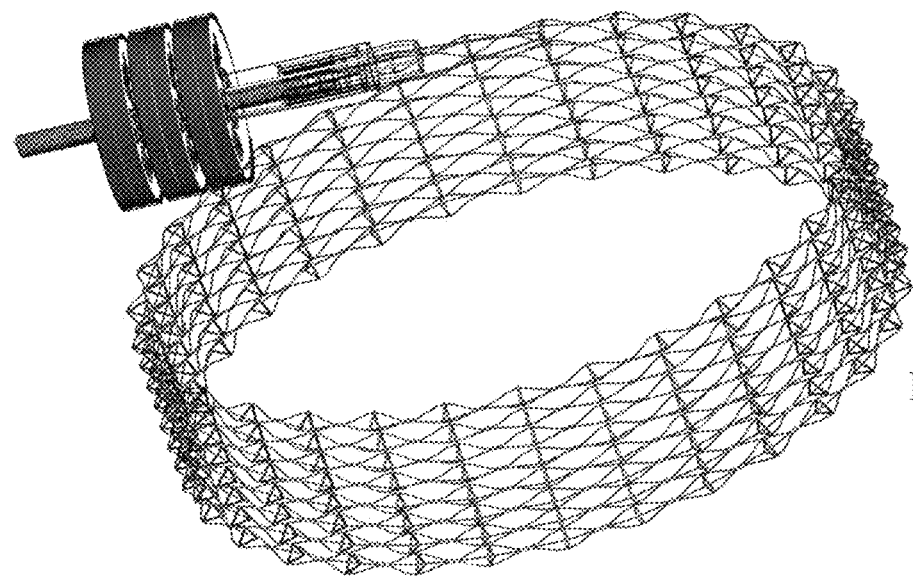
FIG. 11D is a perspective view of an A-SEM embodiment that is extruding a sinusoidal structure along a curved path to reconnect to that path forming a tube.

FIGS. 11B-D is a progressive sequence depicting an A-SEM embodiment extruding a sinusoidal assembly along a helical trajectory path to form a hollow shape. As this A-SEM embodiment extrudes structure it adds it to the existing structure. This method of assembly is an additive manufacturing process that may be controlled by a specially adapted computer program. Note: a trajectory path can be predetermined or be adaptable through the use of feedback mechanisms that guide the assembly's trajectory as it is being formed. In this example the assembly's helical path is predetermined and a helical tube is formed by extruding a specifically curved assembly. The extruded assembly is formed from three sinusoidal shaped members (102) having radially symmetric orientation and uses two different support member designs. The assembly's predetermined helical trajectory path is defined by a set of X Y Z coordinates that guide the sinusoidal assembly's path and in turn form the helical structure's shape. The assembly's trajectory is determined by the properties of the flexures that compose it. The flexures forming the outside of the curve were given greater elastic potential energy during assembly than the ones forming the inside of the curve.

FIG. 11B depicts the A-SEM embodiment extruding an assembly along a predetermined curved path. In FIG. 11C the A-SEM embodiment is depicted further extruding the assembly along the curved helical path where it converges and attaches to itself.

Figure 11E:
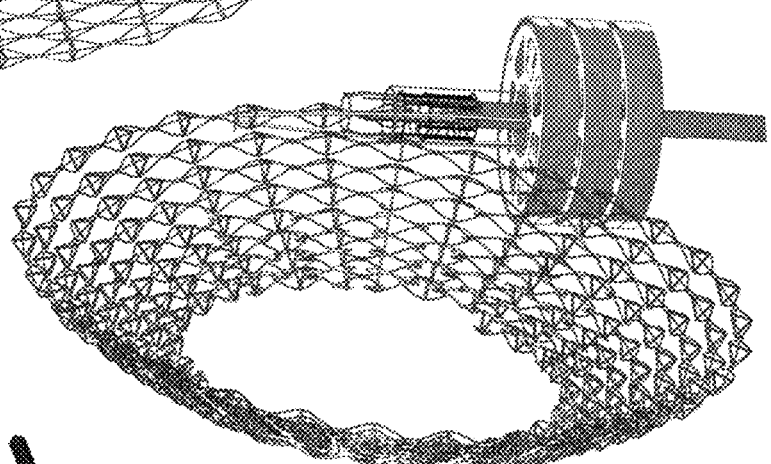
FIG. 11E is a perspective view of an A-SEM embodiment that is extruding a sinusoidal structure along a curved path to reconnect to that path, forming a circular paraboloid.
Figure 11F:
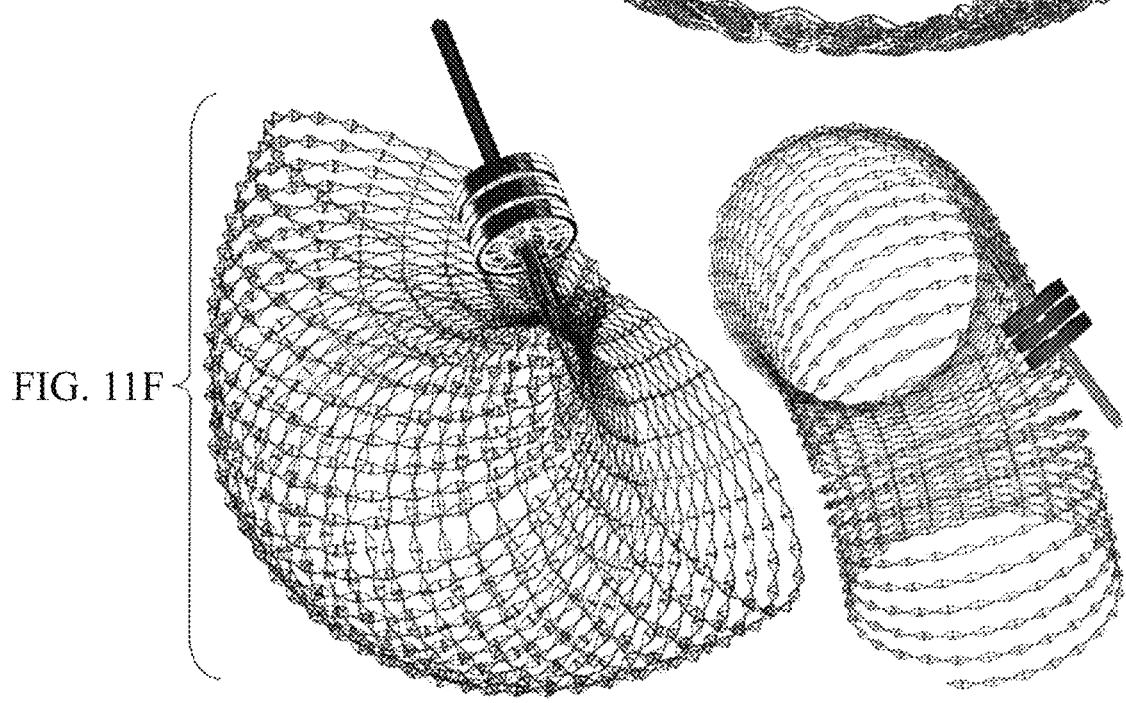
FIG. 11F is a perspective view from two angles of an A-SEM embodiment that is extruding a sinusoidal structure along a curved path to reconnect to that path, forming a tube following a trajectory.

In FIGS. 11D-F the A-SEM defines the greater structure's shape by extruding assembly along a specific trajectory path. FIG. 11D depicts eight turns of a helix forming a helical hollow assembly. The extruded spiraling assembly is composed of a number of support members and three sinusoidal shaped members. As the A-SEM extrudes, the assembly is attached/zippered to itself to form a tubular assembly, i.e., this exemplary A-SEM extrudes a sinusoidal assembly along a helical path as it attaches the spirals of the helix together to form a tube as depicted in FIG. 11D, i.e., the attachment takes place between the spirals of the helix, in effect zippering the turns of the helix together as they are extruded by the A-SEM to form a tubular structure. This zipper action may be reversible.

The ability of the A-SEM to extrude an assembly along a predetermined and/or adaptable continuous trajectory path to form a helical tube or other shape is an additive manufacturing process.

The trajectory paths of an extruded assembly may be orthogonally or non-orthogonally oriented. The trajectory can also be adapted as the A-SEM extrudes. As depicted in FIG. 11E the A-SEM may extrude and attach adjacent spirals of a helix to form a conical spiral. Each flexure element making up the conical structure is given specific characteristics to shape its form. A-SEM embodiments may extrude a variety of spiral forms, including spherical spirals and helical tori. FIG. 11F depicts tube shapes having trajectory curves formed from extruded helical spirals that form limited, periodic "zippering" attachment, i.e., the helix spirals are incompletely zippered.

The "zippering" together of a helix's turns may be performed by an inter-structural attachment mechanism (222) that is a component part of the A-SEM embodiment depicted in FIG. 11G. This mechanism may use clips, pins or adhesives to attach support members between adjacent spirals of the helical assembly.

The mechanism could function to zipper the helix's spirals together sequentially as they are being extruded to form a tube (FIG. 11D). The inter-structural attachment mechanism (zipper) (222) may incorporate a forming die to enforce geometry constraints and lock the elements into attachment to form a structure like a helical tube.

FIG. 11H depicts adjacent assemblies converging to be attached using secondary fastener components. Note: fastener components may not be required if interlocking or press fit mechanisms are used.

Computer control is beneficial when extruding along a path where specifically applied force and the integration of timed mechanical power transmission systems are crucial. Predetermined or active computer control of the assembly's extrusion trajectory allows the A-SEM to form a variety of hollow forms, lattice structures and shapes.

A-SEM embodiment mechanisms and interface/attachment components used to "zipper" extruded assemblies together may also function to attach various sinusoidal structure shapes, like rings and tubes one to another forming open cage structures and other complex geometrical shapes.

Figure 11I:
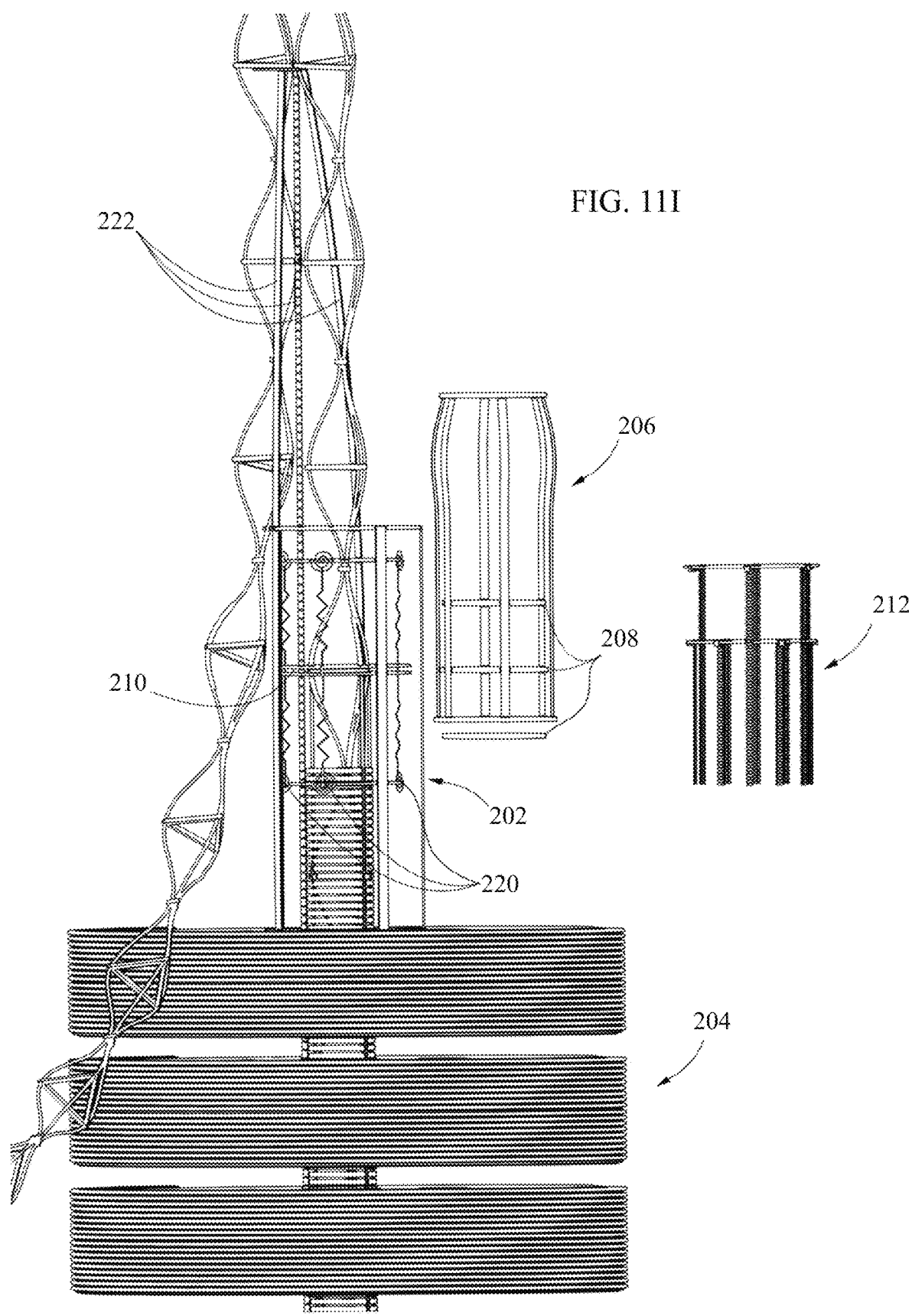
FIG. 11I shows an A-SEM embodiment's parts in an exploded view.

FIG. 11I is an exploded view of the A-SEM embodiment depicted in FIG. 11B-H. Shown are the A-SEM's component parts and the materials making up the sinusoidal assembly it deploys. This includes the intra-structural attachment mechanism (212), the zipper attachment mechanism (222), and the PRBM(s) (220) which can help in actively analyzing and/or modeling a structure's physical strength and behavioral performance during the assembly process.

The PRBM's ability to actively control each flexural element's properties during assembly allows the A-SEM to extrude assembly along paths to form various geometric sinusoidal structures.

Example A-SEM Embodiment 1 (with Passively Driven Components)

Component mechanisms and devices including those related to timing methods within A-SEM embodiments could be adapted to drive the passive deployment/extrusion (without a prime mover) of a sinusoidal structure. The passive deployment could be actuated by a sustained force that pulls material through the assembler. Elastic potential energy stored in the pre-deployed material could also be used to assist in the deployment/extrusion. Material held within the parts feeder before its deployment is considered pre-deployed.

FIGS. 12A-D depict an exemplary A-SEM embodiment in a low gravity environment exhibiting passive actuation and deployment methods by rotating around an axis to create a radial force. These passively driven A-SEM embodiments extrude sinusoidal structure(s) through rotational inertia or other external pulling forces. The pulling force draws material through the A-SEM which in turn drives mechanical timing methods and other component assembly mechanisms to deploy/assemble the sinusoidal structure (110). The timing methods control the speed of the sinusoidal structure's incremental deployment. The A-SEM's control system and the structures wave parameters can define the manufacturing frequency of the structure's extrusion.

Figure 12A:
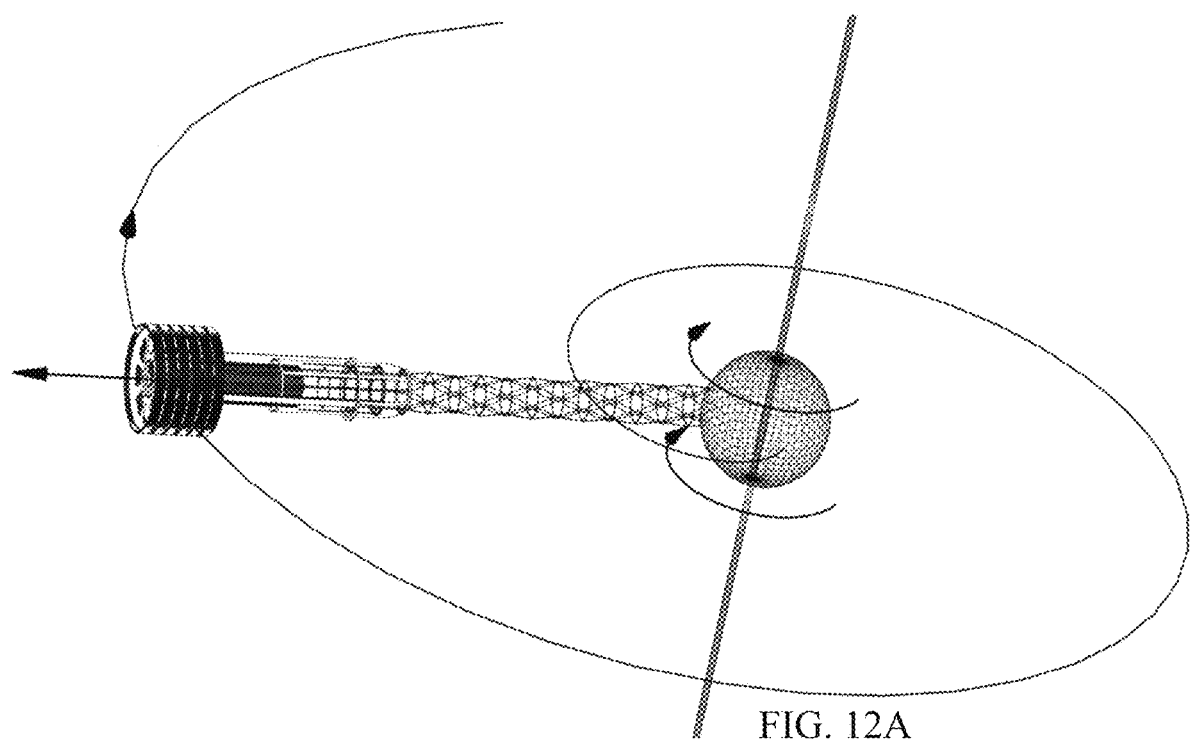
FIG. 12A is a perspective view of an A-SEM embodiment that deploys a sinusoidal structure passively by using radial force that draws material parts through the A-SEM to drive mechanisms that assemble, form and extrude the sinusoidal structure.
Figure 12B:
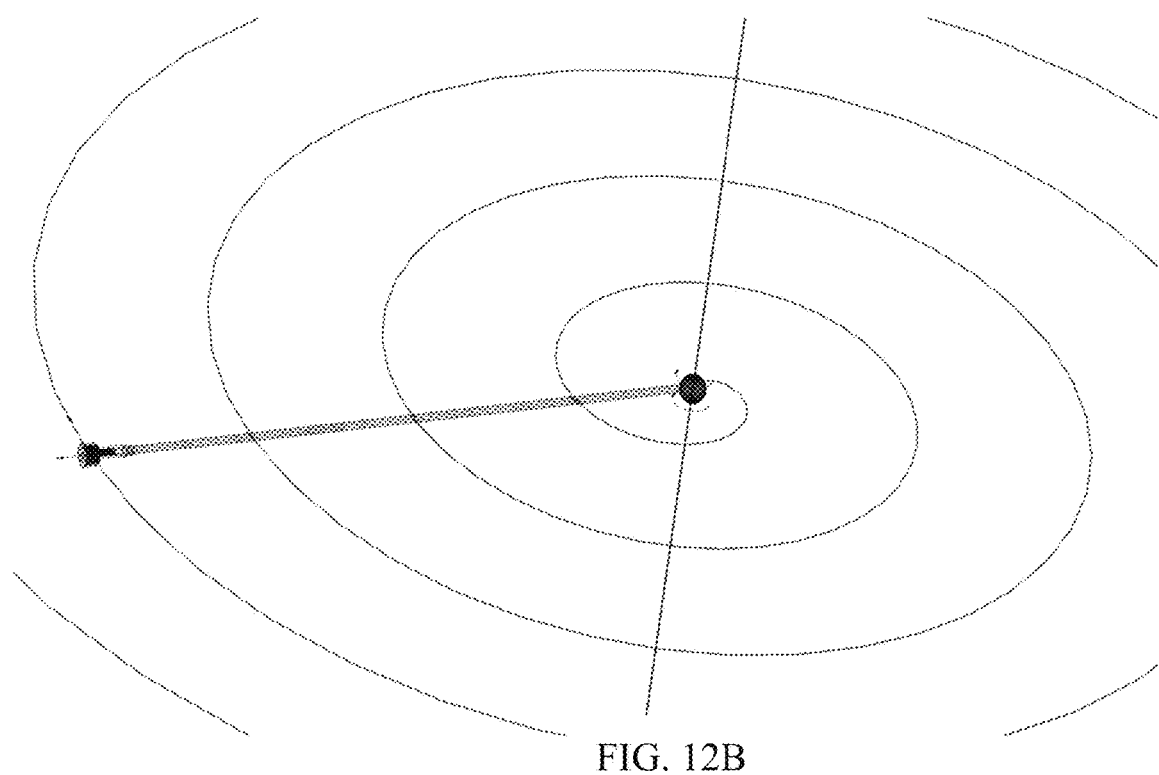
FIG. 12B shows the spiral path taken by the A-SEM as it deploys the sinusoidal structure.

Elastic potential energy stored in the pre-deployed material held within the parts feeder (204) may also be harvested to help to deploy and assemble the sinusoidal structure. FIGS. 12A-B depict centripetal force or tension force/pulling force deploying the sinusoidal structure along a straight linear path from the A-SEM as it moves along a spiral trajectory.

Figure 12C:
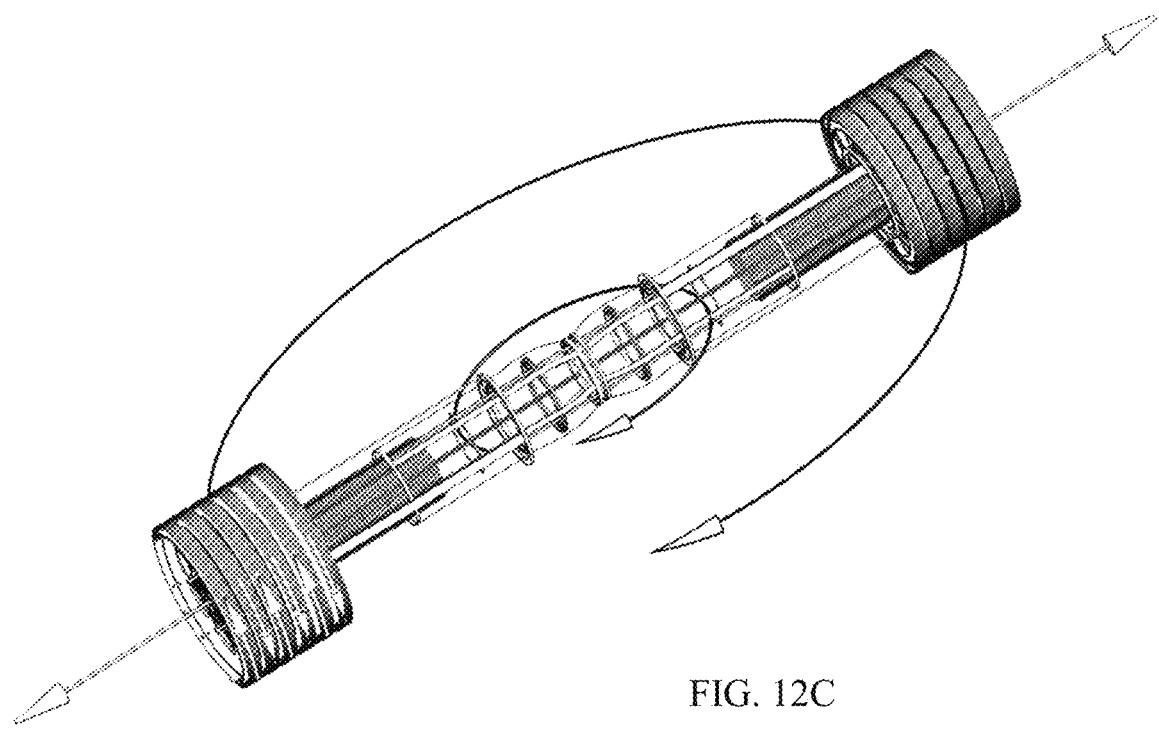
FIG. 12C Is a perspective view of two A-SEMs oriented to deploying a common sinusoidal assembly.
Figure 12D:
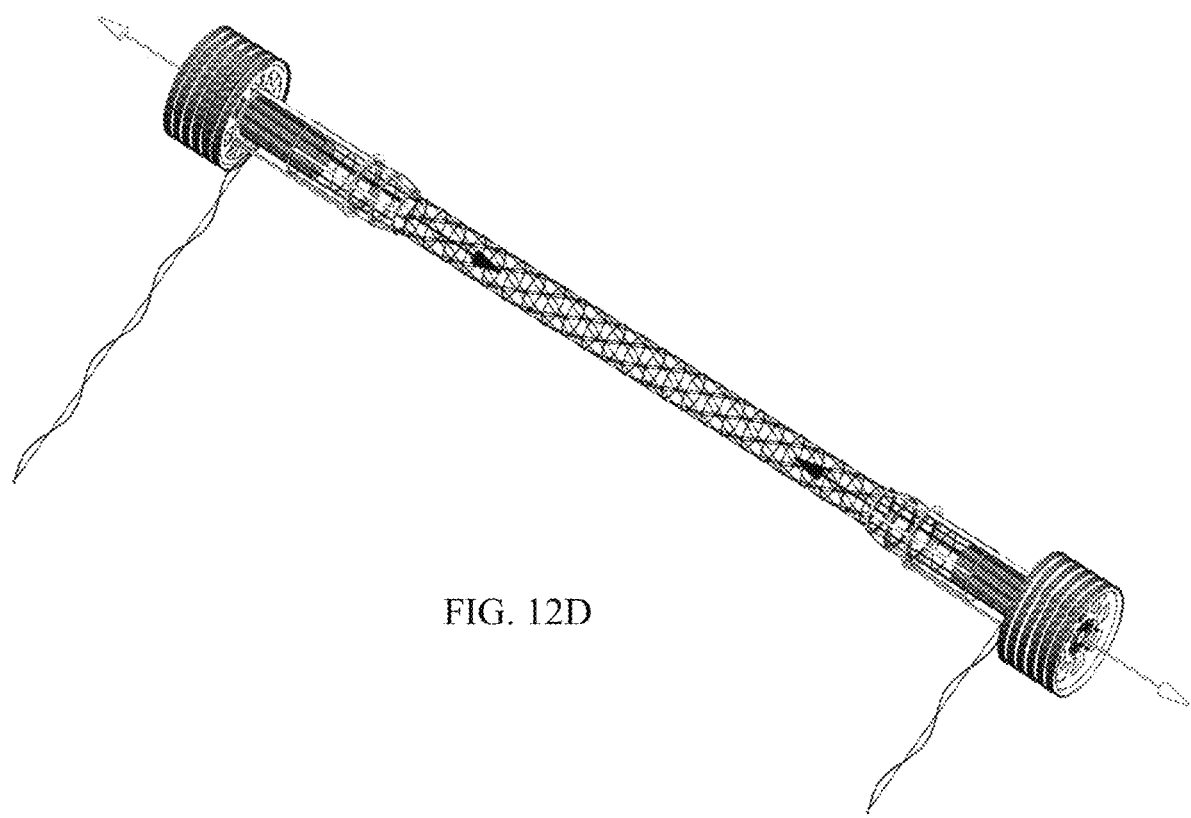
FIG. 12D shows the two A-SEMs deploying a sinusoidal structure and instruments to function as a simple interferometric array configuration.

FIGS. 12C-D depicts two A-SEMs configured to deploy a common sinusoidal structure for a platform designed for possible interferometry applications. The platform's instrumentation could be integrated into the A-SEM and be part of a space craft. Such a platform could be reversibly deployed.

Figure 12E:
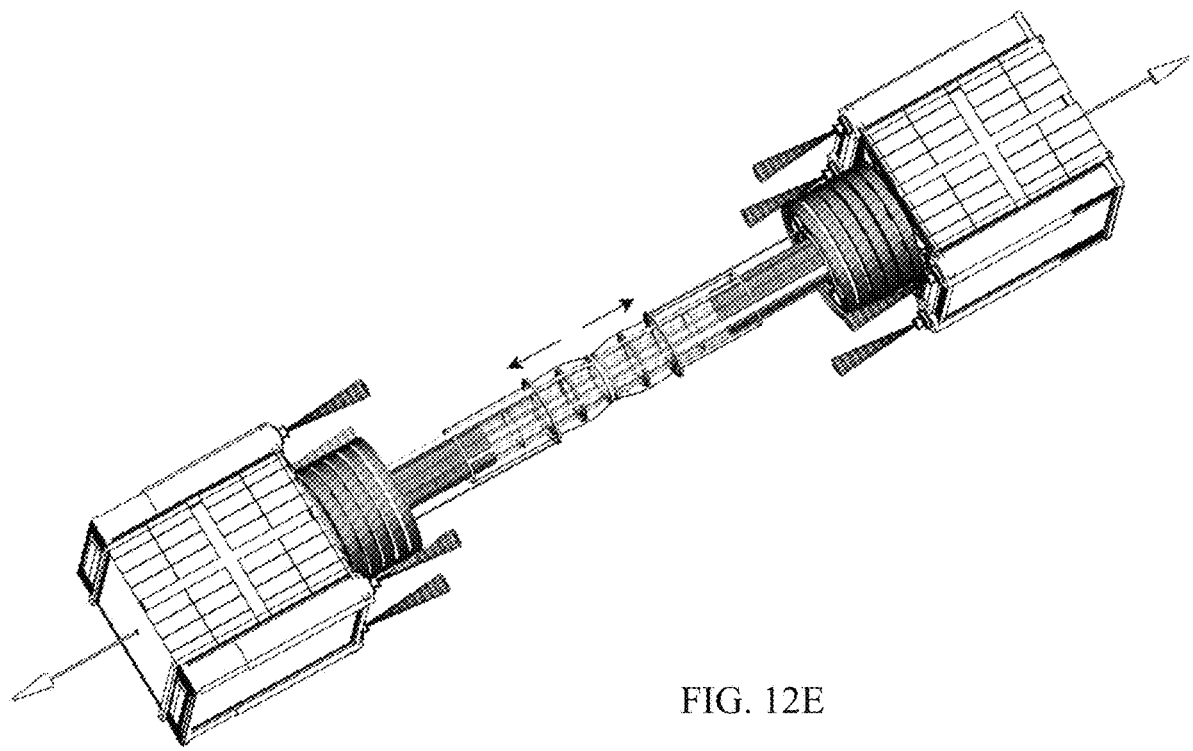
FIG. 12E Is a perspective view of A-SEMs and nano-satellites being integrated to form a spacecraft to deploying a sinusoidal structure.
Figure 12F:
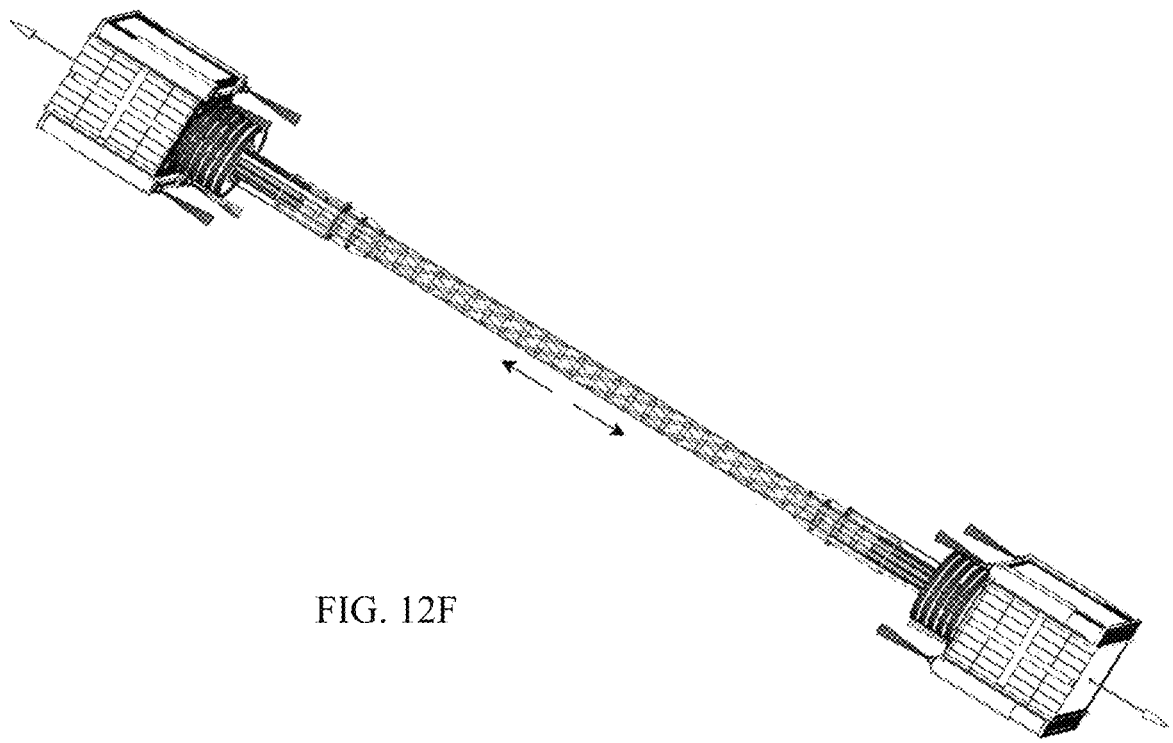
FIG. 12F shows the A-SEMs passively deploying a common sinusoidal structure through the nano-satellites propulsion systems.

FIGS. 12E-F depicts a spacecraft composed of A-SEMs and satellites. The pulling force/tension force that drives the actuation of the A-SEMs component mechanisms and the sinusoidal structure's deployment may be supplied by the nano-satellites integrated propulsion systems.

These passively driven A-SEM embodiments are depicted as deploying structures having support member geometry aligned orthogonal to the structure's straight neutral axis. Their internal stress is evenly distributed across the centroid axis. These A-SEM embodiments perform the two required assembly functions previously mentioned. Axial means along or parallel to the axis of a body/member/object.

Example A-SEM Embodiment 2

FIGS. 13-15 depict another exemplary A-SEM embodiment and its assembly/deployment process. Its timing methods and component mechanism differ from the previously described embodiment depicted in FIGS. 4-12 but perform similar functions.

Both of these embodiments integrate part feeding, locomotion, and chassis components into one system. All the possible mechanical assembly operations are internal to the A-SEM and integrated.

The A-SEM embodiments depicted in FIGS. 13-15 and the previously described embodiment variations depicted in FIGS. 4-12 use different methods to perform the same basic A-SEM functions: #1 is to reversibly form elastic material members into sinusoidal shaped members having stored elastic potential energy, #2 is to extrude/deploy and reversibly maintain the sinusoidal members' shapes in an assembly by connecting/combining them with support members.

Both embodiments use lateral force components to mechanically spread/separate and/or alternate the relative position of the relaxed members during assembly. Both embodiments incorporate mechanisms to position support members. Both embodiments can apply modulated axial force to the flexural element as it is formed. Both embodiments have component parts that move reciprocatively to incrementally output structure. Both incorporate parts feeders that act as a reservoir for parts and material used for assembly.

They differ in that the embodiment depicted in FIG. 4-10 applies lateral force at a right angle and to a specific region/point along the length of the relaxed member. The embodiment depicted in FIG. 13A applies lateral force at an oblique angle over a length of the relaxed member by sliding the support member. These embodiments have the same fundamental component parts but achieve their A-SEM functions using different methods.

Figure 13A:
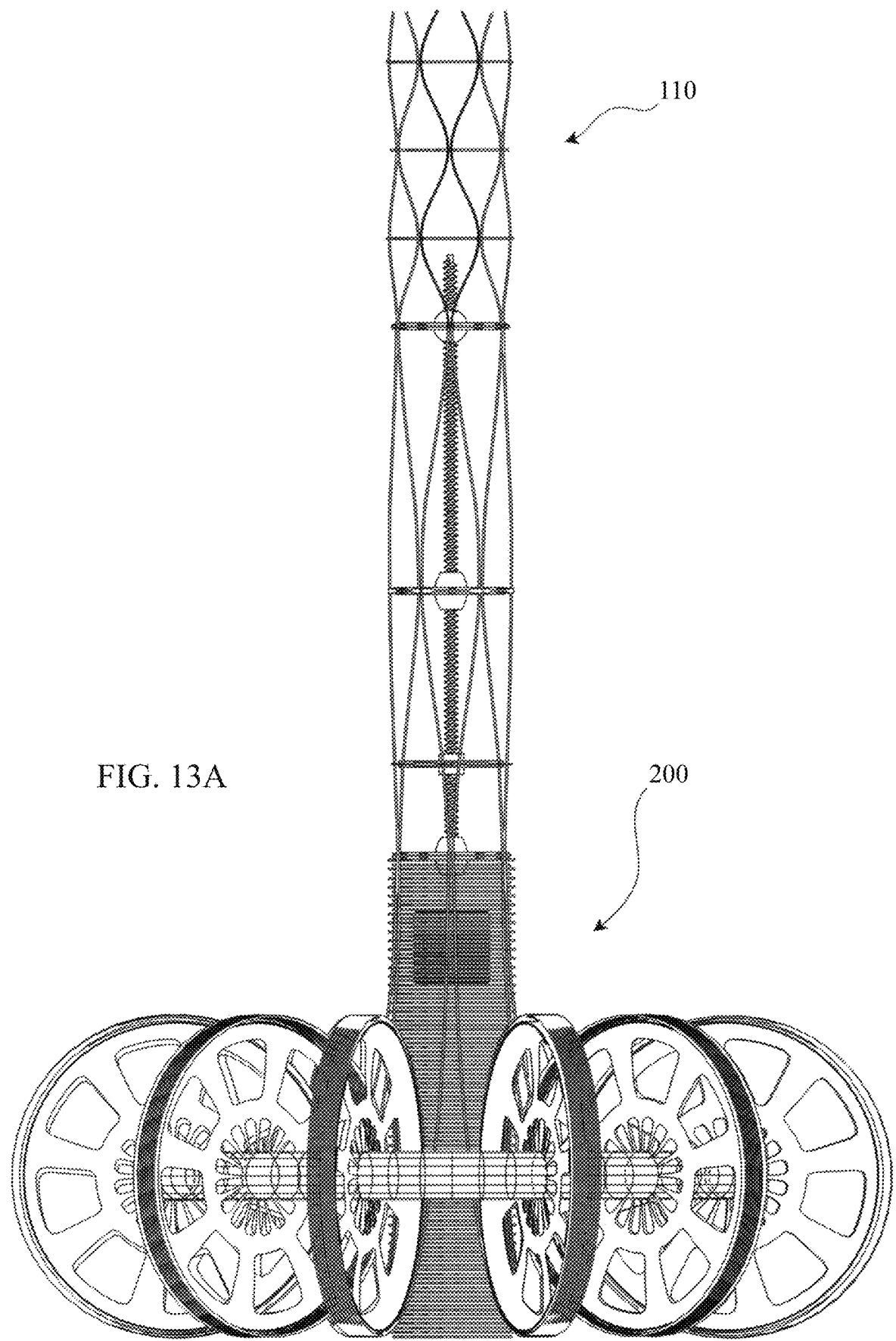
FIG. 13A is a side view of an A-SEM embodiment having parts that move reciprocatively to sequentially assemble a pre-stressed sinusoidal structure.
Figure 13B:
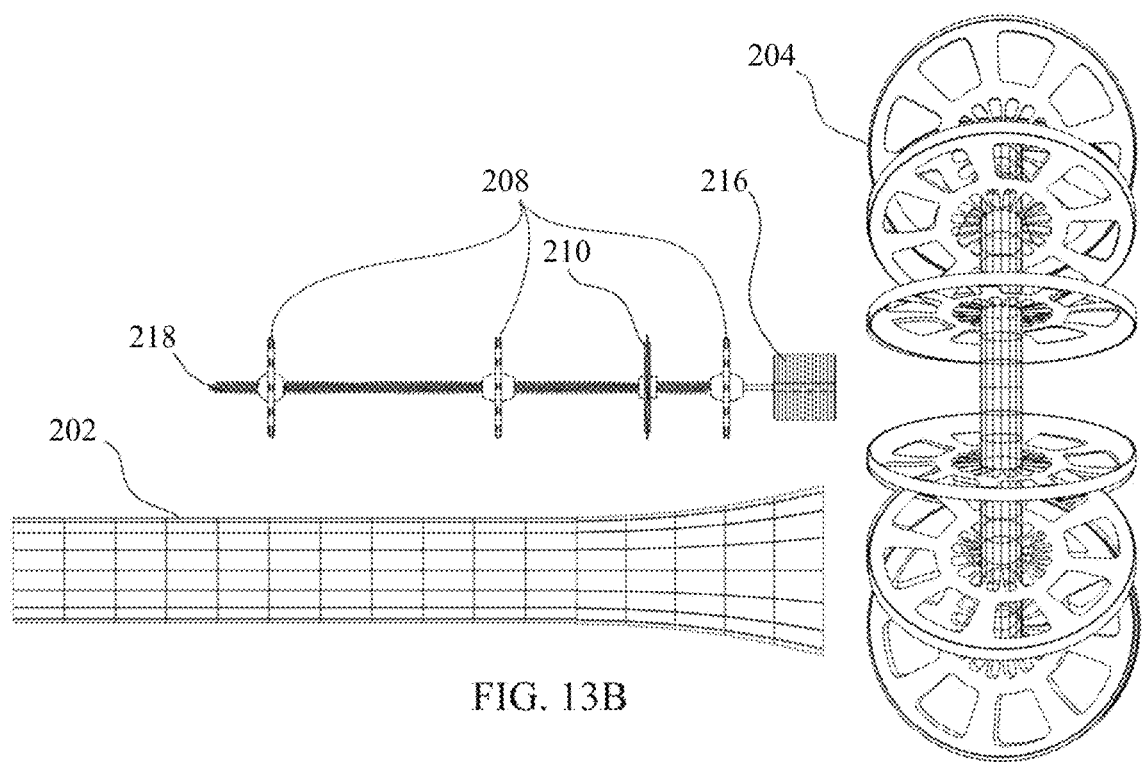
FIG. 13B is an exploded view of this A-SEM embodiment's parts and mechanisms.
Figure 13C:
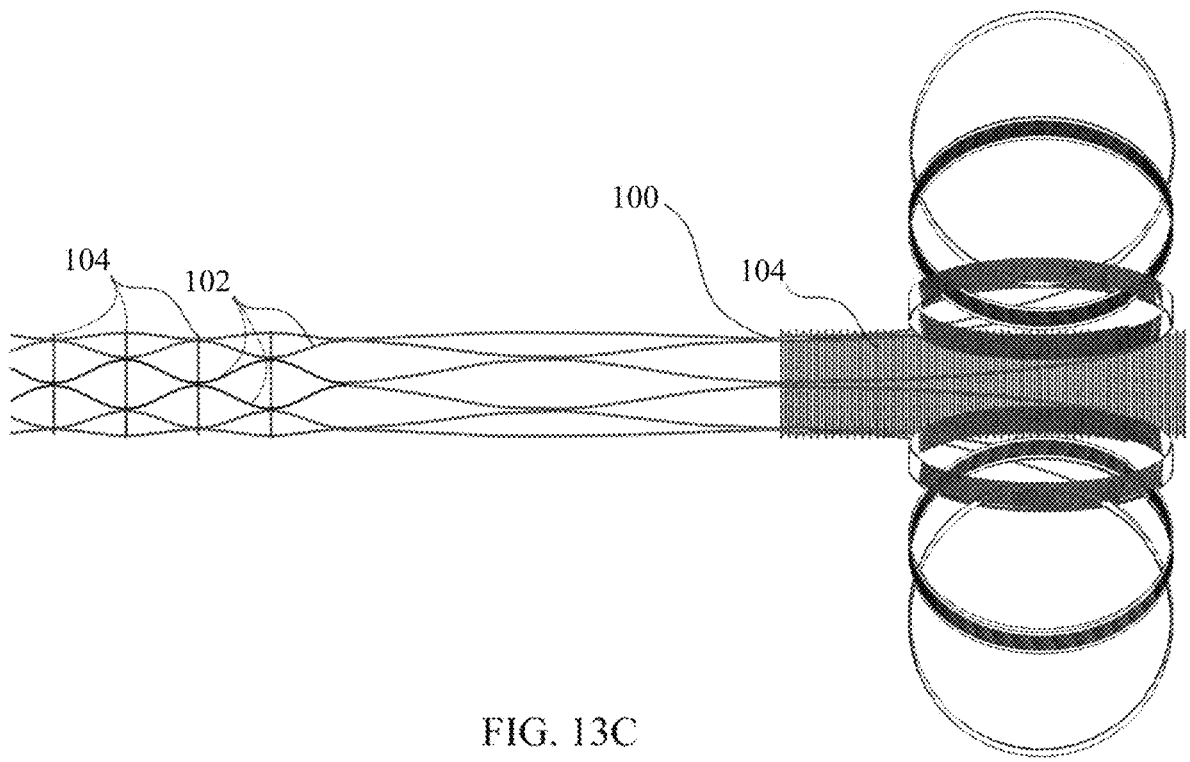
FIG. 13C is a side view showing only the materials used by this A-SEM embodiment to form a sinusoidal structure.

FIG. 13A-C depicts an exemplary A-SEM (200) and sinusoidal structure (110). The assembler's (the A-SEM's) locomotion and actuation systems may be driven by passive or active means. All operations happen internally and in parallel rather than as separate external systems, they can be mechanically or electrically driven. This embodiment utilizes the reciprocal motion of its component parts to apply lateral force to the relaxed members during assembly. A single prime mover, such as a motor is capable of driving the machine through its reciprocating motion while timing mechanisms or electrically controlled actuators modulate the placement and forces applied to the component parts during the assembly process.

FIG. 13B depicts this A-SEM embodiment's component parts and mechanisms. The A-SEM's locomotion and actuation systems may be driven by passive or active means. The chassis (202) supports and guides the system's component parts and mechanisms. The chassis can support and guide a parts feeder(s) (204) support member carriers (208) and lateral force mechanism(s) (210).

FIG. 13B depicts these integrated mechanical systems and their chassis (202). The parts feeder (204) functions within the chassis and acts as a parts reservoir to introduce unassembled orthogonally organized parts that include support members (104) and relaxed members (100). These parts are stored in magazines, reels or hopper type systems.

The parts feeder can function as a stand-alone device in some embodiments including those that deploy preassembled sinusoidal structures.

The chassis (202) houses various mechanisms that position support members (104), apply force to the relaxed members (100) and attach the constituent parts together. The mechanisms within the chassis may include support member carriers (208), lateral force mechanisms (210) and an intra-structural attachment mechanism (212).

Support member carriers (208) are actuatable, they move and position the support member within the chassis. The lateral force mechanism (210) is also part of the chassis; it applies lateral force/bending moments to the relaxed members and positions them for attachment to the support members. The intra-structural attachment mechanism (212) then applies secondary fastener components. Note: fastener components may not be required if interlocking or press fit mechanisms are used. A prime mover (216) and drive mechanism (worm gear) (218) drives the support member carriers.

FIG. 138 depicts the A-SEM's component parts. FIG. 13C depicts the materials used by the A-SEM to form a pre-stressed sinusoidal structure. The A-SEM's component parts are oriented to locomote, actuate and reciprocate along the chassis longitudinal axis. Other A-SEM embodiments may incorporate various locomotion and actuation devices.

FIGS. 14A-G depicts the A-SEM's (200) support member carriers (208) and lateral force mechanism (210) being actuated by a worm gear (218) driven with a prime mover (216) to extrude a sinusoidal structure (110). The A-SEM (200) sequentially positioning support members (104) and applies elastic bending moments to relaxed members (100) along the slender flexural members' (108) lengths.

The A-SEMs component mechanisms shuttle and position support members (104) to combine with flexural members as the completed structure is sequentially extruded.

The support member carriers (208) and lateral force mechanism(s) (210) may reversibly engage from the worm gear. The support member carriers and lateral force mechanism(s) may reversibly engage from the support members.

In this embodiment the prime mover (216) and the worm gear (218) may have a computer-controlled interaction with the A-SEM's other component parts, including the support member carriers and the lateral force mechanism(s).

Each recurring cycle of the A-SEM's components can position a support member to form λ/2 flexure elements. The A-SEM's reciprocal motion is variable and controllable. The variables relate to the relative position of the support members and also the physical and behavioral properties the flexure elements composing the sinusoidal structure (flexural system) are controllable. The material properties (flexural strength, flexural modulus and compressive strength) of the relaxed members and support members are also variables that must be part of the flexural system's engineering design process.

Figure 14A:
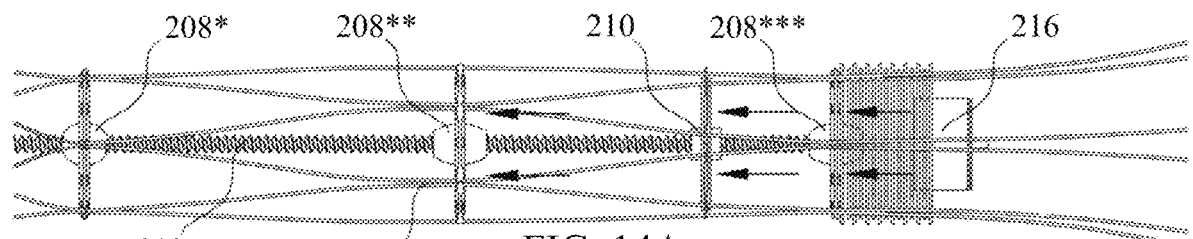
FIG. 14A is a side view of an A-SEM embodiment showing its component mechanisms. These mechanisms shape material into sinusoidal members and position support members to be connected during assembly.

FIG. 14A depicts the mid support member carrier (**208\*\*) and lateral force mechanism (210) applying lateral force to the flexural members (106\*) as they are moved axially by a worm gear (218) driven by a prime mover (216). The distal support member carrier (208\*\*\*) similarly positions a support member (104) to connect with flexural members (108**).

The A-SEM's distal support member carrier (208\*) reversibly engages from the completed sinusoidal structure to provide a stable platform for the A-SEM's motion during assembly.

The mid support member carrier (**208\*\*) reversibly engages with a support member that has made a connection with flexural members. The mid support member carrier (208\*\***) slides the support member into its final position while simultaneously applying lateral force to its associated flexural members. This support member's final position is variable and determines the distance between support members and the properties of the flexural elements within the flexural region (f).

The lateral force mechanism (210) applies lateral force to the flexural members connecting them to the support members prior to being moved into their final position by the mid support member carrier (**208\*\***). The act of moving a support member into its final position, gradually applies additional lateral force to the flexural elements being formed.

The proximal support member carrier (**208\*\*\*) reversibly engages support members held within the parts feeder one at a time. The proximal support member carrier (208\*\*\***) moves the support member as it interacts with the lateral force mechanism to combine the support member with the flexural members/relaxed members.

In this A-SEM embodiment the component mechanisms **208\*\*, 208\*\*\* and 210 exhibit synchronized reciprocal motion to orient support members and sinusoidal shaped members. The component mechanisms 208\* and 204** exhibit motion sequentially in one direction to draw in new material incrementally to extrude and assemble the sinusoidal structure.

Figure 14B:
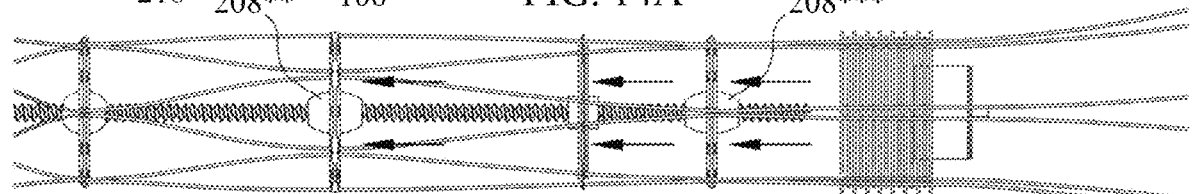
FIG. 14B is a side view of an A-SEM embodiment showing the mid support member carrier (208) and proximal support member carrier (208*) actively positioning/sliding support members while a lateral force mechanism (210) moves in unison to position the flexural members.

FIG. 14B depicts the A-SEM's mid support member carrier (**208\*\*), proximal support member carrier (208\*\*\*) and lateral force mechanism (210) in motion driven by the prime mover (216)/stepping motor and axial worm gear (218**).

Note: in this embodiment the completed structure has support members that are evenly spaced. **208\*\*, 208\*\*\* and 210 move axially in unison at the same rate. 208\* and 204 move along the A-SEM's axis in a sequence. 208\*** moves as a unit and remains engaged/anchored to the completed sinusoidal structure while the other A-SEM mechanisms actuate.

For the support members' spacing to vary, the support member carriers' (208*, 208 and 208*) motion and positioning functions need to be controlled independently as depicted in FIGS. 6A-6C.

The variable spacing of the support members requires the independent control of the support member carriers (208) and lateral force mechanism(s) (210). This may require the said components reversibly engage from the worm gear.

Figure 14C:
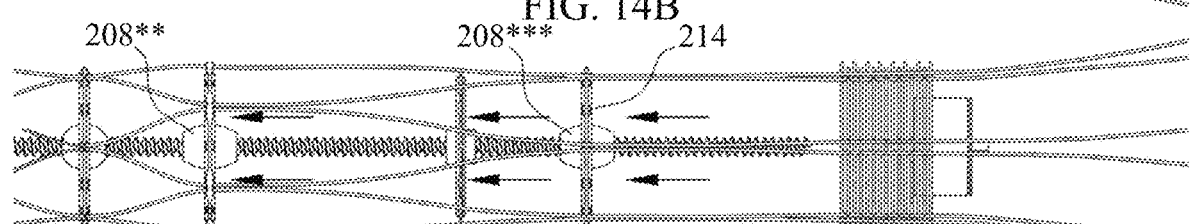
FIG. 14C is a side view of an A-SEM embodiment showing support member carriers (208 and 208*) having positioned support members to be released during the next reciprocal cycle.
Figure 15A:
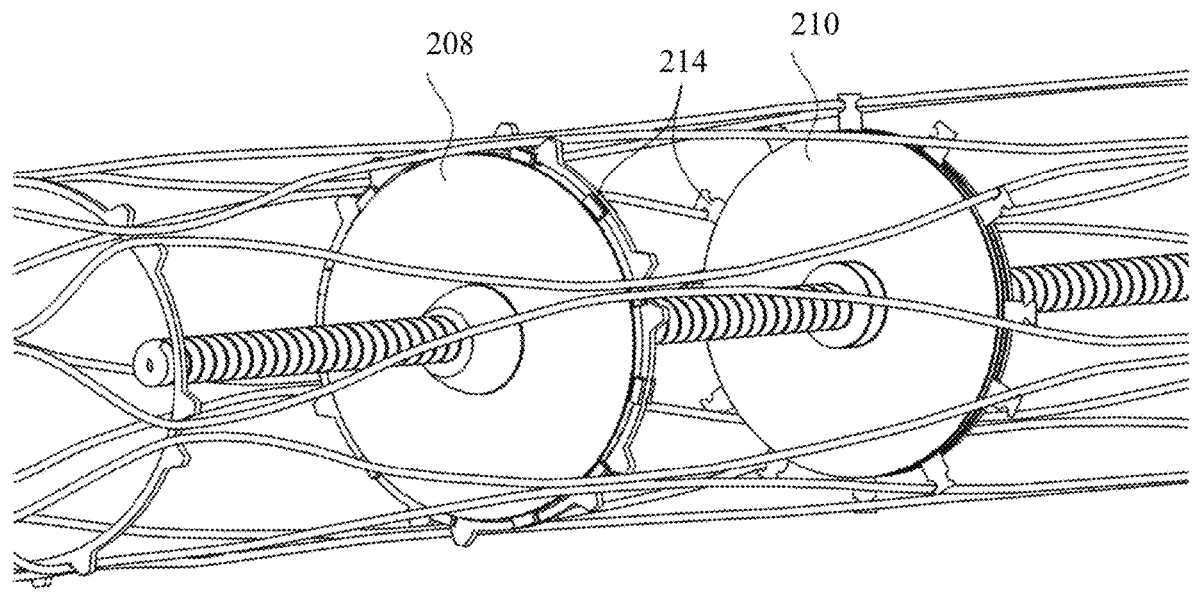
FIG. 15A is a perspective view of an A-SEM embodiment having a support member carrier (208) with actuatable fingers (214) that have extended to engage a support member and also a lateral force mechanism (210) having actuatable fingers (214) that apply force to the flexural members.
Figure 15B:
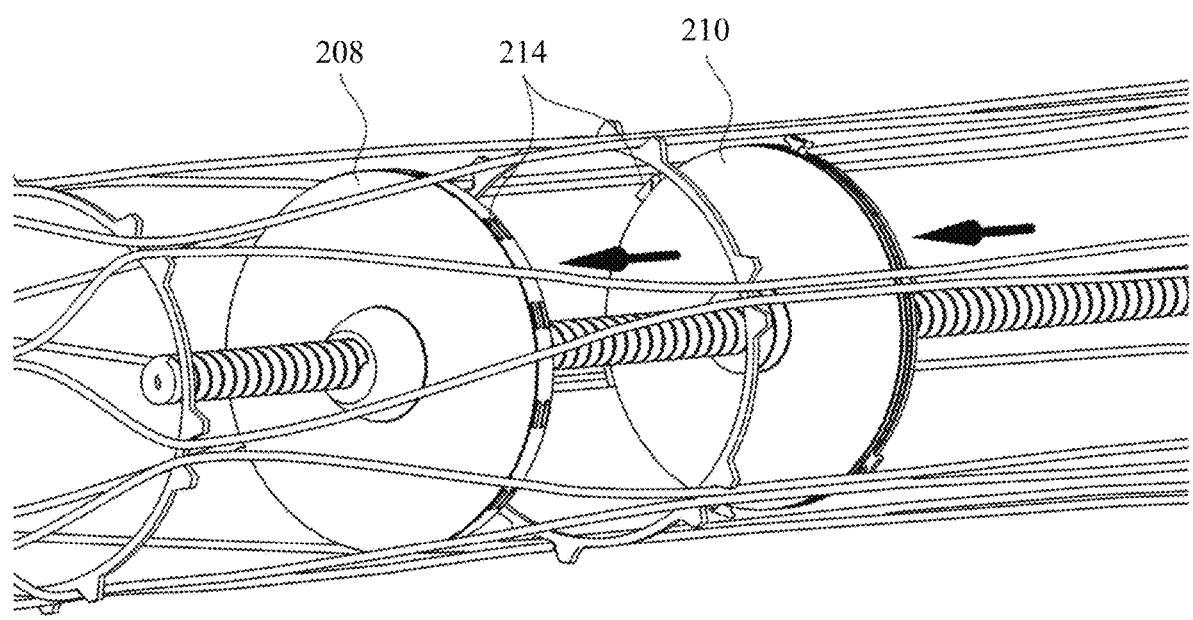
FIG. 15B is a perspective view of an A-SEM embodiment having a support member carrier (208) with actuatable fingers (214) that have retracted to disengage a support member and also a lateral force mechanism (210) having actuatable fingers (214) that have released the flexural members.

FIG. 14C depicts these three support member carrier mechanisms (208) at the extent of their travel within the chassis. The mid support member carrier (208) moves its support member (104) to its final position and the proximal support member carrier (208*) moves its support member to an intermediate position. Note: as depicted in FIGS. 15A-15B the A-SEM's support member carriers and lateral force mechanism are designed to pass through the interior opening of the support members when their actuator fingers (214) retract.

Figure 14D:
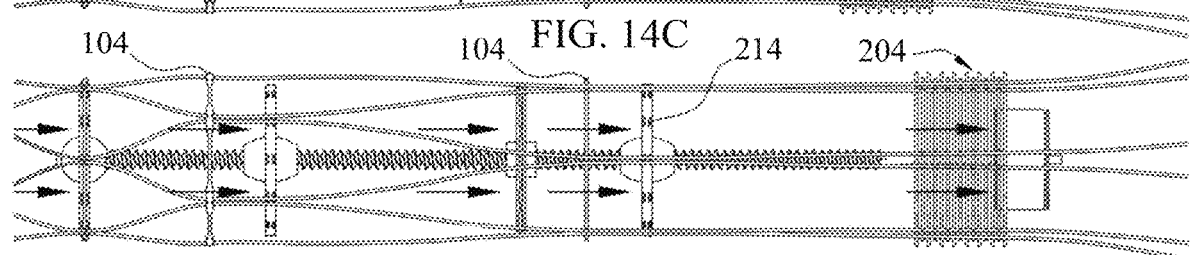
FIG. 14D is a side view of an A-SEM embodiment showing support members (104) being released after being positioned by the support member carriers (208 and 208*), in turn these support member carriers (208 and 208*) and the lateral force mechanism (210) reverse direction to move and begin the next cycle, as the parts feeder (204) moves in suit to introduce new materials.

FIG. 14D depicts the A-SEM's mid support member carrier (208), proximal support member carrier (208*) and lateral force mechanism (210) detaching from the structure's parts to begin a new λ/2 extrusion event.

Figure 14E:
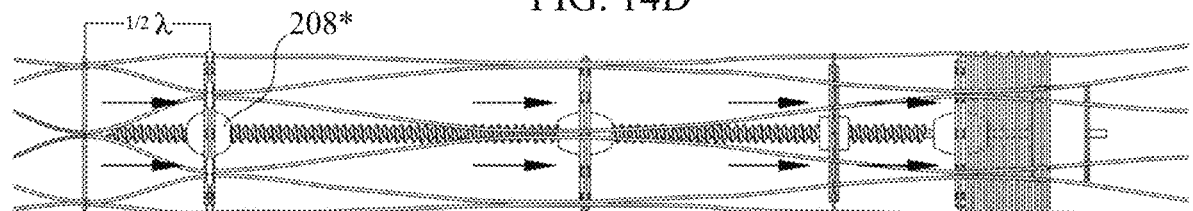
FIG. 14E is a side view of an A-SEM embodiment showing the distal support member carrier (208*) moving into its new position to incrementally (λ/2) extend the sinusoidal structure as new materials are drawn in from the parts feeder (204) and 208,208* and 210 are positioned to the same point in the cycle as shown in FIG. 14A (a new cycle).

After these mechanisms engage the parts to form the next λ/2 flexural region as depicted in FIG. 14E, the distal support member carrier (208*) moves to engage the completed structure's newly positioned support member. This action anchors the A-SEM allowing the parts feeder and chassis to extend and drawing in a "new" region of relaxed material member.

Figure 14F:
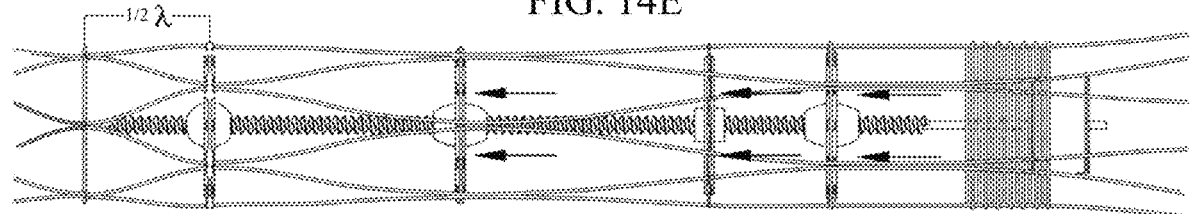
FIG. 14F is a side view of an A-SEM embodiment showing the sinusoidal structure lengthened by one flexural region (λ/2) and the assembly mechanisms at the same point in the cycle as shown in FIG. 14B.
Figure 14G:
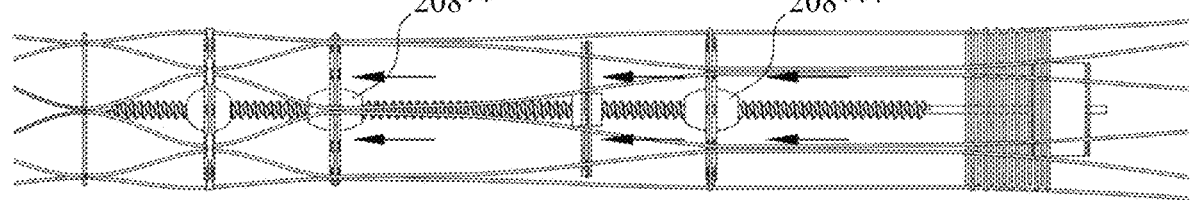
FIG. 14G is a side view of an A-SEM embodiment showing the sinusoidal structure lengthened by one flexural region (λ/2) and the assembly mechanisms at the same point in the cycle as FIG. 14C. At this point the assembly has become 1λ longer.

FIG. 14F depicts the addition of a λ/2 flexural region to the sinusoidal structure. This is the same point in the A-SEM's reciprocal cycle depicted in FIG. 14B. FIGS. 14G and 14C similarly depict the same point in the A-SEM's reciprocal cycle.

FIGS. 15A-B depict an exemplary A-SEM embodiment having support member carriers (208) and a lateral force mechanism (210) with actuatable components that reversibly engage with the worm gear, the structure's support members and relaxed members/flexural members. The support member carriers (208) have actuatable fingers (214) that extend and retract to reversibly engage and position support members during deployment. The lateral force mechanism (210) has actuatable fingers (214) that extend outward, retract and move radially, as they reversibly contact and guide the flexural members.

FIG. 15A depicts the exemplary mechanism's actuatable fingers (214) engaging the structure during assembly/deployment. FIG. 15B depicts the mechanisms actuatable fingers (214) disengaging the structure during assembly. These component actuators or mechanisms may be mechanically timed or electrically controlled. The actuators may take on different forms but all serve to engage and/or guide the support members and sinusoidal shaped members during assembly.

Energy Harvesting

As previously described, A-SEM embodiments may passively and/or actively assemble and deploy a sinusoidal structure. Methods of harvesting elastic potential energy from deformed material are utilized by the A-SEM to deploy and/or assemble a sinusoidal structure.

The A-SEM's components may be completely driven or partially driven by elastic potential energy that is stored in elastically deformed material used to build a sinusoidal structure. The elastic potential energy held within the pre-deployed material parts may be stored locally in reels, a magazine, a buckled/folded stack of components, or remotely in a hopper type of system.

The parts feeder can be passively driven, such that its parts can be driven by elastic potential energy that is stored in and harvested from deformed elastic material. This elastic material is stored in the parts feeder and is organized to efficiently release elastic potential energy.

Material held within the parts feeder prior to deployment is considered pre-deployed and can serve as a reservoir of elastic potential energy. Elastic potential energy is stored energy that results when an applied force deforms an elastic object.

The extent to which elastic potential energy is used to deploy a sinusoidal structure can range from total, to partial, to nonexistent, i.e., A-SEM embodiments may use elastic potential energy to exclusively deploy a sinusoidal structure passively or A-SEM embodiments may use elastic potential energy to assist an active mechanism like a prime mover to deploy the sinusoidal assembly.

Figure 18A:
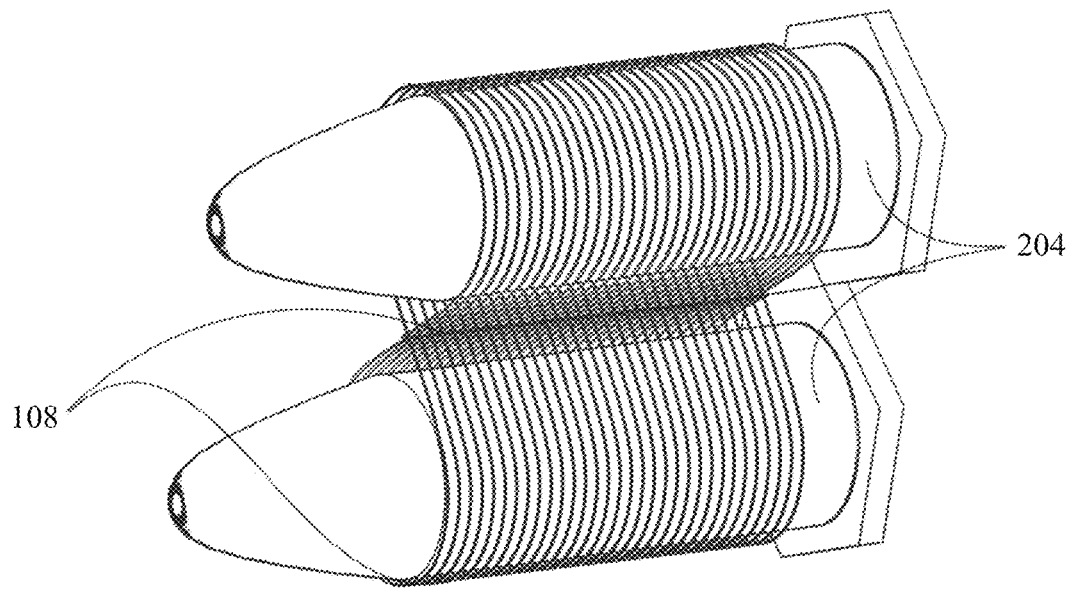
FIG. 18A is a perspective view a unit flexural member organized as a lemniscate being held and supported within a parts feeder (204).

The parts feeder (204) types depicted in FIG. 4B, FIG. 13B, FIG. 18A stow and feed the material parts used to form a sinusoidal structure (110). The material parts held within the parts feeder may act as a reservoir of elastic potential energy used by the A-SEM to drive the assembly process.

The energy required to elastically deform relaxed members to form sinusoidal shaped members could be held or partially held as potential energy within the parts feeder. The potential energy used to elastically deform relaxed members into sinusoidal shaped members is stored within the completed sinusoidal member's structure in the form of elastic potential energy. A material's deformation is elastic if a body returns to the original shape after the force/stress/strain is removed. It may be possible to store more elastic potential energy in the pre-deployed material held in the parts feeder than exists in the deployed/completed sinusoidal member's structure.

A-SEM embodiments may incorporate mechanisms that actively or passively apply lateral, torsion and/or axial forces to the "relaxed" members during assembly to deploy the sinusoidal structure. Active deployment refers to the use of an external force(s) to apply lateral, torsion and/or axial force to the sinusoidal member during assembly. External forces are forces caused by an external agent(s) outside of the system.

The forces used to shape the sinusoidal members could be introduced or partially introduced by energy stored in the deformed material held in the parts feeder. A-SEM embodiments that actively deploy/assemble sinusoidal structures may vary in their mechanical complexity and use of external force to degrees. Generally, the greater the A-SEM embodiment's mechanical complexity the greater its reliance on external forces (a prime mover, for example).

A-SEM embodiments having few if any actuatable mechanical parts may primarily or exclusively use stored elastic potential energy to deploy and/or assemble a sinusoidal structure. Such a system would facilitate the flow of elastic potential energy/internal forces from the packed material in the parts feeder to the sinusoidal structure. Internal forces are exchanged and generated by the objects in the system.

Completely passive deployment refers to the controlled release of the pre-deployed structure using internal forces.

Exemplary passively deployed A-SEM embodiments may incorporate pre-deployed material that exhibits bifurcation buckling and deploys a sinusoidal structure with or without an active timing mechanism. Exemplary A-SEM embodiments may also have simple actuatable fingers (214) that act as "catalytic flickers" to guide and initiate the transition (unbuckling) from packed material to extruded/deployed sinusoidal structure. A parts feeder (204) utilizing a track system driven by an active mechanism may time the "catalytic flicker" to allow the passive trajectory control of the pre-deployed deformed material from its internal storage location or within an external hopper.

The parts feeder is a component part of the A-SEM and where pre-deployed material is stowed. The parts feeder moves material to be assembled into a sinusoidal structure.

Methods of storing and organizing elastic material in the A-SEM's parts feeder helps determine the quantity of elastic potential energy being stored and available for deployment. Exemplary methods of organization and deforming the elastic material may include, but are not limited to, a continuous spiral torsion spring(s) or a continuous space lemniscate(s). This pre-stressing of the material in the parts feeder can then be incrementally released by the A-SEM as stored elastic potential energy used for assembly.

Determining the correct methods of storing and harvesting energy from pre-deployed material is crucial. The stored potential energy held in the pre-deployed material may passively reshape it into a sinusoid during deployment. It could also be indirectly transferred through mechanical components within A-SEM embodiments designed to actively shape the material as it is being deployed. The seamless transfer or elastic potential energy from the pre-deployed material's shape to the deployed material's shape is desirable.

Various methods or mechanism(s) designed to harvest the elastic potential energy from the material stored within the parts feeder may be used. Elastic material could be loaded into the parts feeder by folding and/or buckling, enhancing its ability to be efficiently deployed as a sinusoidal shaped member.

Packing/organizing the parts feeder with material by twisting and snap buckling it to form a series of loops under mechanical stress may be an efficient method used to stow and deployed a single piece of relaxed material as a sinusoid.

Elastic members held in the parts feeder, under stress may be controllably released and (re)shaped into a sinusoid by the A-SEM. There is a point in the process where the elastic member transitions from the shape held in the feeder to a sinusoidal shape. At this transition point or region, the member can be considered relaxed, relaxed in the sense that it is being reshaped/transitioned and in an intermediate/relaxed state.

The material's elasticity and the organization used when packing the elastically deformed pre-deployed members in the parts feeder have similarities to DNA elasticity and local geometry in the hierarchical packaging of the genome. Chromosomes condense and then relax during unpacking. The elastic potential energy stored within the deformed DNA may impact the efficacy of the unpacking process, similarly the unpacking and shaping of a sinusoidal member from the deformed material within the A-SEM parts feeder is made more efficient because of the material's store of elastic potential energy. Methods of packing viral generic material to be elastically deployed into a host cell may provide insight into how to efficiently extrude/deploy sinusoidal assemblies.

Packing/methods of organization may allow materials to be optimally deployed by the A-SEM. Packing methods may be designed to drive mechanisms within the A-SEM that assemble pre-stressed structure. Packing methods may be designed to allow the support members (104) and deflected relaxed members (100) to interconnect and attach as the material is being deployed/extruded to form a sinusoidal structure.

Example A-SEM Embodiment 2 (with Passively Driven Components)

Figure 16A:
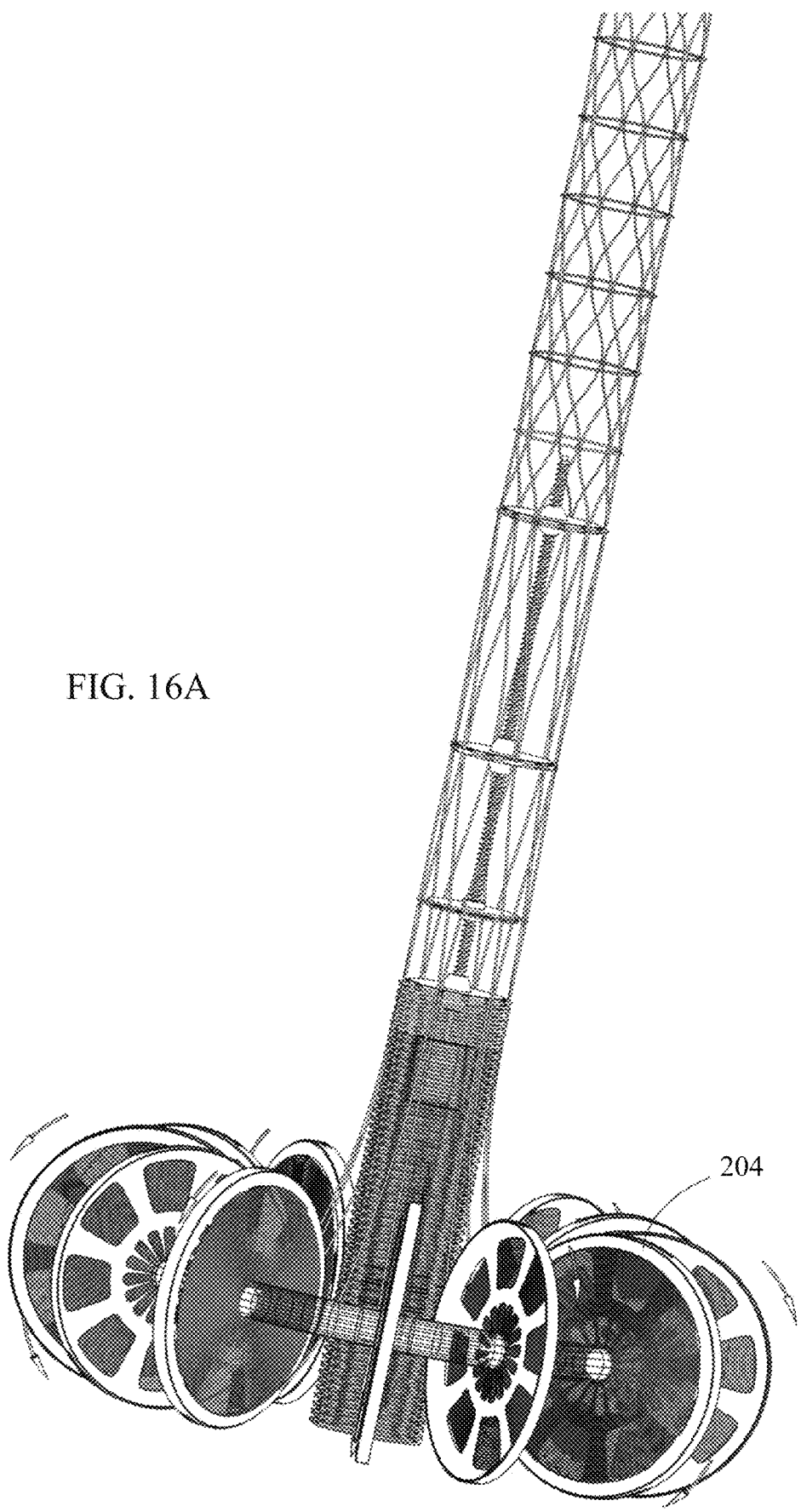
FIG. 16A is an orthogonal view of an A-SEM embodiment capable of harvesting the elastic potential energy held in the deformed material that is stowed on reels within the parts feeder (204) to drive the assembly of a sinusoidal structure.

FIG. 16A debits an A-SEM (200) embodiment that incorporates material parts feeding (204) driven or partially driven by the elastic potential energy stored within the deformed material used to form the sinusoidal structure (110).

The elastic potential energy could be release incrementally in units (of length or force, for example) that correspond to A-SEM's reciprocal motion and incremental extrusion. A pre-deployed member's frequency of folding or coiling and the properties of the sinusoid being deployed may be interrelated. This integrated incremental deployment mechanism could function similar to a watch's balance spring and main spring mechanism to drive a mechanical loom. As the coil main spring releases elastic potential energy, it is incrementally deployed to form a sinusoidal shaped member. The incremental motion of the spring mechanism including a balance wheel may time and possibly drive the reciprocal motion that positions the support members during the assembly process.

Figure 16B:
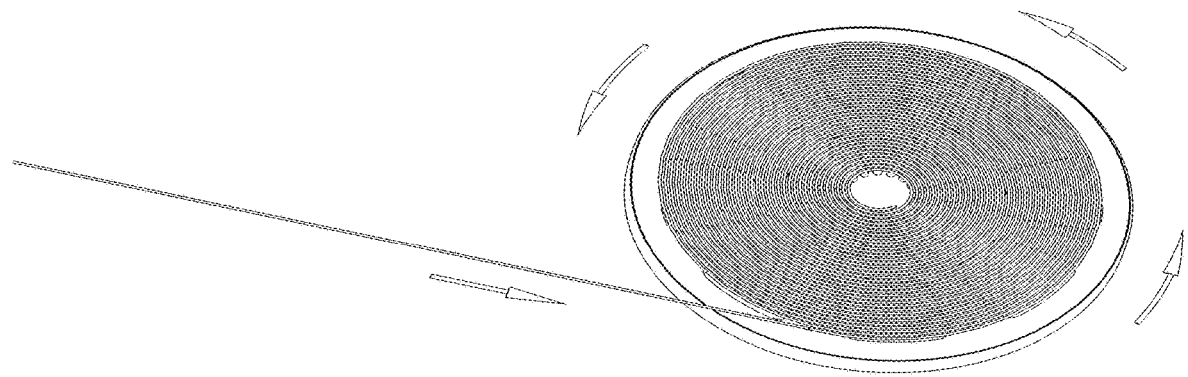
FIG. 16B is a perspective view of a parts feeder reel being stowed with a flexural member to form a spiral (i.e. spiral flexure spring) containing elastic potential energy that can function as an energy reservoir to drive mechanisms and apply forces within the A-SEM.

In FIG. 16B a relaxed member takes on a spiral shape as it is loaded into a parts feeder and elastically deformed as a method of storing elastic potential energy. This stored elastic potential energy can be utilized to drive the A-SEM during assembly to form a sinusoidal structure.

Figure 16C:
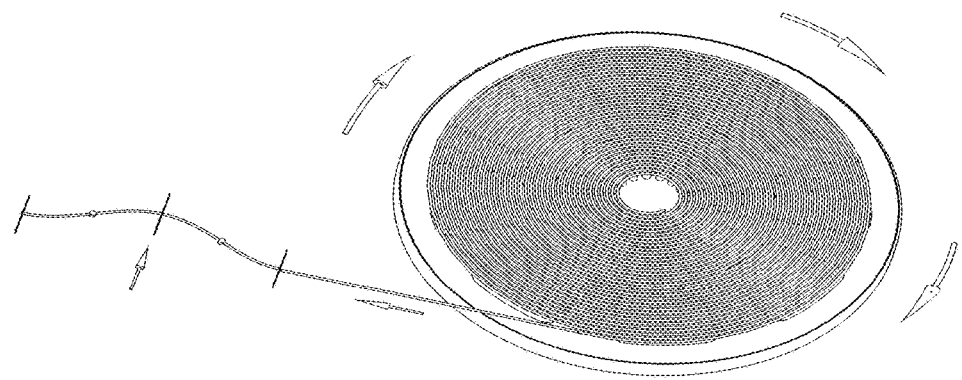
FIG. 16C is a perspective view of a parts feeder reel's flexural member spiral being deployed/extruded and applying an axial force to itself causing its axial deflection and the formation of 1λ flexural element.

FIG. 16C depicts an exemplary parts feeder being driven by its stored/stowed material's elastic potential energy to apply axial force to the "relaxed member" causing or aiding in its lateral displacement. When a slender structural member is loaded with increasing axial compression force, the member deflects laterally and combined bending and compression ensues rather than direct compression alone. This phenomenon is called buckling and it can be utilized by the A-SEM to form the sinusoidal shaped member.

Figure 16D:
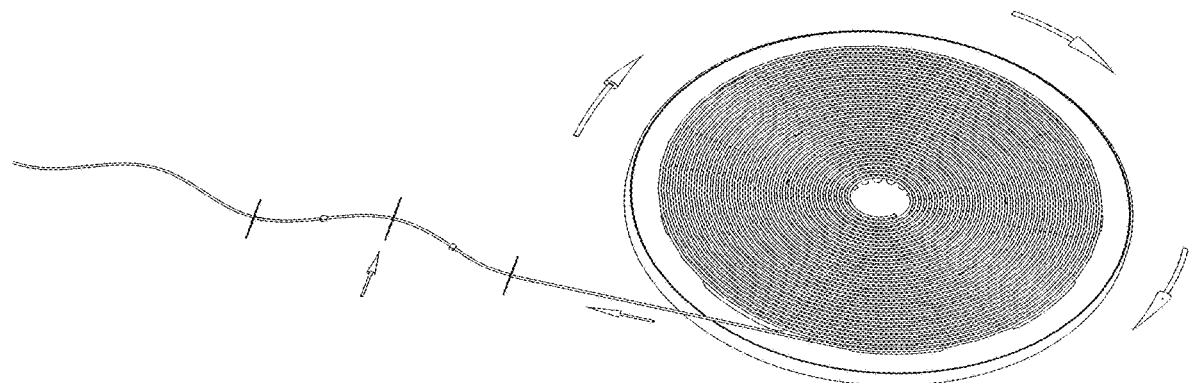
FIG. 16D is a perspective view of a parts feeder reel's flexural member spiral being deployed and applying an axial force to itself causing its axial deflection and the formation of an additional 1λ flexural element, 2λ in total.

FIG. 16D depicts a length of the elastically deformed flexural member stored within the parts feeder being incrementally outputted as a sinusoidal shaped member.

The elastic potential energy held within the deformed material stored in the A-SEM's parts feeder's hopper can be utilized to shape and deploy the sinusoidal shaped members. The shape and organization of the deformed material packed in the hopper can be specific to the physical properties required to form the sinusoidal shaped members to be deployed. The methods of packing/organizing slender elastic material in the feeder or external hopper can include but is not limited to buckling, coiling, folding and twisting. Packing methods may also involve the slender flexural members being organized as sinusoidal spirals.

Example A-SEM Embodiments (Having Minimal Components)

Figure 17A:
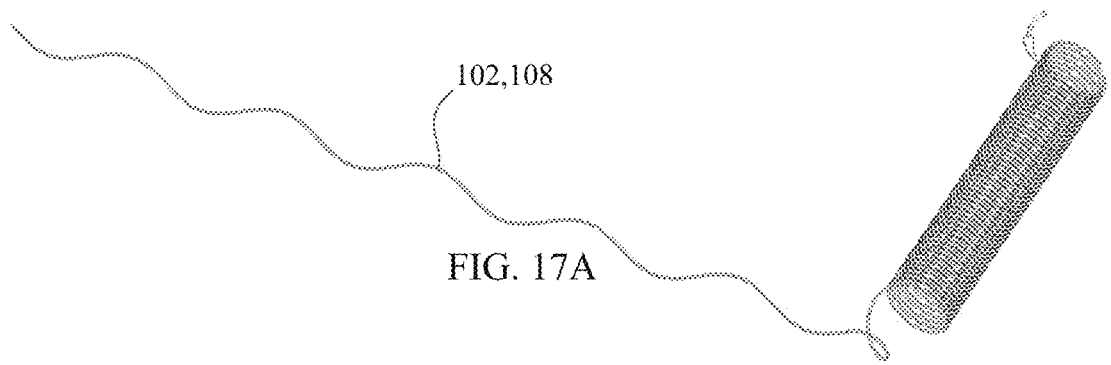
FIG. 17A is a perspective view of a helix being changed topologically into a sinusoid.
Figure 17B:
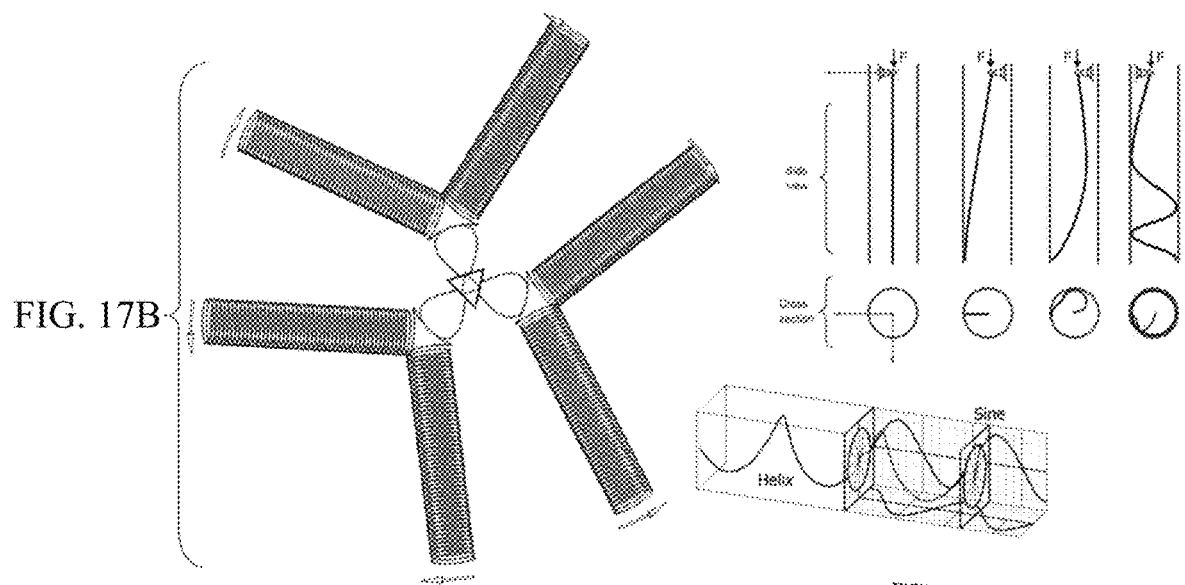
FIG. 17B is a top view showing the possible organization of the support members and the elastic material used by the A-SEM to form the sinusoidal structure.
Figure 17C:
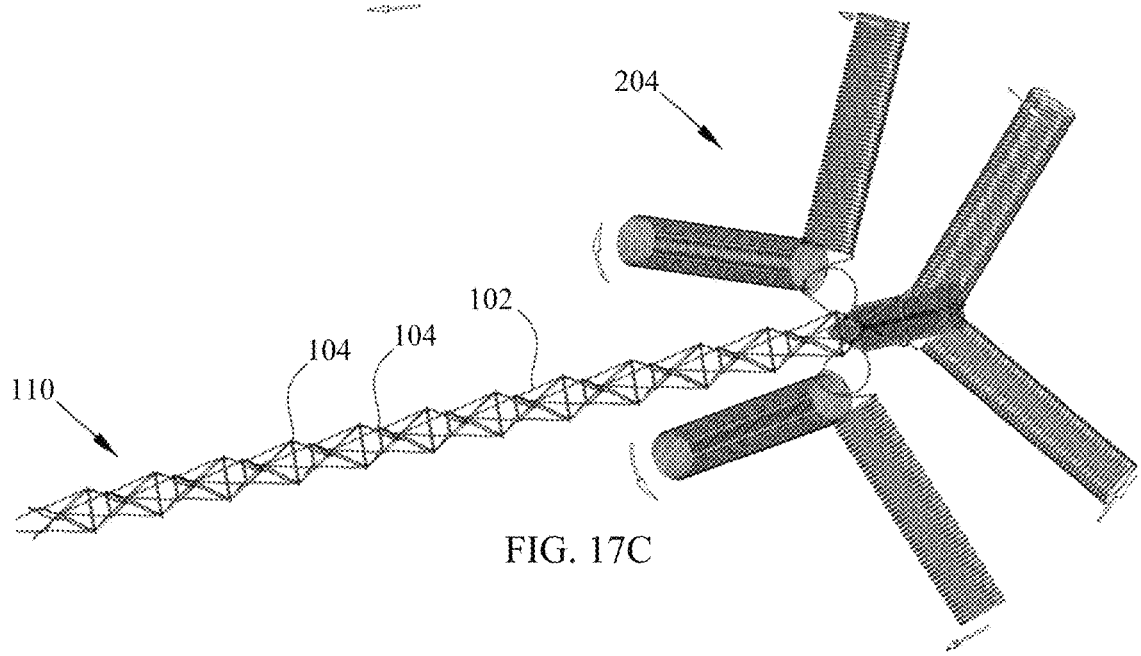
FIG. 17C is a perspective view of the sinusoidal structure (110) and a method of organizing support members (104) and elastic flexural members in the A-SEM's parts feeder.

FIG. 17A-C depicts a method of using the stored potential energy held in the deformed (previously relaxed) elastic material members to increase the efficiency of the sinusoidal structure's deployment by the A-SEM during the assembly of a sinusoidal structure. FIG. 17A depicts the unwinding of the coiled/deformed elastic material by the A-SEM as it feeds the formation of the sinusoidal shaped member. The elastic potential energy stored in the coil/helix is maintained and redirected as it is shaped/morphed into a sinusoid by the A-SEM. The packed elastic material is helically buckled to form a coil and unpacked to form a buckled sinusoid.

A sine wave can be thought of as a helix in 3D. Viewed from the end it's a circle, from the side it's a sine wave. The relationship between the coils of a spring and sinusoids: eix=cos x+i sin x.

FIG. 17B-C depicts this method of packing material in coils and shows how they might be oriented in an A-SEM's parts feeder. The A-SEM's mechanisms may rotate the coils to deploy them as topologically equivalent sinusoidal shaped members and connecting them to support members and deploy them as a pre-stressed sinusoidal structure (11). FIG. 17B is a top view of the material organization. The phenomena of tubular string buckling may be utilized to pack and/or unpack materials used to form sinusoidal structures.

Applying twisting and bending to slender flexural members' lengths as they are being stored in the parts feeder may be an efficient method of organizing, deforming and buckling them as they are being packed to become pre-deployed material. Elastic flexural-torsional buckling behavior may also enhance the members' ability to extrude/deploy.

Strain energy due to torsion along the elastic material members' length may also impact their ability to controllably deploy and enhance their strength when extruded to become part of a sinusoidal structure.

The compartmentalization of torsion or lack of it along the length of a flexural member is important to its deployment and to its methods of storage. A flexural member held in the parts feeder having evenly distributed torsional elastic potential energy along its entire length and one having potential energy that varies along its length will behave differently during deployment. A method of isolating torsional potential energy to a specific region of a flexural member can be attained by having support members make locking attachment with the flexural member as the potential energy is applied. In effect each flexure element (106) forming a region between support members can be given an amount of elastic potential energy.

The elastic flexural member held as a helix within the parts feeder becomes a straight "relaxed" member placed under torsion as the helix is uncoiled by rotating and extracting it. This torsion is elastic potential energy that can be used to form that sinusoidal shape member shape. The elastic potential energy held in the helix goes to form a straight (relaxed) member under torsion. The flexural member's potential energy then aids in the shaping of a sinusoidal shaped member.

The wavelength of the deployed sinusoid and the dimensions of the turns of the pre-deployed helix must be calibrated to form the desired torsion or lack of it present in the flexural element before and after it becomes a sinusoidal shaped member, i. e., the transition from pre-deployed packed material to a deployed sinusoid may result in residual torsion along the member's length.

The controlled application of torsion along the sinusoidal members' length when in assembly may impact the performance and flexural strength of the structure. Torsion along the length of the sinusoidal member may impact the finished sinusoidal structure's ability to exhibit bifurcation buckling behavior.

Figure 18B:
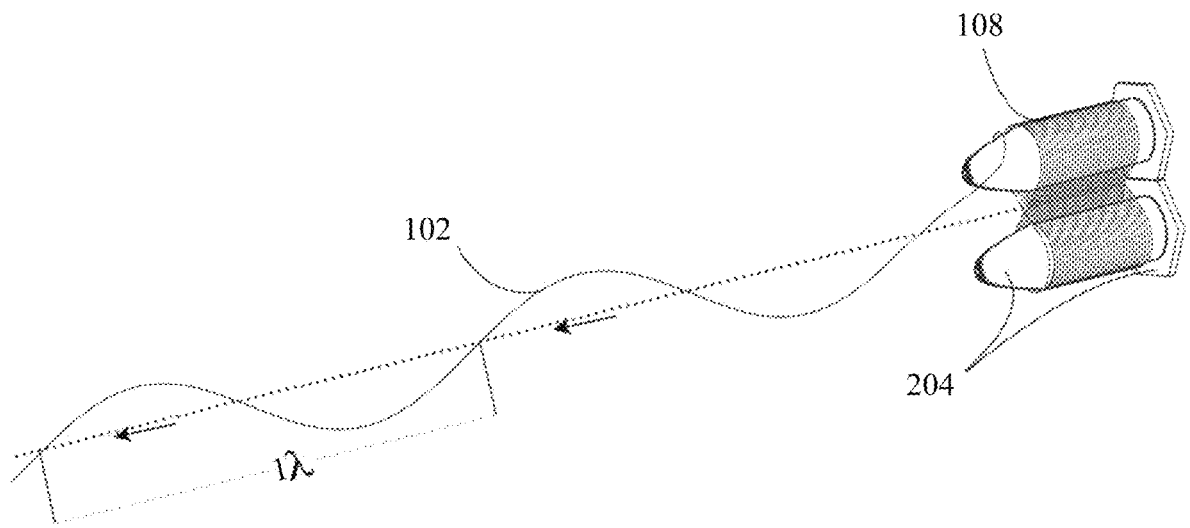
FIG. 18B shows the flexural member (108) being deployed from the parts feeder to form a sinusoidal shaped member (102).
Figure 18C:
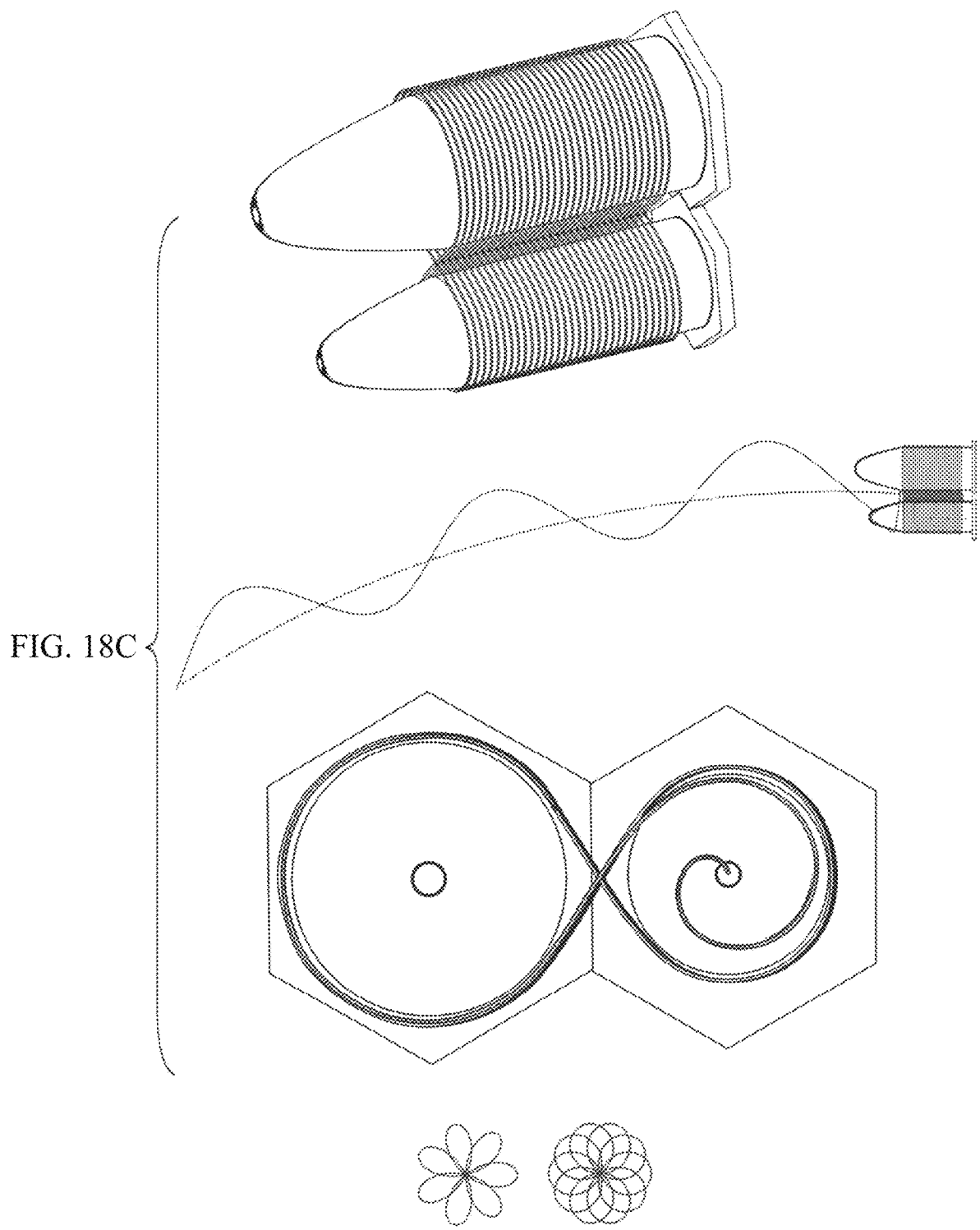
FIG. 18C shows a parts feeder stowing and deploying a flexural member to form a curved sinusoidal member.

FIG. 18A-C depicts a method of storing both pre-deployed material and elastic potential energy within the A-SEM's parts feeder (204). The elastic potential energy held within the pre-deployed flexural member (108) can be used to self-deploy the sinusoidal member (102).

FIG. 18A depicts a flexural material member (108) stowed as a lemniscate within a parts feeder (204). The continuous flexural member is elastically deformed into a space lemniscate shape. FIG. 18B depicts the flexural member (108) in the form of a lemniscate transitioning into a sinusoidal member (102) as it is deployed.

The pre-deployed lemniscate's dimensions can dictate the sinusoidal member's wavelength and amplitude. For example, FIG. 18C depicts a lemniscate/flexural member (108) having asymmetric loops organized to exhibit wave parameters that will deploy a sinusoidal member (102) along a curved path. This sinusoidal member is deployed incrementally as contiguous flexures having non-identical wave properties causing the sinusoid's curved trajectory.

Note: the member cannot maintain its sinusoidal shape without it connecting to another sinusoidal member at its anti-nodes through support members and also that an Archimedes spiral forms during the transition from lemniscate to sinusoid.

Methods of utilizing elastic flexural-torsional snap buckling to organize pre-deployed flexural members include, but are not limited to, coils, lemniscates and rose curves.

Torsion applied along the flexural member's length as it is being packed (similar to tubular string buckling (FIG. 17B)) may be maintained as stored potential energy and may assist in the member's self-deployment. Torsion may also be actively applied during or prior to the structure's deployment.

The exemplary pre-deployed/stowed material structure(s) maintained in the parts feeder (204) depicted in FIGS. 18-20 exhibit bistable characteristics that allow it to maintain structural robustness in both a stowed/pre-deployed and deployed state.

Figure 19A:
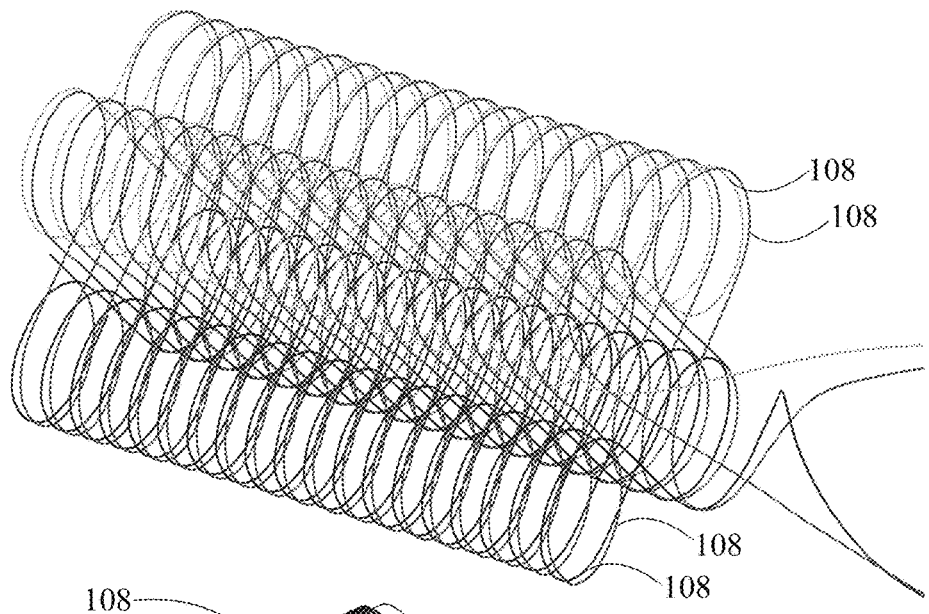
FIG. 19A is a perspective view of a grouping of four lemniscates formed from buckled flexural members (108).
Figure 19B:
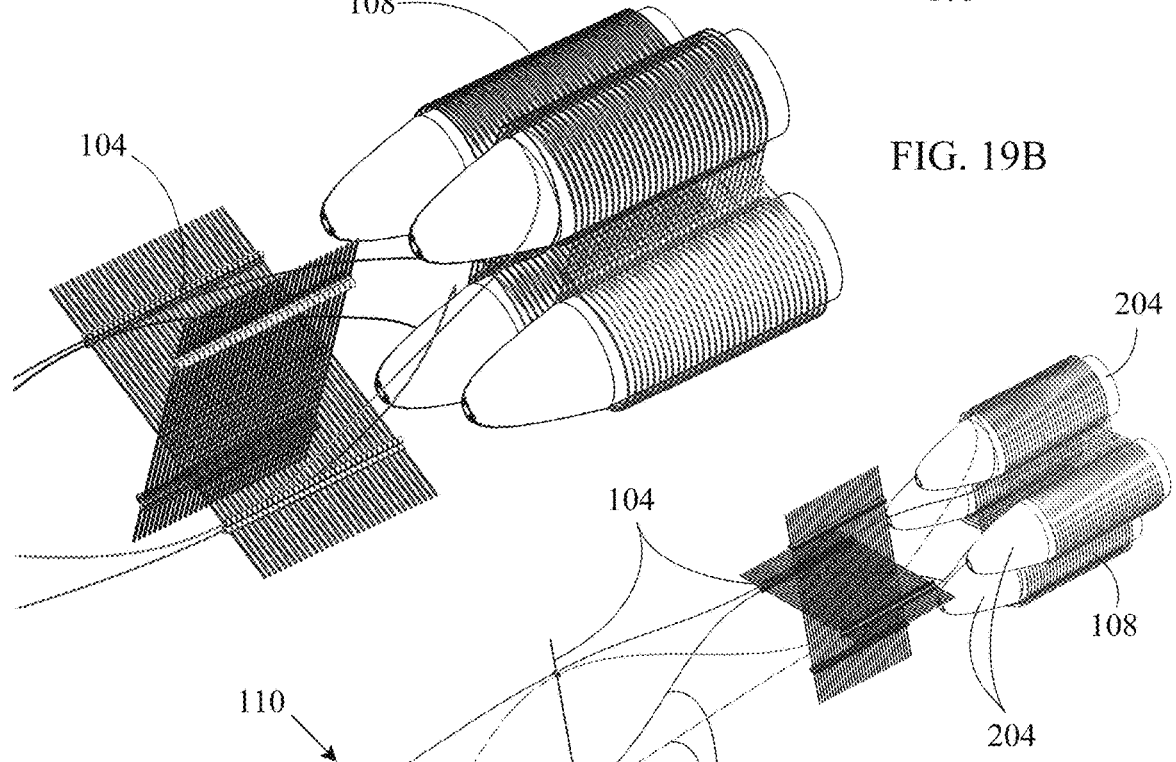
FIG. 19B is a perspective view of flexural members and support members (104) oriented to engage with one another during deployment.
Figure 19C:
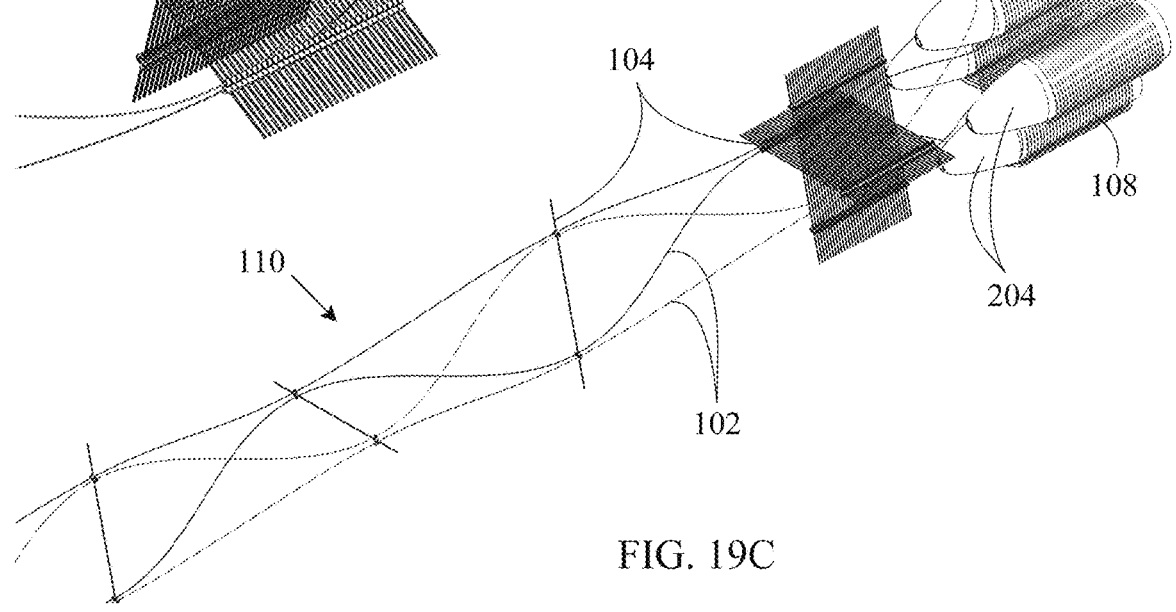
FIG. 19C shows a sinusoidal structure (110) being deployed from the parts feeder (204).

FIG. 19A-C depicts a method of organizing deployable flexural members (108) in the form of interlaced lemniscates that unbuckle and make locking attachment to support members (104) during deployment.

FIG. 19A depicts four individual lemniscates as interlaced. The orientation of the interlaced lemniscates is topologically equivalent to a group of parallel oriented members. Each pre-deployed flexural member (108) is identified by a different color.

In FIG. 19B the support members (104) and flexural members (108) are organized to deploy and make locking attachment to form a sinusoidal structure (110) composed of sinusoidal members and support members. Before deployment the support members are not connected to the flexural members. After deployment the flexural members (108) become sinusoidal members (102) when they attach with support members to form a sinusoidal structure (FIG. 19C).

Figure 19D:
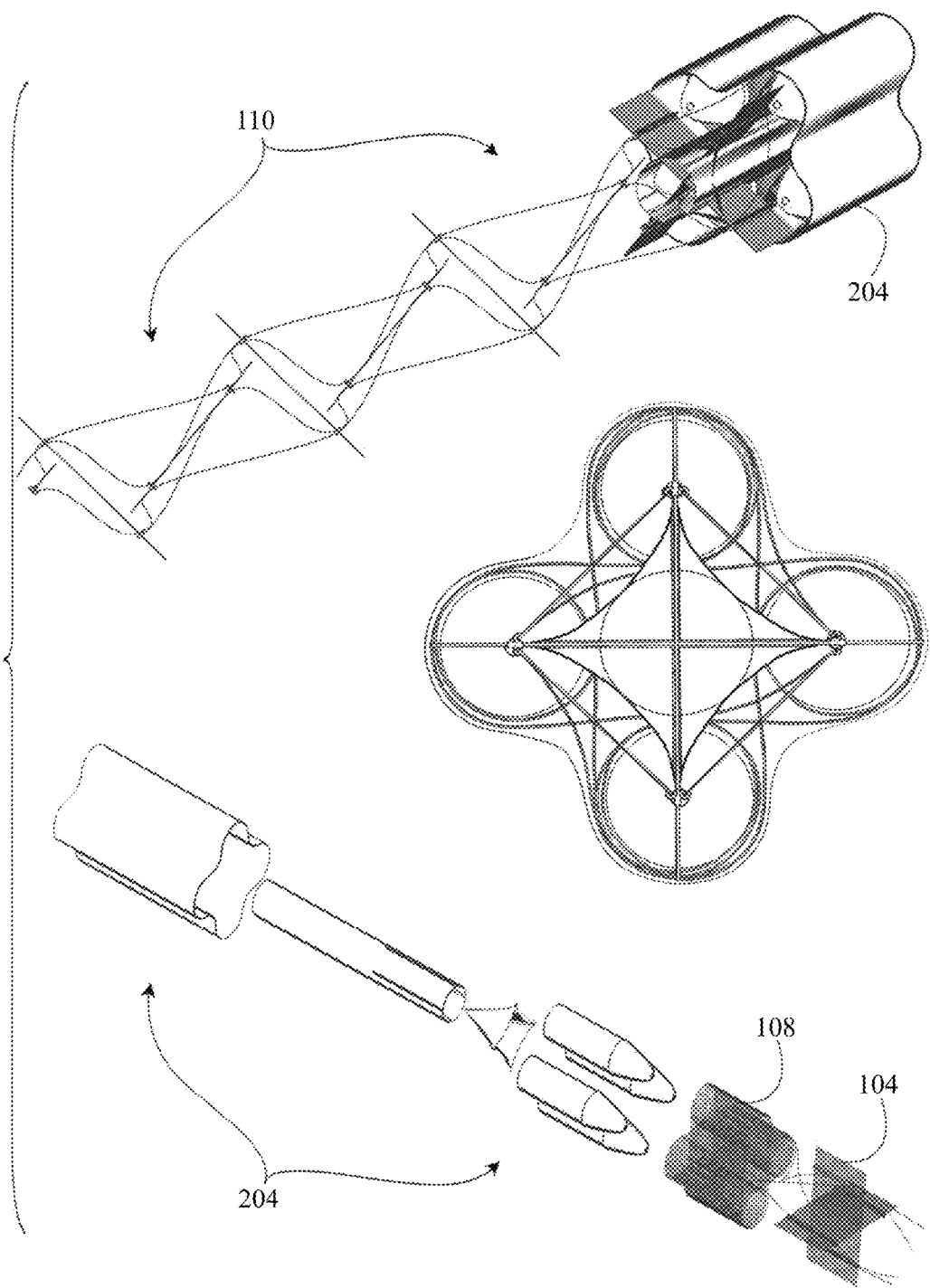
FIG. 19D is a perspective, front and exploded view of an A-SEM embodiment showing its component parts and also the material parts that go to form a sinusoidal structure.

In this exemplary A-SEM embodiment the parts feeder (204) is the fundamental component part. FIG. 19D depicts the parts feeder and the sinusoidal structure's material parts in exploded view. The parts feeder stows, stabilizes, guides and deploys the flexural members and support members. The parts feeder may incorporate devices that deploy the material parts to form a sinusoidal structure (110). A relatively small axial force applied to regions of the stowed buckled assembly held in static equilibrium could initiate its deployment to form a sinusoidal structure. The contoured parts feeder (204) housing components depicted in FIG. 19D are designed to provide an efficient extrusion environment for the stowed assembly. An optimized extrusion/deployment process may be controlled and be made as unencumbered by friction as possible. The elastic potential energy present in the pre-deployed material may change after deployment.

FIG. 20A-D depicts an A-SEM embodiment with a parts feeder (204) that stows pre-deployed flexural members and support members in locking attachment (i.e. pre-assembled). Upon the stowed material's deployment, a sinusoidal structure is formed.

Figure 20A:
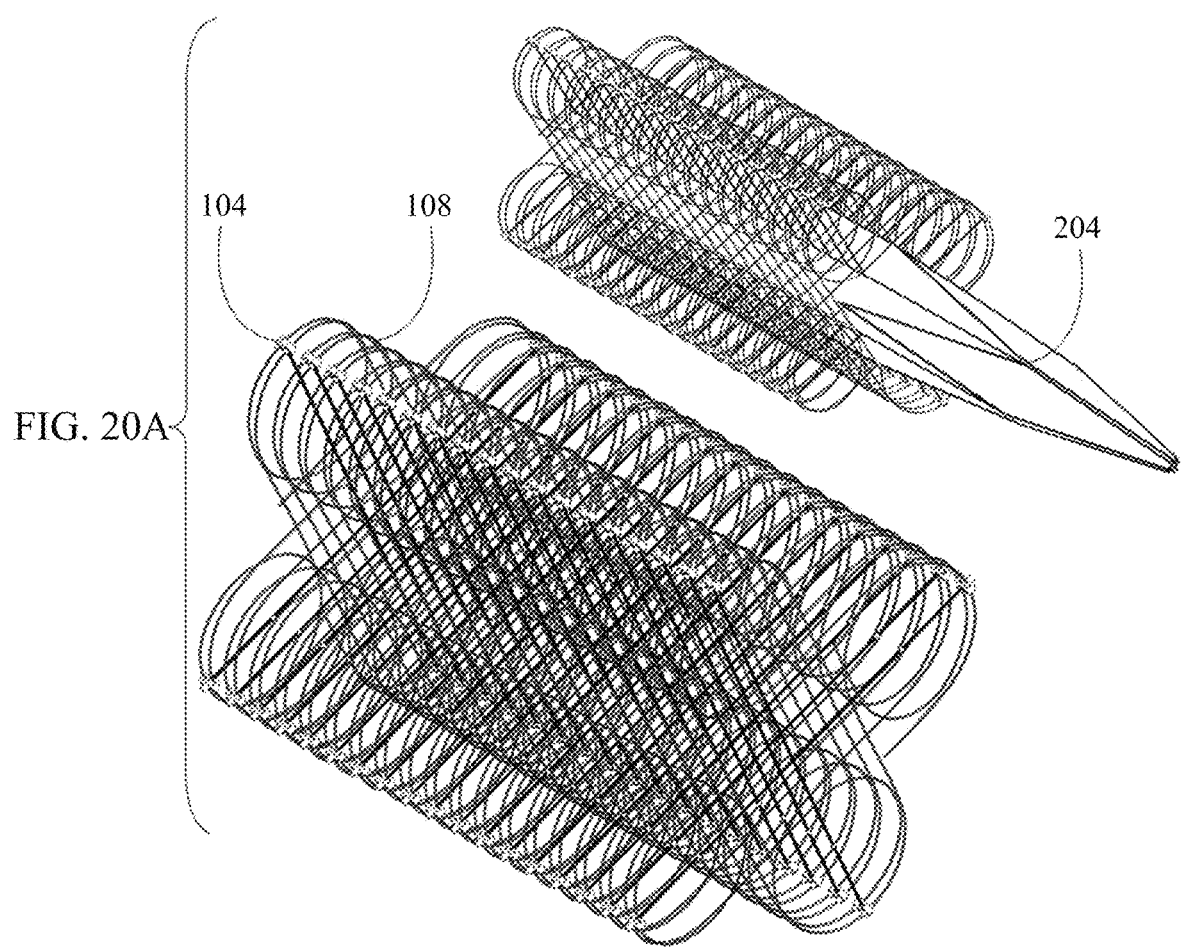
FIG. 20A shows a snap buckled pre-deployed assembly composed of flexural members and support members that form locking attachment before they are deployed and are stowed in the parts feeder (i.e. the pre-deployed assembly is pre-assembled).
Figure 20B:
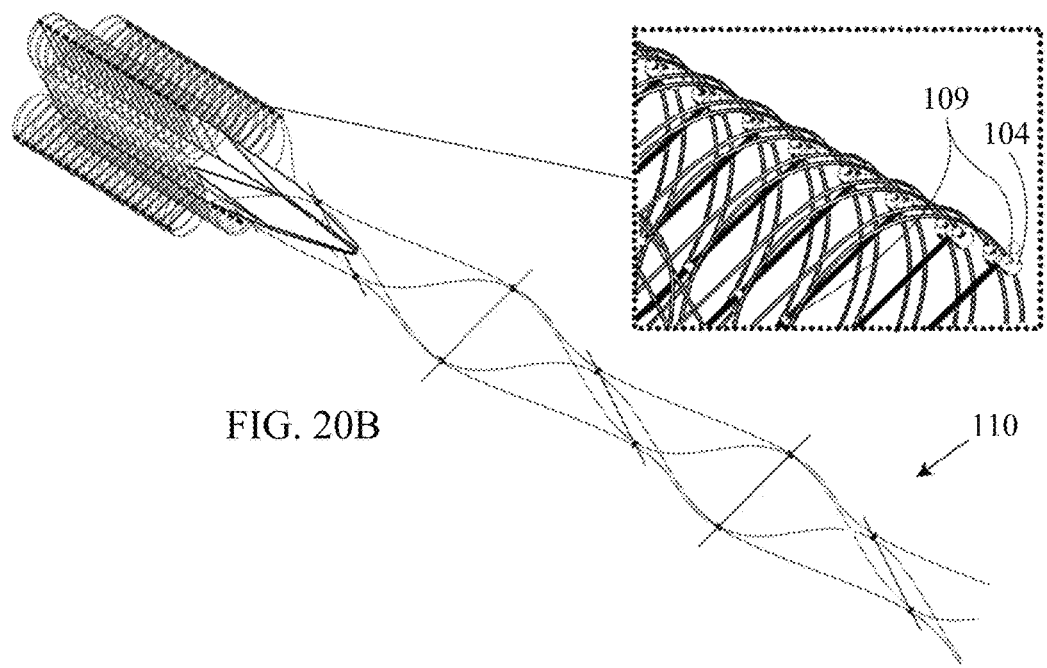
FIG. 20B is a perspective view with an enlarged view of an A-SEM embodiment deploying a sinusoidal structure and a close-up of its flexural members (108) and support members (104) attached using a locking feature (109).

FIG. 20A shows support members (104) and flexural members (108) snap buckled into lemniscate shapes as a method of organizing pre-deployed material within the parts feeder (204). Note: the assembly's parts are attached prior to being deployed, making the structure pre-assembled.

FIG. 206 depicts the A-SEM embodiment deploying a sinusoidal structure's (110) component parts as a unit from the parts feeder (204). Locking features (109) are shown as embossed regions fixed to the flexural members locking and aligning the support members to form a sinusoidal structure after deployment.

The sinusoidal structure may self-deploy and/or require an active or passive timing method to deploy. The elastic potential energy held within the snap through buckled material (i.e. the space lemniscate) may provide the energy needed for passive deployment.

Figures 20C, 20D:
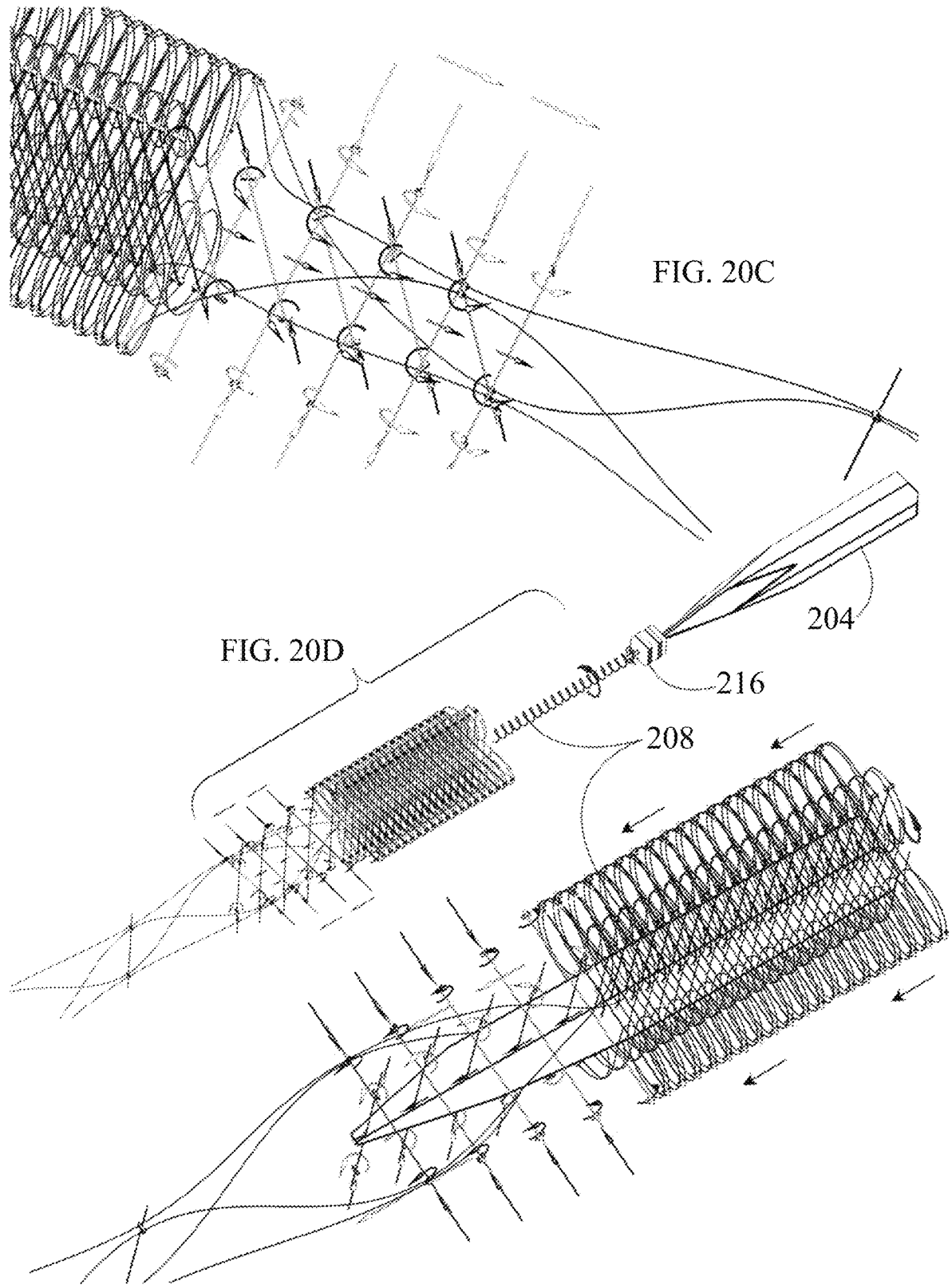
FIG. 20C illustrates the change in orientation of the support members as they follow the trajectory of the deploying flexural members.
FIG. 20D is an exploded view and a perspective view of an A-SEM embodiment that incorporates timing components that actively extrude the structure.

FIGS. 20C-D depict the motion of the support members as the flexural member unbuckles to deploy. Each completed turn of the space lemiscate forms a $1\lambda$ region along the length of the deployed sinusoidal member(s). Each loop of a lemiscate becomes $\lambda/2$. The sinusoidal members can deploy simultaneously to form a sinusoidal structure.

As depicted in FIG. 20C the transition from space lemniscate to sinusoid changes the orientation and position of the support members during their deployment (i.e. unbuckling) from the parts feeder to form a sinusoidal structure.

An exemplary method of controlling the sinusoidal structure's deployment with mechanical timing components is depicted in FIG. 20D. The parts feeder components responsible for controlling aspects of the sinusoidal structure's deployment may include various devices and be driven actively or passively.

FIG. 20D includes an exploded view of the A-SEM embodiment. The parts feeder (204) houses a drive mechanism (218) (i.e. helical actuator) and prime mover (216) that provides the timing, trajectories and forces necessary to displace the flexural members to controllably unbuckle and deploy the sinusoidal assembly.

The helical actuator may also be driven by the material as it unbuckles, that energy generated may be harvested by the prime mover reversibly driven during deployment. Devices like actuator fingers may provide a similar deployment/energy harvesting function.

For the structure/truss to be deployed without a substantial amount of energy, the pre-deployed structure must contain a similar or greater amount of elastic potential energy when compared to the deployed structure. The difference in the deployed and pre-deployed system's (bi stable system's) energy states can be harvested by devices. In a dynamical system, bistability means the system has two stable equilibrium states, (i.e. deployed and pre-deployed).

The momentum of the uncontrolled elastic unbuckling of a flexural member may augment the deployment of associated material like thin film. Alternatively, controllably unbuckling an elastic member using an energy harvesting device may be a method of redirecting the elastic potential energy that is transferred during its transition/deployment to a different/modified geometry having a lower energy state (i.e. from lemniscate to a sinusoid).

Figure 20E:
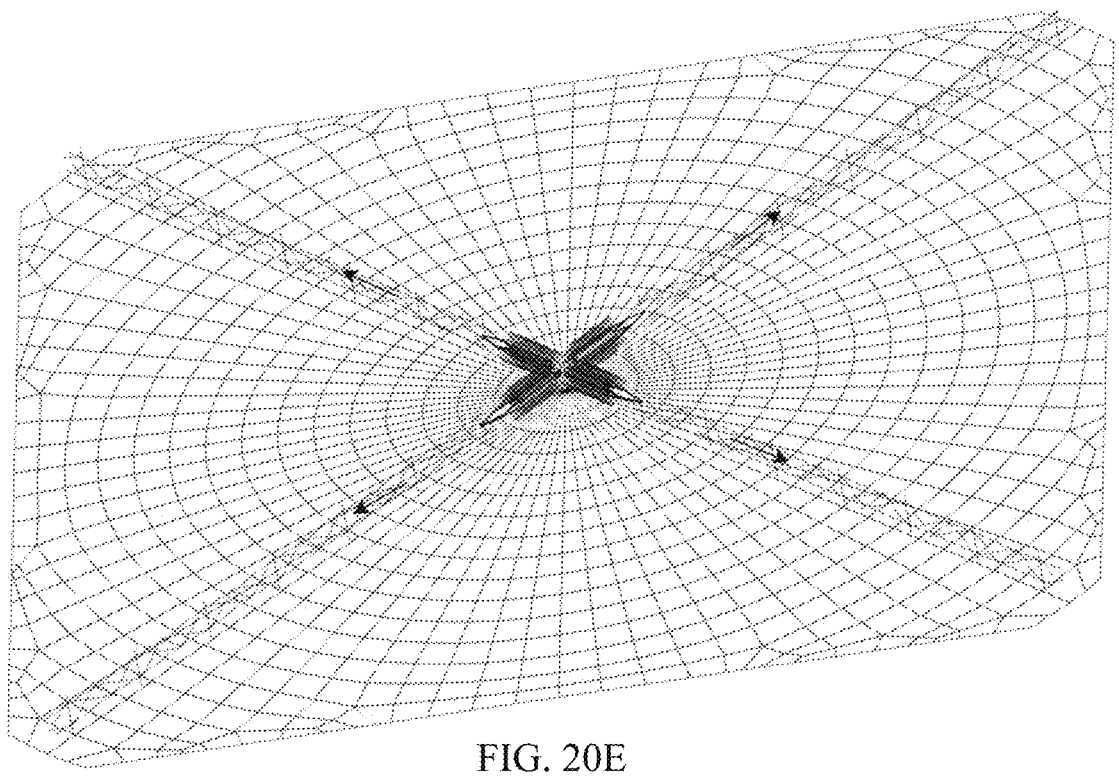
FIG. 20E is a perspective view of a sail being deployed and supported by a group of A-SEMs pre-stressed sinusoidal structures.
Figure 20F:
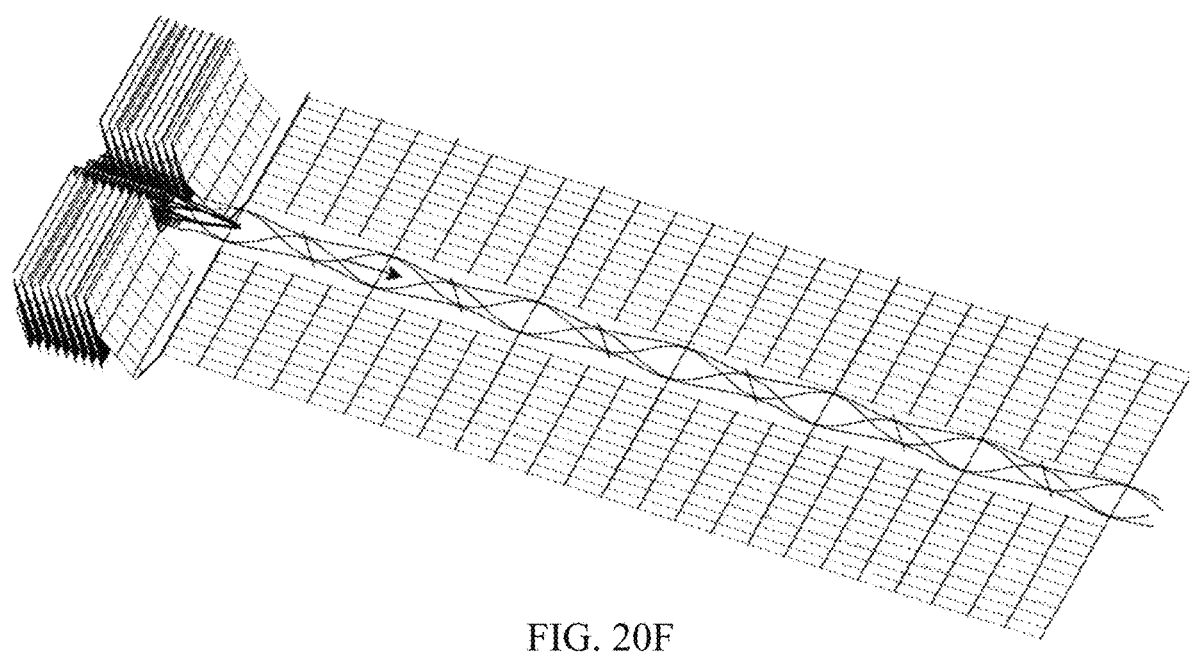
FIG. 20F is a perspective view of an A-SEM incrementally extruding a sinusoidal structure that is integrated with an exemplary folded structure.

The incremental nature of the sinusoidal structure's deployment, (i.e. unbuckling $\lambda/2$ or $1\lambda$ at a time) controlled by the A-SEM may be advantageous when integrated "folded" materials like thin films or light weight solar cells are to be simultaneously unfurled and deployed. FIGS. 20E-F depicts exemplary A-SEM embodiments deploying sinusoidal structures along with the material they are engineered to unfurl. Such systems may use the sinusoidal structure's network of components as an electrical transmission and signaling network. FIG. 20E shows an A-SEM extruding/deploying four orthogonally oriented sinusoidal structures to unfurl an ultra-thin refractive film material. Kirigami and Origami solar panels may be deployed similarly to those depicted in FIG. 20F. Integrating the unfolding characteristics of compliant mechanisms, (i.e. origami) with the unbuckling characteristics of material deployed by an A-SEM may augment the performance of both systems.

FIGS. 21A-F depict another A-SEM embodiment having flexural members and support members that make locking attachment and are stowed in the parts feeder. Unlike FIG. 20 the pre-deployed material is organized by axially twisting and coiling. Twisting the pre-assembled pre-deployed assembly may allow it to naturally form secondary coils to be stowed in a parts feeder as depicted in FIG. 21G. This phenomenon is similar to molecular supercoiling and tubular string buckling as depicted in FIG. 17B.

Figure 21A:
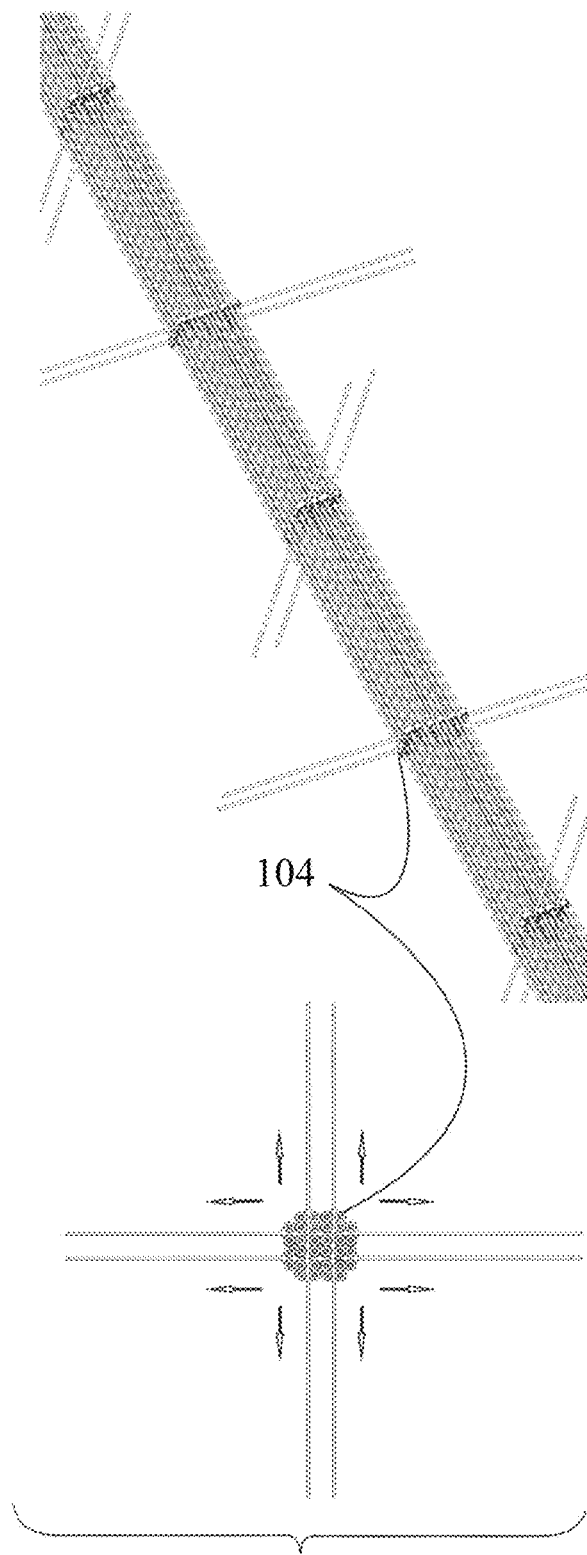
FIG. 21A is a top view and perspective view of an exemplary pre-deployed structure formed from pre-assembled relaxed members and support members.
Figure 21B:
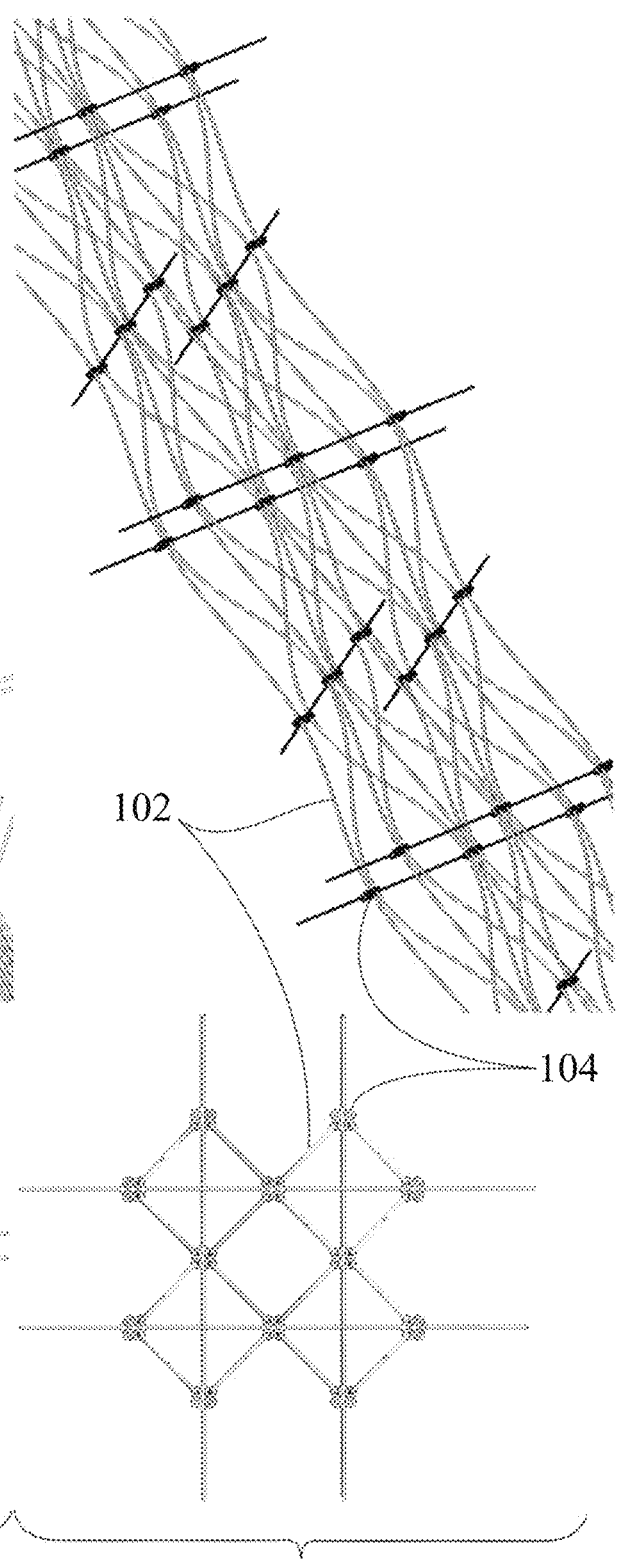
FIG. 21B is a top and perspective view of the said structure deployed to form a sinusoidal structure.

FIGS. 21A-B shows the orientation of the support members (104), flexural members (108) and sinusoidal shaped members (102), before (FIG. 21A) and after (FIG. 21B) deployment. The support member's component parts are shown to move in relation to one another (note the arrows) as the flexural members bend to take on a sinusoidal shape.

FIGS. 21C-E depict a method of organizing and stowing a pre-assembled deployable assembly by axially twisting and coiling it to contain elastic potential energy.

FIG. 21C depicts an exemplary un-deformed assembly. FIG. 21D shows the same assembly axially twisted. As shown in FIGS. 21C-D these pre-deployed assemblies may be partially pre-assembled. For example, an assembly may contain "incomplete" members that require additional elements and/or locking features (109) like pins, clips, complimentary shapes, adhesives etc. to form and support the sinusoidal structure. These parts may be added during deployment.

As shown in FIG. 21E the axial twisting causes the pre-deployed assembly to deflect and predisposes it to coiling.

Figure 22A:
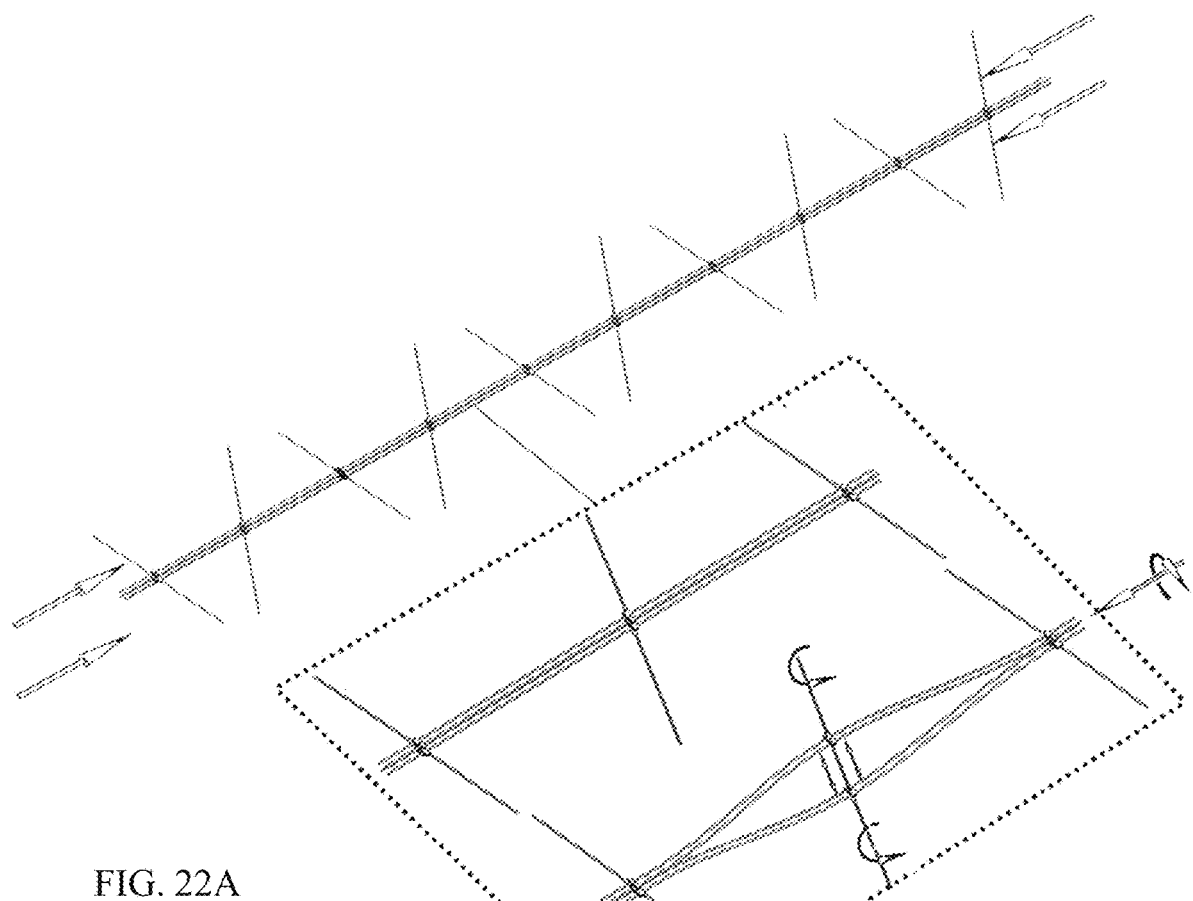
FIG. 22A shows perspective views with an enlarged view of a pre-assembly made up of 4 flexural members and support members.
Figure 22B:
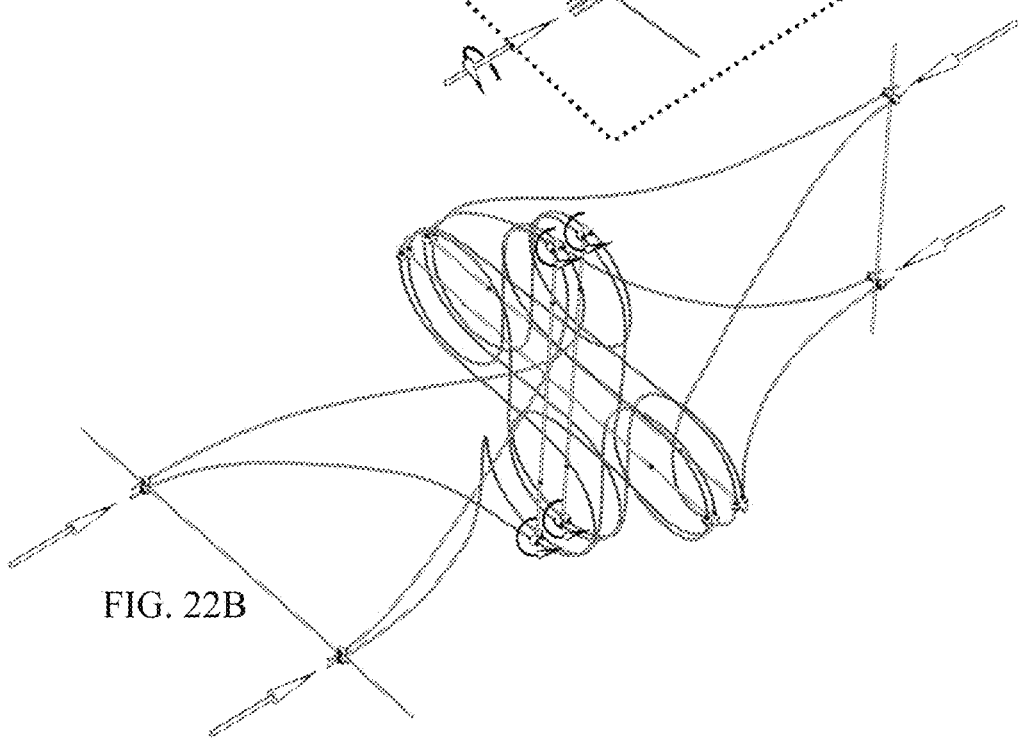
FIG. 22B is a perspective view of an assembly having flexural elements that have snap buckled due to axial force.
Figure 22D:
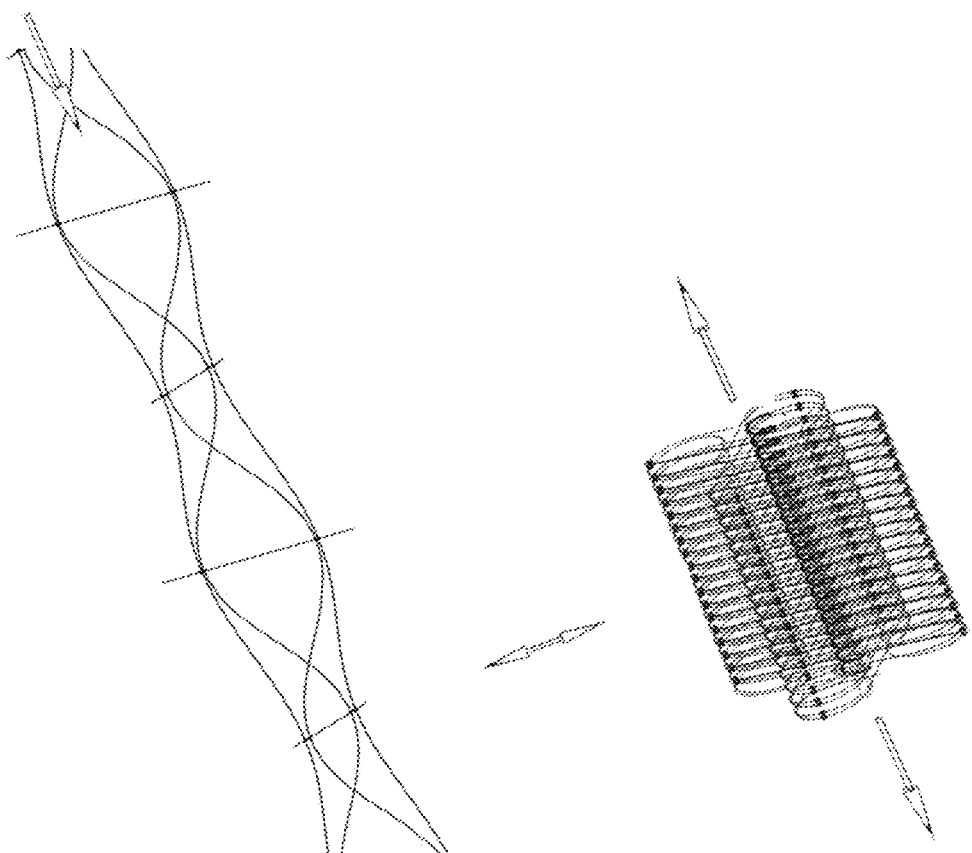
FIG. 22D is a perspective view of an assembly that has snap buckled to form a lemniscate that may be stowed within an A-SEM.
Figure 22C:
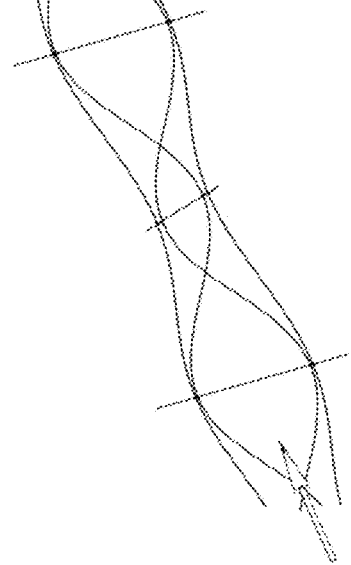
FIG. 22C is a perspective view of an assembly that has been deployed/unbuckled to form a sinusoidal structure.
Figure 22A:
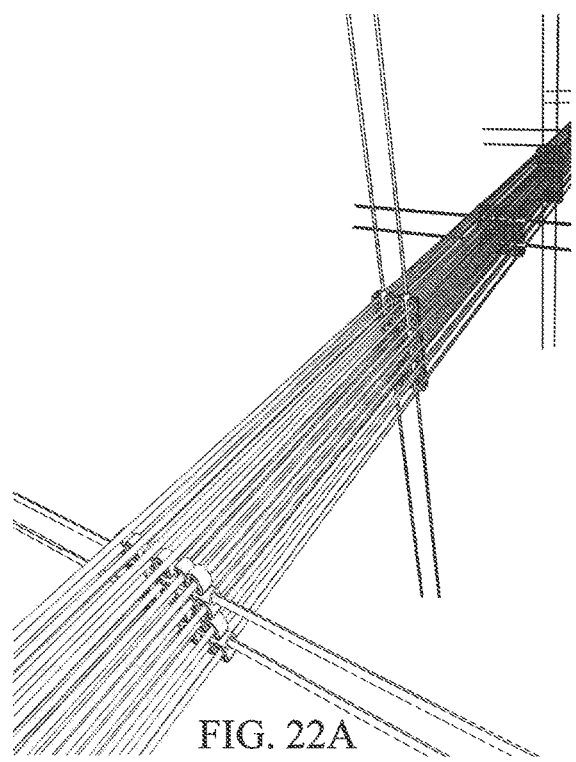
Figure 22B:
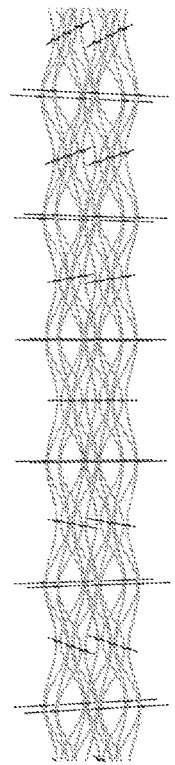
Figure 22C:
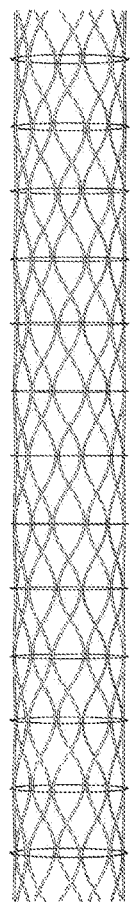
Figure 22D:
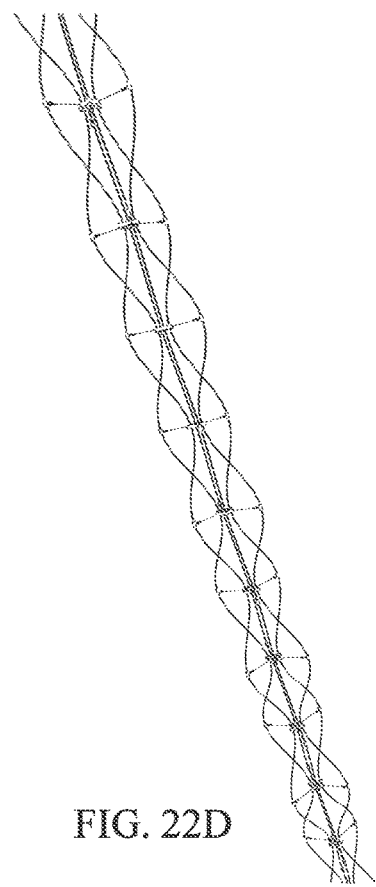

In FIG. 21F the pre-deployed twisted assembly is shown being deployed from a stowed coil to transition from a collapsed assembly (FIG. 21A) to an expanded sinusoidal structure (110) (FIG. 22B).

The A-SEM embodiment's parts feeder (204) and lateral force mechanism (210) are depicted in FIG. 21G. As the collapsed/pre-deployed structure is forced over the lateral force mechanism (210)/mandrel, it expands to form a sinusoidal structure. The arrows indicate the forward motion of the assembly/structure. Note: the collapsed structure can be pushed over the mandrel by the parts feeder or pulled by an external force.

The pre-deployed assembly is shown transitioning from a collapsed to an expanded sinusoidal structure (110) due to lateral force placed on it by the mandrel. The mandrel may guide and align the flexural members and support members during the assembly's deployment. The parts feeder could help guide, align and also apply the axial force needed to push or pull the collapsed structure over the mandrel to expand and lock it into place forming a sinusoidal structure. Lateral force mechanisms (210) can take on a variety of forms that may include but are not limited to a mandrel or mechanisms, for example actuator fingers (214) that apply lateral force to flexural members at different angles. In this A-SEM embodiment the mandrel components may be held in position via a tensile component that follows the pre-deployed structure's coiled geometry. The parts feeder components are responsible for controlling aspects of the sinusoidal structures deployment and may be driven actively or passively.

At its most fundamental the A-SEM assembles, "moves" and/or transitions members from one stable state to another stable state by applying moments (or redirecting energy) to the members leading to their deformation. The change in state is a geometric state and also an energy state. The A-SEM can function analogous to an enzyme to catalyze structural transitions.

Some sinusoidal structure species and their associated A-SEM(s) could function to reversibly assemble and reversibly deploy. This reversibility function would depend on the sinusoidal structure's design and the A-SEM's functionality. In general, this function would require the A-SEM to have component mechanisms and/or devices that operate reversibly. For example, a stowed assembly that is controllably unbuckled to deploy could be re-buckled and re-stowed indefinitely by designing A-SEM components to operate bidirectionally.

Such a bidirectional process could require specific assembly, disassembly and reassembly protocols by utilizing many of the same A-SEM components. Because the stowed assembly generally has greater stored elastic potential energy (i.e. greater material deformation) than the deployed assembly there may be more energy required to un-deploy than deploy. FIGS. 22A-D illustrates this bi-directionality by depicting the buckling/stowing and unbuckling/deployment process (i.e. two equilibrium states).

FIG. 22A shows a preassembled structure and a detail of its members having forces (which may include axial, lateral or torsion) applied causing them to progressively deflect which will lead to the members instability and flexural-torsional bifurcation buckling and snap buckling to form a bistable structure. FIG. 22B depicts axial force being applied to the structure and the transition from it being deflected and unbuckled to being snap through buckled. The deployed (FIG. 22C) and stowed (FIG. 22D) structures are topologically equivalent. These structures have identical components containing different amounts of elastic potential energy. The stowed structure and deployed structure are the bistable structure's stable states.

FIGS. 23A-D are line drawings that represent photographs of several proof-of-concept prototype sinusoidal assemblies. These assemblies are built from sinusoidal shaped members made from pultruded carbon fiber rods and support members made from printed carbon fiber infused nylon. Such sinusoidal structures may be formed from but not limited to pultruded nano-composite material having meta-material properties.

Figure 23A:
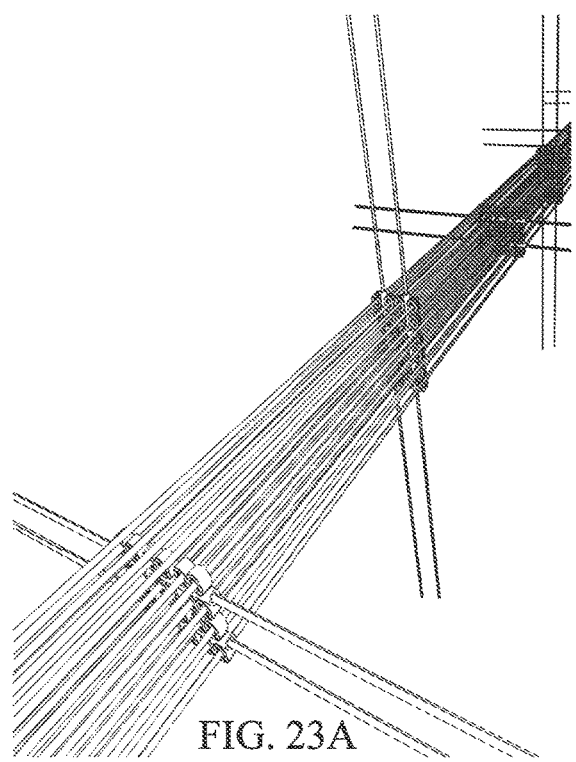
FIG. 23A is a line drawing that represents a photograph showing a proof of concept model, it is the same structure depicted in FIG. 21A.
Figure 23B:
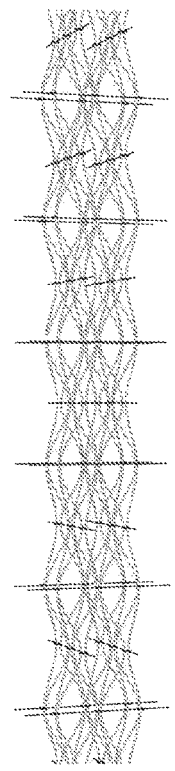
FIG. 23B is a line drawing showing a proof of concept model, it is the same sinusoidal structure depicted in FIG. 21B.
Figure 23C:
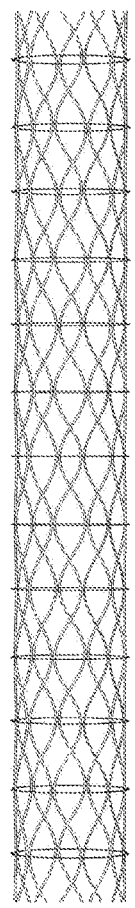
FIG. 23C is a line drawing showing a proof of concept model, it is the same sinusoidal structure depicted in FIG. 3A.
Figure 23D:
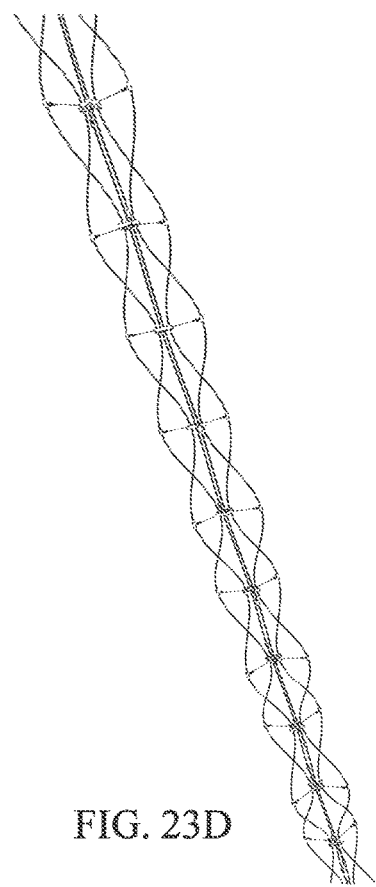
FIG. 23D is a line drawing showing a proof of concept model of an exemplary sinusoidal structure that contains an axial support member that is under tension.

These sinusoidal assemblies store elastic potential energy and can be built using an A-SEM. FIG. 23A (FIG. 21A) shows a pre-deployed/collapsed assembly. FIG. 23B (FIG. 21B) is a line drawing that represents a photograph of the same assembly expanded to form a sinusoidal structure. A-SEM embodiments can form a variety of sinusoidal assembly geometries. FIGS. 23C-D depict exemplary sinusoidal member configurations and their associated support members.

The A-SEM as a Loom

The fundamental nature of A-SEM embodiments may allow them to be thought of as a novel loom. Within a traditional loom, warp thread forms a sinusoidal shape and weft thread creates and supports that sinusoidal shape. Sinusoidal shaped members could be thought of as warp and the support members the weft.

Many loom parts function similar to A-SEM parts. Support member carriers push support members into position as relaxed members are elastically deformed into sinusoids; this is analogous to the reed pushing the weft into the warp. The A-SEM's lateral force mechanism positions (alternates the position) the sinusoidal shaped members during assembly and functions similar to the heddle in a loom. The parts feeder introduces new material into the mechanism similar to a loom weft shuttle(s) and warp spools.

The A-SEM differs from a conventional loom in that it is designed to use high performance elastic composite material members. This use of linear composite members instead of thread gives the A-SEM the "opportunity" to incorporate mechanisms to specifically apply axial force and/or lateral bending moments to the members individually during assembly. The controlled forces being applied during assembly can create pre-stressed three-dimensional structures having flexural and engineering properties tailored to specific structural and mechanical applications.

Figure 24A:
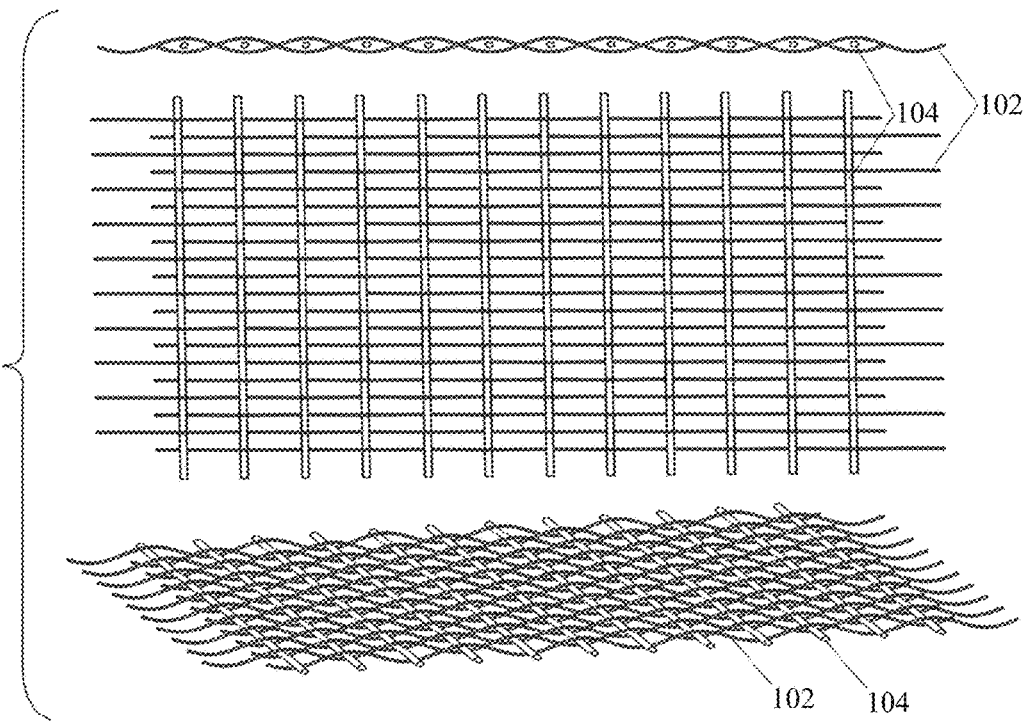
FIG. 24A is a side view, top view and perspective view of a planer sinusoidal structure having sinusoidal members' amplitude oriented perpendicular to the structures plane.
Figure 24B:
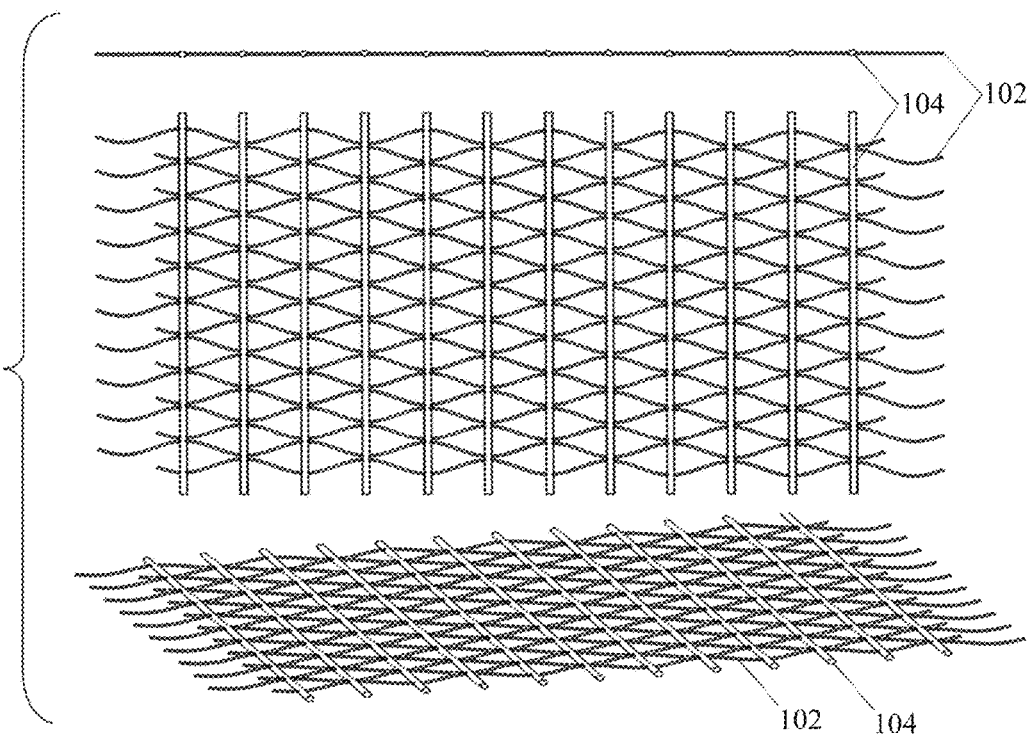
FIG. 24B is a side view, top view and perspective view of a planer sinusoidal structure having sinusoidal members' amplitude oriented parallel to the structures plane.

FIGS. 24A-B depict a side view, top view and perspective view of two exemplary sinusoidal structures. FIG. 24A depicts a woven structure formed using a conventional loom. Adjacent warp threads (sinusoidal shaped members) are positioned 180 degrees out of phase with their amplitude (height) and length oriented perpendicular to the weft threads (support members) length. This woven structure depicted in FIG. 24A could also be formed by an A-SEM. Specific A-SEM embodiments can also produce structures that a conventional loom cannot. Such a structure is depicted in FIG. 24B where adjacent warp threads (sinusoidal shaped members) are positioned 180 degrees out of phase with their amplitude (height) oriented parallel to the weft threads (support members) length and to the structure's plane.

Figure 24C:
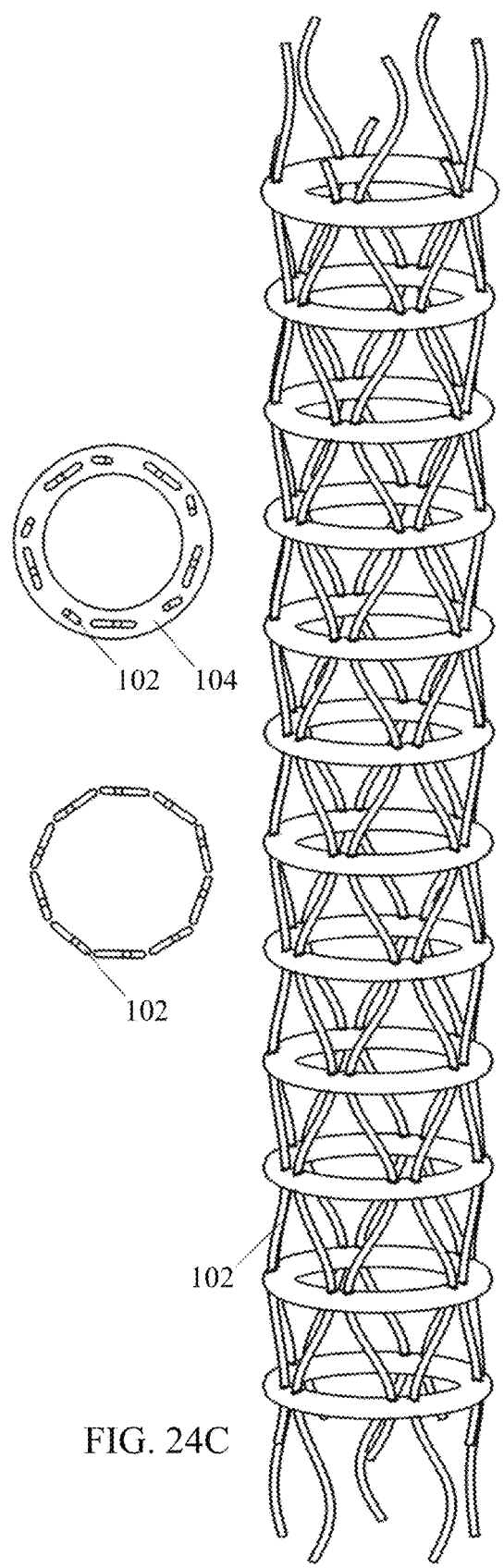
FIG. 24C is a side view, top view and perspective view of a cylindrical sinusoidal structure with its sinusoidal members' amplitude oriented perpendicular to the cylinder's longitudinal axis.

Some A-SEM embodiments described in this application could be described as novel circular looms that form tubular sinusoidal structures containing sinusoidal shaped members attached at their antinodes through support members as depicted in FIG. 24C.

Like a loom, the A-SEM embodiment design depends on the shape of the sinusoidal structure it produces. For example, a linear loom forms a plane and a circular loom forms a tube.

Figure 24D:
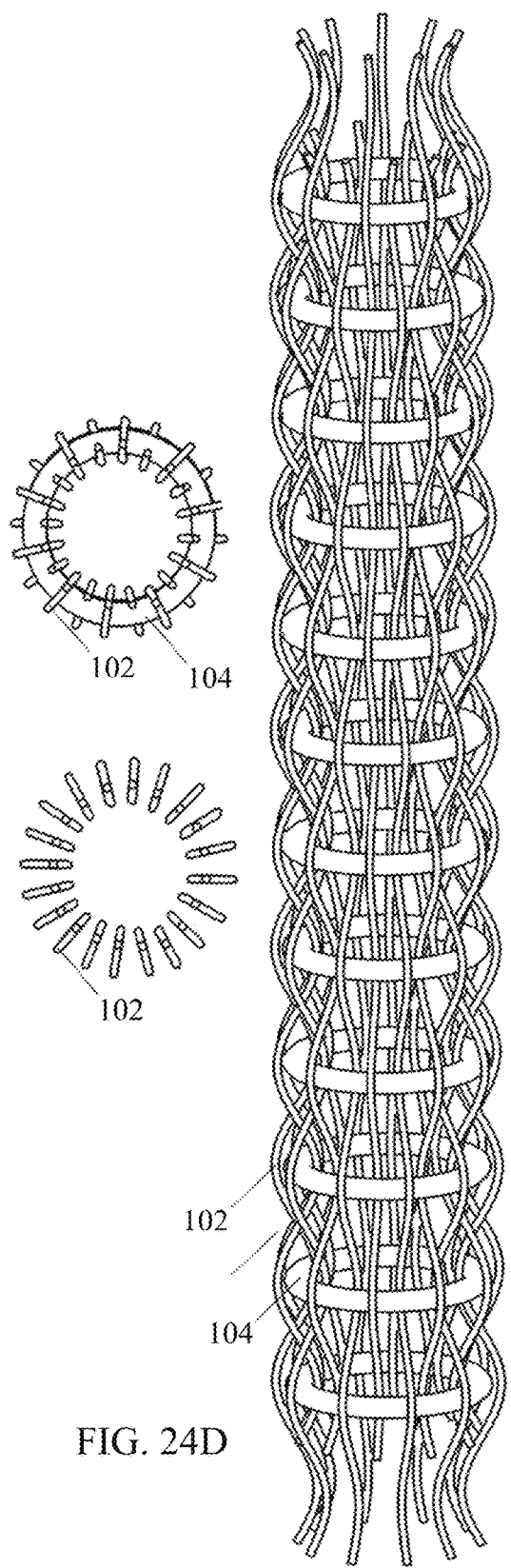
FIG. 24D is a side view, top view and perspective view of a cylindrical sinusoidal structure with its sinusoidal members' amplitude oriented radially to the cylindrical longitudinal axis.

FIG. 24D depicts a tubular structure produced using a conventional circular loom. Its sinusoidal shaped members (warp threads) are oriented perpendicular to the tube's periphery. This structure contains sinusoidal members that are held out of phase by support members.

Note: FIGS. 24A-D depict sinusoidal structures formed from sinusoidal members connected at their antinodes through support members. The only difference between FIGS. 24A and 24C and FIGS. 24B and 24D is the orientation of their sinusoidal shaped members and the proximity of their connected antinodes.

While preferred embodiments of the invention are disclosed herein, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims.

What is claimed:

1. A mechanical system to assemble or deploy a pre-stressed system comprising a first means to deform continuous lengths of elastic material sequentially to form a plurality of sinusoidal shaped members with a series of contiguous flexures, said sinusoidal shaped members having nodes and antinodes and each of said flexures beginning and ending at antinodes; a second means to position support members for maintaining the flexures in the sinusoidal shaped members, and a third means to connect the plurality of sinusoidal shaped members in antiphase at their respective antinodes, said first, second and third means being integrated and functioning sequentially.

2. The mechanical system of claim 1 wherein a pultrusion device forms the continuous lengths of elastic material, the support members or both.

3. The mechanical system of claim 1 wherein a 3d printer forms the continuous lengths of elastic material, the support members or both.

4. The mechanical system of claim 1 wherein the first, second and/or third means function reversibly.

5. The mechanical system of claim 1 which is actively driven.

6. The mechanical system of claim 1 which is passively driven with potential energy stored in the continuous lengths of elastic material.

7. The mechanical system of claim 1 wherein the first means applies lateral, axial and/or twisting forces to the continuous lengths of elastic material.

8. The mechanical system of claim 7 wherein the forces applied to the continuous lengths of elastic material are variable.

9. The mechanical system of claim 1 wherein each of the sinusoidal shaped members has a wave length and each flexure in the sinusoidal shaped members makes up at least one-half wave length.

10. The mechanical system of claim 1 wherein the elastic material allows for reversible deformation without compromising strength.

11. The mechanical system of claim 1 wherein the sinusoidal shaped members are connected into an organized assembly.

12. The mechanical system of claim 1 wherein the support members include a zipper for connecting the sinusoidal shaped members end-to-end or together.

13. A method of constructing or deploying a pre-stressed structure with a centroid axis comprising: forming component flexures contiguously along a sinusoidal trajectory in a plurality of sinusoidal shaped members, providing supports that follow the sinusoidal trajectory in period with the component flexures and hold the flexures in the plurality of sinusoidal shaped members in antiphase, connecting the plurality of sinusoidal shaped members at respective antinodes, whereby an elastic energy neutral axis balance is obtained between the sinusoidal shaped members through the connected antinodes.

14. The method of claim 13 wherein the centroid axis of the pre-stressed structure and the elastic energy neutral axis of the sinusoidal shaped members coincide.

15. The method of claim 13 wherein the flexures are formed from a composite material and store elastic potential energy.

16. The method of claim 15 wherein the flexures are formed incrementally and store elastic potential energy.

17. The method of claim 16 wherein the stored elastic potential energy in the flexures is variable.

18. The method of claim 17 wherein the elastic potential energy is simulated and/or under computer control.

19. The method of claim 13 wherein the pre-stressed structure is formed from a network of flexures connected to one another through the supports and some or all of the supports include a zipper.

20. The method of claim 19 wherein the network of flexures functions as an electrical transmission and signaling network.

* * * * *